United States Patent
Cooper et al.

(10) Patent No.: US 9,727,845 B2
(45) Date of Patent: *Aug. 8, 2017

(54) SYSTEM INITIATED PENDING STATE AUTHORIZATION IN A BENEFITS ADMINISTRATION DOMAIN MODEL

(71) Applicant: ADP, LLC, Roseland, NJ (US)

(72) Inventors: Thomas A. Cooper, Sutton, MA (US); Colin J. Turner, Hudson, MA (US)

(73) Assignee: ADP, LLC, Roseland, NJ (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/300,202

(22) Filed: Jun. 9, 2014

(65) Prior Publication Data

US 2014/0289153 A1    Sep. 25, 2014

Related U.S. Application Data

(63) Continuation of application No. 14/290,466, filed on May 29, 2014, which is a continuation of application
(Continued)

(51) Int. Cl.
*G06Q 10/10* (2012.01)
*G06Q 10/00* (2012.01)
(Continued)

(52) U.S. Cl.
CPC ....... *G06Q 10/1057* (2013.01); *G06Q 10/067* (2013.01); *G06Q 10/10* (2013.01); *G06Q 10/103* (2013.01); *G06Q 10/105* (2013.01)

(58) Field of Classification Search
None
See application file for complete search history.

(56) References Cited

U.S. PATENT DOCUMENTS

| 6,067,522 A | 5/2000 | Warady et al. |
| 7,069,229 B1 | 6/2006 | Richardson et al. |

(Continued)

FOREIGN PATENT DOCUMENTS

| WO | 2010045456 A1 | 4/2010 |
| WO | 2010045459 A1 | 4/2010 |

OTHER PUBLICATIONS

PCT/US2009/060839, "International Application Serial No. PCT/US2009/060839, International Search Report and Written Opinion mailed Feb. 1, 2010", 15 pages.
(Continued)

*Primary Examiner* — Gabrielle McCormick
(74) *Attorney, Agent, or Firm* — GTC Law Group PC & Affiliates

(57) ABSTRACT

In embodiments of the present invention improved capabilities are described for a human resource management platform that includes applications targeted to solve a variety of human resource and benefits administration management problems. Applications of the human resource management platform include business applications such as benefits administration that may provide a single solution for facilitating employee benefits management and organizational efficiencies through automation of benefit management functions, measurement of benefit provider effectiveness, and the like.

6 Claims, 68 Drawing Sheets

Related U.S. Application Data

No. 12/579,985, filed on Oct. 15, 2009, now abandoned.

(60) Provisional application No. 61/105,593, filed on Oct. 15, 2008, provisional application No. 61/105,615, filed on Oct. 15, 2008.

(51) Int. Cl.
  *G06Q 10/08* (2012.01)
  *G06Q 30/02* (2012.01)
  *G06Q 30/08* (2012.01)
  *G06Q 10/06* (2012.01)

(56) References Cited

U.S. PATENT DOCUMENTS

| | | | |
|---|---|---|---|
| 7,113,933 | B1 | 9/2006 | Imholte |
| 8,280,822 | B2 | 10/2012 | McKeown et al. |
| 8,635,080 | B2 | 1/2014 | McKeown, III et al. |
| 9,208,474 | B2 | 12/2015 | McKeown et al. |
| 2001/0051906 | A1* | 12/2001 | Esposito ............ G06Q 10/10 705/35 |
| 2002/0120474 | A1 | 8/2002 | Hele et al. |
| 2002/0173984 | A1* | 11/2002 | Robertson .......... G06Q 10/10 709/220 |
| 2003/0204421 | A1 | 10/2003 | Houle et al. |
| 2003/0225740 | A1* | 12/2003 | Sexton ............... G06F 9/461 |
| 2004/0088334 | A1 | 5/2004 | Klein |
| 2004/0254939 | A1 | 12/2004 | Dettinger et al. |
| 2005/0273350 | A1 | 12/2005 | Scarborough et al. |
| 2007/0057967 | A1 | 3/2007 | Armstrong |
| 2007/0185721 | A1 | 8/2007 | Agassi et al. |
| 2008/0033756 | A1 | 2/2008 | Peterson et al. |
| 2008/0079961 | A1 | 4/2008 | Borodin et al. |
| 2008/0120129 | A1 | 5/2008 | Seubert et al. |
| 2008/0141237 | A1 | 6/2008 | Elad et al. |
| 2008/0193100 | A1 | 8/2008 | Baum et al. |
| 2009/0265255 | A1 | 10/2009 | Jackson et al. |
| 2010/0100427 | A1 | 4/2010 | McKeown et al. |
| 2010/0100561 | A1 | 4/2010 | Cooper et al. |
| 2012/0323811 | A1 | 12/2012 | McKeown et al. |
| 2013/0006883 | A1 | 1/2013 | McKeown et al. |
| 2014/0279639 | A1 | 9/2014 | Cooper et al. |
| 2014/0289146 | A1 | 9/2014 | Cooper et al. |
| 2014/0289148 | A1 | 9/2014 | Cooper et al. |
| 2014/0289149 | A1 | 9/2014 | Cooper et al. |
| 2014/0289150 | A1 | 9/2014 | Cooper et al. |
| 2014/0289151 | A1 | 9/2014 | Cooper et al. |
| 2014/0289152 | A1 | 9/2014 | Cooper et al. |
| 2014/0289154 | A1 | 9/2014 | Cooper et al. |
| 2014/0289155 | A1 | 9/2014 | Cooper et al. |

OTHER PUBLICATIONS

PCT/US2009/060843, "International Application Serial No. PCT/US2009/060843, International Search Report and Written Opinion mailed Jan. 21, 2010", 17 pages.

Gubarkov, "How can I hide waiting tickets in my Queues?", http://lists.otrs.org/pipermail/otrs/2009-March/025943.html (accessed Oct. 14, 2015), Mar. 11, 2009, 2 Pages.

Park, "Multithreaded Programming : Improving Performance through Threads", https://web.archive.org/web/20071217152645/http://randu.org/tutorials/threads (accessed Oct. 14, 2015), Aug. 20, 2002, 7 Pages.

* cited by examiner

| | | | | | |
|---|---|---|---|---|---|
| 202 — PRESENTATION | HTML | FLEX | JASPER REPORTS | PDF | |
| | USER INTERFACE | | | | |
| | ANALYTICS | GUIDELINES | HELP | WIZARDS | |
| 204 — BUSINESS LOGIC | COMPENSATION | EMPLOYEE PROFILE | | ELIGIBILITY AND ENROLLMENT | |
| | PERFORMANCE | | | VENDOR MANAGEMENT | |
| | SUCCESSION | ADMINISTRATION TOOLS | | COBRA ADMIN | |
| | MARKET DATA | | | FSA / HAS | |
| | COMPETENCIES | DOMAIN MODEL | | DB / DC | |
| | OTHER TMS | | | OTHER OBA | |
| | | EFFECTIVE DATING | | | |
| | | PLATFORM | | | |
| 208 — PERSISTENCE | SMART SYNC | PERSISTENCE | GROUP MANAGER | SECURITY | |
| | DATABASE | | | | |

JOHN NEWMAN

WELCOME

EMPLOYEE PROFILE

| | | | |
|---|---|---|---|
| NAME | JOHN NEWMAN | ID | 2405 |
| HOME ADDRESS | 123 ANY STREET HOLLISTON, IL 01746 | STATUS | ACTIVE |
| | | HIRE DATE | 01/01/2009 |
| PHONE NUMBER | (508)004-2405 | ORIGINAL HIRE DATE | 01/01/2009 |
| BIRTH DATE | 06/20/1963 | PAYROLL FREQUENCY | ANNUALLY |
| GENDER | MALE | EMAIL ADDRESS | DEV1@ROVER.WOR... |
| FT/PT | FULLTIME | DEPARTMENT ID | MKT |
| JOB TITLE | FINANCIAL ANALYST | DIVISION ID | MKT |
| LOCATION ID | LOC-NY | PARTICIPATION GROUP | |
| UNION ID | UNION2 | | |

CURRENT BENEFITS
EMPLOYEE PROFILE
BENEFICIARY MANAGEMENT
DEPENDENT MANAGEMENT
WELLNESS CENTER
FSA MANAGER
VOLUNTARY PROGRAMS
VOLUNTARY INSURANCE AND DISCOUNT PROGRAMS
COMMON FORMS
SUMMARY PLAN DESCRIPTIONS
CARRIER INFORMATION
FAQ
FREQUENTLY ASKED QUESTIONS

CHECK YOUR RETIREMENT
GET MORE INFORMATION ABOUT YOUR RETIREMENT SAVINGS
GO

PLOYEE.COM...

FIG. 11

WORKSCAPE    WELCOME JOHN NEWMAN    BACK TO WELCOME  HELP  LOGOUT

BENEFICIARY MAINTENANCE
09/30/2009

TO ADD A BENEFICIARY, SELECT A BENEFICIARY TYPE (PERSON, TRUST, ESTATE, CHARITY) AND THEN CLICK THE 'ADD BENEFICIARY/ALLOCATION' BUTTON

BENEFICIARY [SELECT BENEFICIARY ▷]  BENEFIT [         ▷]   [ADD BENEFICIARY/ALLOCATION]

ACTIONS   NAME           RELATIONSHIP   ID          DATE
          ANN NEWMAN     MOTHER         987654321   01/20/1950

ACTIONS   BENEFIT             NAME          BENEFICIARY TYPE   ALLOCATION%
          SUPPLEMENTAL LIFE   ANN NEWMAN    [PRIMARY  ▷]       [    100%]
                                            ALLOCATIONS
                                            [UPDATE ALLOCATIONS]

[⇒ FINISH]     [BACK TO WELCOME]

INSTRUCTIONS

PLEASE TAKE A MOMENT TO ADD YOUR BENEFICIARY INFORMATION FOR THE FOLLOWING INSURANCE BENEFITS:
- BASIC LIFE INSURANCE
- ACCIDENTAL DEATH & DISMEMBERMENT INSURANCE
- SUPPLEMENTAL LIFE INSURANCE
- BUSINESS TRAVEL & ACCIDENT INSURANCE
- 401K

ALLOCATIONS FOR EACH BENEFICIARY TYPE MUST TOTAL 100%

*FIG. 12*

| WORKSCAPE | WELCOME JOHN NEWMAN | | | BACK TO WELCOME HELP LOGOUT |
|---|---|---|---|---|

DEPENDENT MAINTENANCE

| | | | | DEPENDENT COVERAGE | |
|---|---|---|---|---|---|
| ACTIONS | NAME | RELATIONSHIP | BIRTHDATE | MEDICAL | DENTAL |
| ✎ ⊖ | SAMANTHA NEWMAN | DAUGHTER | 01/01/1995 | NO | NO |

INSTRUCTIONS

PLEASE TAKE A MOMENT TO REVIEW YOUR DEPENDENTS ON FILE

✎ TO UPDATE EXISTING DEPENDENT INFORMATION, CLICK ON THE 'EDIT' BUTTON TO THE LEFT OF THAT DEPENDENT

⇨ FINISH    BACK TO WELCOME

*FIG. 13*

WORKSCAPE    WELCOME JOHN NEWMAN      HELP LOGOUT

WELCOME
VOLUNTARY PROGRAMS
NEW! VIP PET INSURANCE
1-800 FLOWERS
AUTO DISCOUNTS
DIGITAL FEDERAL CREDIT UNION
HOME AND AUTO INSURANCE
SOFTWARE, HARDWARE AND ELECTRONICS
WEBMD
WIRELESS PRODUCTS AND SERVICES

NEW! VIP PET INSURANCE
YOUR COMPANY IS PLEASED TO OFFER YOU THE OPTION TO PROVIDE INSURANCE FOR YOUR PETS. THROUGH THE CORPORATE DISCOUNT AVAILABLE WITH VETERINARY PET INSURANCE, YOU CAN AFFORD TO PROVIDE FOR ALL THE MEMBERS OF YOUR FAMILY. IF YOUR FAMILY INCLUDES DOGS, BIRDS, GECKOS OR A POT BELLY PIG, YOU CAN PURCHASE INSURANCE FOR YOUR PET. WHETHER ROUTINE CHECK UPS OR UNEXPECTED SITUATIONS, YOU CAN OFFSET THE VETERINARY EXPENSE WITH PET INSURANCE. IN ORDER TO OBTAIN THE DISCOUNT, YOU MUST ENROLL VIA THE WEB SITE PROVIDED OR CALL AND TELL THE REPRESENTATIVE YOU ARE WITH NATIONAL BUSINESS GROUP
PHONE: 866-332-7620
WEBSITE: WWW.PETINSURANCE.COM/NBG 1-800 FLOWERS
AS A MEMBER OF THE PREFERRED CUSTOMER CLUB, EMPLOYEES ARE ENTITLED TO A 10% DISCOUNT ON MERCHANDISE FROM 1-800-FLOWERS.COM JUST USE THE PROMOTION CODE "TECH" WHEN ORDERING TO RECEIVE THESE SPECIAL SAVINGS

CURRENT BENEFITS
EMPLOYEE PROFILE
BENEFICIARY MANAGEMENT
DEPENDENT MANAGEMENT
WELLNESS CENTER
FSA MANAGER
VOLUNTARY PROGRAMS
VOLUNTARY INSURANCE AND DISCOUNT PROGRAMS
COMMON FORMS
SUMMARY PLAN DESCRIPTIONS
CARRIER INFORMATION
FAQ
FREQUENTLY ASKED QUESTIONS

CHECK YOUR RETIREMENT
GET MORE INFORMATION ABOUT YOUR RETIREMENT SAVINGS

WORKSCAPE    WELCOME JOHN NEWMAN                                    HELP  LOGOUT

WELCOME

COMMON FORMS
2010
  401K
    401K FAST FACTS                                    DOWNLOAD FORM
  DENTAL
    DELTA DENTAL IMPLANTS BROCHURE                     DOWNLOAD FORM
    DELTA DENTAL SUMMARY                               DOWNLOAD FORM
    DELTA ROLLOVER MAX BROCHURE                        DOWNLOAD FORM
    DELTA XYLITOL BROCHURE                             DOWNLOAD FORM
  ELECTION WAIVER
    MEDICAL WAIVER FORM                                DOWNLOAD FORM
  EMPLOYEE ASSISTANCE PROGRAM (EAP)
    EMPLOYEE ASSISTANCE PROGRAM BROCHURE               DOWNLOAD FORM
  EVIDENCE OF INSURABILITY FORM (EOI)
    HARTFORD EOI PERSONAL HEALTH APPLICATION           DOWNLOAD FORM
  FLEXIBLE SPENDING ACCOUNT (FSA)
    CYC - DEBIT CARD EXPLANATION                       DOWNLOAD FORM
    CYC - DEPENDENT CARE REIMBURSEMENT                 DOWNLOAD FORM
    CYC - FSA SAVINGS CALCULATOR                       DOWNLOAD FORM
    CYC - HEALTH CARE REIMBURSEMENT                    DOWNLOAD FORM

CURRENT BENEFITS
EMPLOYEE PROFILE
BENEFICIARY MANAGEMENT
DEPENDENT MANAGEMENT
WELLNESS CENTER
FSA MANAGER
VOLUNTARY PROGRAMS
VOLUNTARY INSURANCE AND
DISCOUNT PROGRAMS
COMMON FORMS
SUMMARY PLAN DESCRIPTIONS
CARRIER INFORMATION
FAQ
FREQUENTLY ASKED QUESTIONS

CHECK YOUR RETIREMENT
GET MORE INFORMATION ABOUT
YOUR RETIREMENT SAVINGS

GO

WORKSCAPE   WELCOME JOHN NEWMAN                                    BACK TO WELCOME  HELP  LOGOUT

BACK TO WELCOME

MY CURRENT BENEFITS
YOUR ELECTIONS

| BENEFIT | OPTION - COVERAGE LEVEL | EFFECTIVE START DATE | PER PAY PERIOD EMPLOYEE COSTS | | PER PAY PERIOD EMPLOYER COSTS |
|---|---|---|---|---|---|
| EMPLOYEE PAID PRE-TAX BENEFITS | | | PRE-TAX | | |
| MEDICAL | BLUE CROSS BLUE SHIELD PPO - EMPLOYEE ONLY | 01/01/2009 | $64.00 | | $256.00 |
| DENTAL | DELTA DMO - EMPLOYEE ONLY | 01/01/2009 | $3.33 | | $13.32 |
| HEALTH CARE REIMBURSEMENT ACCOUNT | $1,500.00 ANNUAL CONTRIBUTION | 01/01/2009 | $57.69 | | $0.00 |
| DEPENDENT CARE REIMBURSEMENT ACCOUNT | $2,500.00 ANNUAL CONTRIBUTION | 01/01/2009 | $96.15 | | $0.00 |
| | | | TOTAL PRE-TAX COST: | $221.17 | $269.32 |
| EMPLOYEE PAID POST-TAX BENEFITS | | | POST-TAX | | |
| SUPPLEMENTAL LIFE | 1 x ANNUAL SALARY | 01/01/2009 | $23.42 | | $0.00 |
| | | | TOTAL POST-TAX COST: | $23.42 | $0.00 |
| EMPLOYER PAID BENEFITS | | | | | |
| SHORT-TERM DISABILITY (STD) | 66 2/3% OF WEEKLY EARNINGS | 01/01/2009 | $0.00 | | $3.13 |
| LONG-TERM DISABILITY (LTD) | 60% OF MONTHLY EARNINGS | 01/01/2009 | $0.00 | | $6.56 |
| BASIC LIFE INSURANCE | 2 x ANNUAL SALARY | 01/01/2009 | $0.00 | | $8.63 |
| BASIC AD&D INSURANCE | 2 x ANNUAL SALARY | 01/01/2009 | $0.00 | | $0.57 |
| BUSINESS TRAVEL & ACCIDENT INSURANCE | $250000 | 01/01/2009 | $0.00 | | $0.44 |
| EMPLOYEE ASSISTANCE PROGRAM | EMPLOYEE AND FAMILY INCLUDING SPOUSE AND DEPENDENTS | 01/01/2009 | | | $0.91 |

PRINT

WORKSCAPE    WELCOME JOHN DOE                                          BACK TO WELCOME   HELP  LOGOUT

① DECLARE LIFE EVENT                                                                    LIFE EVENT

DECLARE LIFE EVENT

[BIRTH OF CHILD ▽]   EVENT DATE: [09/15/2008] 🔳    CLICK SUBMIT
                                                   [ SUBMIT ]

OVERVIEW:   CONGRATULATIONS ON YOUR NEW CHILD!
            YOU MAY TAKE THIS OPPORTUNITY TO MAKE CHANGES TO YOUR
            BENEFITS SUCH AS ADDING YOUR NEW CHILD TO YOUR EXISTING
            MEDICAL INSURANCE OR INCREASING YOUR HCRA YEARLY
            CONTRIBUTION
            YOU MAY ALSO WANT TO TAKE THIS TIME TO UPDATE YOUR BENEFICIARY
            INFORMATION
            YOU HAVE 30 DAYS FROM YOUR CHILD'S DATE OF BIRTH TO MAKE
            CHANGES TO YOUR BENEFITS AS WELL AS PROVIDE THE APPROPRIATE
            DOCUMENTATION TO HR

DOCUMENTS:  BIRTH CERTIFICATION
            [NOTE EOI REQUIREMENT]

INSTRUCTIONS

THIS APPLICATION ALLOWS YOU TO
DECLARE A LIFE EVENT

SELECT AN EVENT FROM THE DROP
DOWN LIST, ENTER A VALID DATE,
THEN SELECT SUBMIT

IF THERE ARE NO VALIDATION
ERRORS, A NEW LIFE EVENT WILL
BE ENTERED INTO YOUR RECORDS.
THE NEW LIFE EVENT MAY OPEN
AN ENROLLMENT PERIOD FOR
YOU. YOU WILL HAVE 30 DAYS
FROM THE DATE OF THE EVENT TO
MAKE YOUR BENEFIT ELECTIONS.
THIS EVENT WILL REMAIN PENDED
UNTIL ALL SUPPORTING
DOCUMENTATION HAS BEEN
RECEIVED BY HR OR THE
COMPLETION OF THE 30 DAY
ENROLLMENT WINDOW

[ ⇧ SUBMIT ]                         [ BACK TO WELCOME ]

WORKSCAPE    WELCOME JOHN NEWMAN                          BACK TO WELCOME   HELP   LOGOUT

① TOBACCO USER   ② REVIEW YOUR    ③ MAKE YOUR   ④ REVIEW AND CONFIRM                    FAQ
                    INFORMATION       ELECTIONS      CHANGES                       ENROLLMENT

ANNUAL ENROLLMENT ON 01/01/2010

TOBACCO USER

HAVE YOU OR ANY OF THE DEPENDENTS YOU PLAN TO COVER FOR MEDICAL INSURANCE USED TOBACCO PRODUCTS IN THE LAST 30 DAYS?

USE OF TOBACCO PRODUCTS IS DEFINED AS: USE OF ANY TOBACCO (CIGARS, CIGARETTES, SMOKELESS TOBACCO) MORE THAN ONE TIME PER MONTH

○ YES    ○ NO

⇦ GO BACK TO INTRODUCTION          GO TO REVIEW YOUR INFORMATION ⇨        BACK TO WELCOME

*FIG. 22*

WORKSCAPE   WELCOME JOHN NEWMAN                                    BACK TO WELCOME   HELP  LOGOUT

① TOBACCO USER   ② REVIEW YOUR        ③ MAKE YOUR   ④ REVIEW AND CONFIRM                    FAQ
                    INFORMATION            ELECTIONS      CHANGES                            ENROLLMENT

| REVIEW YOUR CURRENT ELECTIONS | REVIEW YOUR DEPENDENTS | REVIEW YOUR BENEFICIARIES | ANNUAL ENROLLMENT ON 01/01/2010 |

REVIEW YOUR CURRENT ELECTIONS

| EMPLOYEE PAID BENEFITS | CURRENT | FUTURE ELECTIONS | INSTRUCTIONS |
|---|---|---|---|
| MEDICAL | OPTION-COVERAGE LEVEL BLUE CROSS BLUE SHIELD PPO-EMPLOYEE ONLY | OPTION-COVERAGE LEVEL AETNA POS-FAMILY | PLEASE TAKE A MOMENT TO REVIEW YOUR ELECTIONS. THESE WILL BE YOUR BENEFIT COVERAGES AS OF APRIL 1, 2009 UNLESS YOU MAKE A CHANGE. THE LAST DAY TO MAKE CHANGES FOR THE 2010 PLAN YEAR IS MAY 20, 2009 |
| DENTAL | DELTA DMO-EMPLOYEE ONLY | DELTA DMO-EMPLOYEE ONLY | |
| SUPPLEMENTAL LIFE | 1 x ANNUAL SALARY | 1 x ANNUAL SALARY | |
| HEALTHCARE REIMBURSEMENT ACCOUNT | $0.00 ANNUAL CONTRIBUTION | $0.00 ANNUAL CONTRIBUTION | |
| DEPENDENT CARE REIMBURSEMENT ACCOUNT | $0.00 ANNUAL CONTRIBUTION | $0.00 ANNUAL CONTRIBUTION | TO CONFIRM YOUR CURRENT BENEFIT COVERAGES, PLEASE REFER TO YOUR 2009 BENEFITS STATEMENT, MAILED TO YOUR HOME IN MARCH 2009. |
| EMPLOYER PAID BENEFITS | | | |
| SHORT-TERM DISABILITY (STD) | 66 2/3% OF WEEKLY EARNINGS | 66 2/3% OF WEEKLY EARNINGS | |
| LONG-TERM DISABILITY (LTD) | 60% OF MONTHLY EARNINGS | 60% OF MONTHLY EARNINGS | THE LIST PROVIDED HERE INCLUDES BOTH YOUR EMPLOYEE PAID AND EMPLOYER PAID BENEFITS |
| BASIC LIFE INSURANCE | 2 x ANNUAL SALARY | 2 x ANNUAL SALARY | |
| BASIC AD&D INSURANCE | 2 x ANNUAL SALARY | 2 x ANNUAL SALARY | |
| BUSINESS TRAVEL & ACCIDENT | $250000 | $250000 | |

⇐ GO TO SUMMARY            GO TO REVIEW YOUR DEPENDENTS ⇒            BACK TO WELCOME

WORKSCAPE  WELCOME JOHN NEWMAN                                BACK TO WELCOME  HELP  LOGOUT

① TOBACCO USER   ② REVIEW YOUR      ③ MAKE YOUR   ④ REVIEW AND CONFIRM                 FAQ
                   INFORMATION         ELECTIONS       CHANGES                      ENROLLMENT

REVIEW YOUR CURRENT ELECTIONS | REVIEW YOUR DEPENDENTS | REVIEW YOUR BENEFICIARIES   ANNUAL ENROLLMENT
REVIEW YOUR DEPENDENTS                                                                ON 01/01/2010
ADD DEPENDENT INFORMATION

DEPENDENT INFORMATION

INSTRUCTIONS
         FIRST NAME * [                ] ◁ THIS FIELD IS REQUIRED
                                                                        PLEASE NOTE, YOU MAY
          LAST NAME * [                ]                                COVER YOUR CHILD TO
                                                                        AGE 19 UNLESS A FULL
SOCIAL SECURITY NUMBER [              ] (XXXXXXXX)                      TIME STUDENT, THEN TO
                                                                        AGE 23 OR A DISABLED
      DATE OF BIRTH * [              ] (MM/DD/YYYY)                     CHILD OF ANY AGE. THIS
                                                                        APPLIES TO MEDICAL,
           GENDER * ◉ FEMALE  ○ MALE                                    DENTAL, VISION AND
                                                                        DEPENDENT LIFE
     RELATIONSHIP * [ SELECT RELATIONSHIP ▽ ]                           INSURANCE

IS THIS DEPENDENT  ☐ A FULL-TIME STUDENT?  ☐ DISABLED?
                     ☐ IF YOUR DEPENDENT'S ADDRESS IS DIFFERENT FROM YOURS, PLEASE CLICK
                       THE CHECKBOX AND COMPLETE THE ADDRESS INFORMATION BELOW

DEPENDENT ADDRESS

COUNTRY [ UNITED STATES    ]
    ADDRESS LINE 1 [ 123 ANY STREET   ]
    ADDRESS LINE 2 [                  ]
              CITY [ HOLLISTON        ]

WORKSCAPE    WELCOME JOHN NEWMAN                                    BACK TO WELCOME    HELP  LOGOUT

① TOBACCO USER    ② REVIEW YOUR    ③ MAKE YOUR    ④ REVIEW AND CONFIRM                     FAQ
                    INFORMATION      ELECTIONS       CHANGES                          ENROLLMENT

REVIEW YOUR CURRENT ELECTIONS | REVIEW YOUR DEPENDENTS | REVIEW YOUR BENEFICIARIES    ANNUAL ENROLLMENT
                                                                                        ON 01/01/2010
REVIEW YOUR DEPENDENTS

[ ADD A DEPENDENT ]

|         |                  |              |            | DEPENDENT COVERAGE |         |
| ACTIONS | NAME             | RELATIONSHIP | BIRTHDATE  | MEDICAL            | DENTAL  |
| ✏ ⊖    | SAMANTHA NEWMAN  | DAUGHTER     | 01/01/1995 | YES                | NO      |
| ✏ ⊖    | JILL NEWMAN      | SPOUSE       | 05/19/1967 | YES                | NO      |
| ✏ ⊖    | JOHN NEWMAN      | SON          | 11/11/1989 | NO                 | NO      |

INSTRUCTIONS

PLEASE TAKE A
MOMENT TO REVIEW
YOUR DEPENDENTS ON
FILE

TO ADD A DEPENDENT,
CLICK THE "ADD A
DEPENDENT" BUTTON

✏ TO UPDATE EXISTING
   DEPENDENT
   INFORMATION, CLICK
   ON THE EDIT BUTTON
   TO THE LEFT OF THAT
   DEPENDENT

⊖ TO REMOVE A
   DEPENDENT, CLICK
   THE 'REMOVE' BUTTON
   TO THE LEFT OF THAT
   DEPENDENT

[ ⇦ GO TO REVIEW YOUR CURRENT ELECTIONS ]    [ GO TO REVIEW YOUR BENEFICIARIES ⇨ ]    [ CANCEL WITHOUT SAVING ]

*FIG. 27*

WORKSCAPE   WELCOME JOHN NEWMAN                          BACK TO WELCOME  HELP  LOGOUT

① TOBACCO USER  ② REVIEW YOUR   ③ MAKE YOUR  ④ REVIEW AND CONFIRM                  FAQ
                  INFORMATION      ELECTIONS    CHANGES                      ENROLLMENT

REVIEW YOUR CURRENT ELECTIONS | REVIEW YOUR DEPENDENTS | REVIEW YOUR BENEFICIARIES

REVIEW YOUR BENEFICIARIES                                    ANNUAL ENROLLMENT
01/01/2010                                                   ON 01/01/2010

TO ADD A BENEFICIARY, SELECT A BENEFICIARY TYPE (PERSON, TRUST, ESTATE, CHARITY)    INSTRUCTIONS
AND THEN CLICK THE 'ADD BENEFICIARY/ ALLOCATION' BUTTON                              PLEASE TAKE A
                                                                                     MOMENT TO ADD
BENEFICIARY [SELECT BENEFICIARY ▽]  BENEFIT [                ▽]                      YOUR BENEFICIARY
                                                                                     INFORMATION FOR
                                        ADD BENEFICIARY/ALLOCATION                   THE FOLLOWING
ACTIONS  NAME                                                                        INSURANCE BENEFITS:
                                     ◁ ▯▯▯                              ▷
  ⌀  ①  ANN NEWMAN                                                                   • BASIC LIFE INSURANCE
                                        BASIC AD&D        ID       DATE              • ACCIDENTAL DEATH &
                                        INSURANCE         987654321 01/20/1950         DISMEMBERMENT
                                        BASIC LIFE                                     INSURANCE
                                        INSURANCE                                    • SUPPLEMENTAL LIFE
                                        BUSINESS                                       INSURANCE
                                        TRAVEL & AC                                  • BUSINESS TRAVEL &
                                        SUPPLEMENTAL                                   ACCIDENT INSURANCE
                                                              ALLOCATIONS            • 401K

BENEFICIARY         ALLOCATION %             ALLOCATIONS FOR
                                        TYPE                                         EACH BENEFICIARY
ACTIONS  BENEFIT       NAME             [PRIMARY  ▽]       [    100   ] %            TYPE MUST TOTAL
                                                                                     100%
    ①    SUPPLEMENTAL LIFE  ANN NEWMAN      UPDATE ALLOCATIONS

⇐ GO TO REVIEW YOUR DEPENDENTS              GO TO MAKE YOUR ELECTIONS ⇒         BACK TO WELCOME

*FIG. 28*

| WORKSCAPE | WELCOME JOHN NEWMAN | | BACK TO WELCOME  HELP  LOGOUT |
|---|---|---|---|
| ① TOBACCO USER | ② REVIEW YOUR INFORMATION | ③ MAKE YOUR ELECTIONS  ④ REVIEW AND CONFIRM CHANGES | FAQ  ENROLLMENT |

REVIEW YOUR CURRENT ELECTIONS   REVIEW YOUR DEPENDENTS   REVIEW YOUR BENEFICIARIES   ANNUAL ENROLLMENT ON 01/01/2010

REVIEW YOUR BENEFICIARIES

ADD BENEFICIARY INFORMATION

ADD FROM DEPENDENT LIST [ SELECT ▼ ]

BENEFICIARY INFORMATION

FIRST NAME * [          ]
MIDDLE INITIAL [          ]
LAST NAME * [          ]
RELATIONSHIP TO INSURED * [ SELECT RELATIONSHIP ▼ ]
SOCIAL SECURITY NUMBER [          ] (XXXXXXXX)
DATE OF BIRTH * [          ] (MM/DD/YYYY)

BENEFICIARY ADDRESS

COUNTRY * [ UNITED STATES ▼ ]
ADDRESS LINE 1 * [          ]
ADDRESS LINE 2 [          ]
CITY * [          ]
STATE * [ SELECT A STATE ▼ ]
ZIP CODE * [          ]

INSTRUCTIONS

PLEASE ENTER YOUR BENEFICIARY INFORMATION BELOW. IT IS IMPORTANT THAT YOU INDICATE YOUR BENEFICIARY'S FULL NAME, RELATIONSHIP TO YOU, SOCIAL SECURITY NUMBER, AND DATE OF BIRTH

WHEN YOU HAVE FINISHED ENTERING THIS BENEFICIARY'S INFORMATION, CLICK ON THE 'SUBMIT' BUTTON TO SAVE YOUR UPDATES

PLEASE NOTE YOU ARE REQUIRED TO ENTER AN ADDRESS FOR EACH BENEFICIARY

*FIG. 29*

WELCOME | WELCOME JOHN NEWMAN     BACK TO WELCOME   HELP   LOGOUT

WORKSCAPE

① TOBACCO USER   ② REVIEW YOUR INFORMATION   ③ MAKE YOUR ELECTIONS   ④ REVIEW AND CONFIRM CHANGES     FAQ ENROLLMENT

REVIEW YOUR CURRENT ELECTIONS | REVIEW YOUR DEPENDENTS | REVIEW YOUR BENEFICIARIES

REVIEW YOUR BENEFICIARIES

01/01/2010

TO ADD A BENEFICIARY, SELECT A BENEFICIARY TYPE (PERSON, TRUST, ESTATE, CHARITY) AND THEN CLICK THE 'ADD BENEFICIARY/ ALLOCATION' BUTTON

BENEFICIARY [NEW PERSON ▽] [BENEFIT ▽] [ADD BENEFICIARY/ALLOCATION]

| ACTIONS | NAME | RELATIONSHIP | ID | DATE |
|---|---|---|---|---|
| ✎ ⊖ | ANN NEWMAN | MOTHER | 987654321 | 01/20/1950 |

ALLOCATIONS

| ACTIONS | BENEFIT | NAME | BENEFICIARY TYPE | ALLOCATION % |
|---|---|---|---|---|
| ⊖ | SUPPLEMENTAL LIFE | ANN NEWMAN | PRIMARY ▽ UNASSIGNED PRIMARY SECONDARY | 100 % |

[UPDATE ALLOCATIONS]

INSTRUCTIONS

ANNUAL ENROLLMENT ON 01/01/2010

PLEASE TAKE A MOMENT TO ADD YOUR BENEFICIARY INFORMATION FOR THE FOLLOWING INSURANCE BENEFITS:

- BASIC LIFE INSURANCE
- ACCIDENTAL DEATH & DISMEMBERMENT INSURANCE
- SUPPLEMENTAL LIFE INSURANCE
- BUSINESS TRAVEL & ACCIDENT INSURANCE
- 401K

ALLOCATIONS FOR EACH BENEFICIARY TYPE MUST TOTAL 100%

⇐ GO TO REVIEW YOUR DEPENDENTS     GO TO MAKE YOUR ELECTIONS ⇒     CANCEL WITHOUT SAVING

WORKSPACE  WELCOME JOHN NEWMAN  BACK TO WELCOME  HELP  LOGOUT

① REVIEW YOUR  ② MAKE YOUR  ③ REVIEW AND CONFIRM  FAQ
   INFORMATION     ELECTIONS     CHANGES                ENROLLMENT

① TOBACCO USER

| MEDICAL | DENTAL | SUPPLEMENTAL LIFE | FLEXIBLE SPENDING ACCOUNTS | EMPLOYER PAID BENEFITS |

MEDICAL  *3202*
01/01/2009 ⎯⎯⎯⎯⎯⎯⎯⎯⎯⎯⎯⎯⎯⎯⎯⎯⎯⎯⎯⎯ 12/31/9999   ANNUAL ENROLLMENT ON 01/01/2010

BLUE CROSS BLUE SHIELD

OPTION  WHICH OPTION IS RIGHT FOR ME?

|  | EMPLOYEE ONLY | EMPLOYEE PLUS ONE | FAMILY |
|---|---|---|---|
| WAIVE COVERAGE → WAIVER | $0.00 | | |
| BLUE CROSS BLUE SHIELD PPO | $64.00 | $133.00 | $225.00 |
| AETNA POS | $72.00 | $155.00 | $255.00 |
| KAISER HMO (PCP REQUIRED) | $30.00 | $80.00 | $90.00 |

INSTRUCTIONS
MAKE YOUR BENEFIT ELECTION CHOICES BY CLICKING THE BUTTON FOR THE DESIRED PLAN AND COVERAGE LEVEL. THE COVERAGE YOU CURRENTLY HAVE IS INDICATED BY THE GREEN BUTTON

IF YOU SELECT COVERAGE OTHER THAN EMPLOYEE ONLY YOU MUST SPECIFY WHICH DEPENDENTS TO COVER FROM THE LIST BELOW

YOUR DEPENDENTS

| NAME | RELATIONSHIP | BIRTHDATE | INCLUDE IN COVERAGE |
|---|---|---|---|
| NEWMAN, JILL | SPOUSE | 05/19/1967 | ☒ |
| NEWMAN, SAMANTHA | DAUGHTER | 01/01/1995 | ☒ |

BASED ON THE PLAN AND COVERAGE LEVEL YOU HAVE SELECTED, YOU MAY SELECT YOUR ELIGIBLE DEPENDENTS TO COVER AS WELL. PLEASE INDICATE WHICH DEPENDENTS YOU WISH TO COVER

WELLNESS CENTER
HEALTHY YOU
HEALTH RISK ASSESSMENT
COVERAGE ADVISOR

WEBMD

[⇐ GO TO SUMMARY]    [GO TO DENTAL ⇨]    [BACK TO WELCOME]

WORKSCAPE   WELCOME JOHN NEWMAN                                    BACK TO WELCOME  HELP  LOGOUT

① TOBACCO USER  ② REVIEW YOUR   ③ MAKE YOUR    ④ REVIEW AND CONFIRM              FAQ
                   INFORMATION      ELECTIONS       CHANGES                    ENROLLMENT

| MEDICAL | DENTAL | SUPPLEMENTAL LIFE | FLEXIBLE SPENDING ACCOUNTS | EMPLOYER PAID BENEFITS |   ANNUAL ENROLLMENT ON 01/01/2010

SUPPLEMENTAL LIFE
01/01/2009                                            12/31/9999

1 x ANNUAL SALARY                                 BI-WEEKLY COST       ┌─────────────────────────────┐
OPTION                                                                 │ INSTRUCTIONS                │
WAIVE COVERAGE                                        $0.00            │ MAKE YOUR BENEFIT ELECTION CHOICES
                                                                       │ BY CLICKING THE BUTTON FOR THE
1 x ANNUAL SALARY ($175,000.00)   ◯                   $23.42           │ DESIRED PLAN. THE COVERAGE YOU
2 x ANNUAL SALARY ($300,000.00)   ◯           [EOI]   $40.15           │ CURRENTLY HAVE IS INDICATED BY THE
                                                                       │ GREEN BUTTON
                                                                       │
                                                                       │ YOU MAY PURCHASE SUPPLEMENTAL
                                                                       │ LIFE INSURANCE COVERAGE. OPTIONS
                                                                       │ FOR PURCHASING SUPPLEMENTAL LIFE
                                                                       │ INSURANCE ARE:
                                                                       │   * 1 x SALARY
                                                                       │   * 2 x SALARY
                                                                       │   * 3 x SALARY
                                                                       │   * 4 x SALARY
                                                                       │   * 5 x SALARY
                                                                       │
                                                                       │ THE MAXIMUM AMOUNT OF COVERAGE
                                                                       │ AVAILABLE IS $300,000
                                                                       │
                                                                       │ ANY INCREASE IN COVERAGE IS SUBJECT
                                                                       │ TO UNDERWRITING APPROVAL BEFORE
                                                                       │ THE FULL BENEFIT AMOUNT WILL
                                                                       │ BECOME EFFECTIVE. UNDERWRITING
                                                                       └─────────────────────────────┘

⇐ GO TO DENTAL              GO TO FLEXIBLE SPENDING ACCOUNTS ⇒              BACK TO WELCOME

*FIG. 34*

WORKSCAPE    WELCOME JOHN NEWMAN                                    BACK TO WELCOME  HELP  LOGOUT

① TOBACCO USER   ② REVIEW YOUR   ③ MAKE YOUR   ④ REVIEW AND CONFIRM                        FAQ
                    INFORMATION       ELECTIONS        CHANGES                            ENROLLMENT

| MEDICAL | DENTAL | SUPPLEMENTAL LIFE | FLEXIBLE SPENDING ACCOUNTS | EMPLOYER PAID BENEFITS |     ANNUAL ENROLLMENT ON 01/01/2010

SUPPLEMENTAL LIFE
01/01/2009              01/01/2010                          12/31/9999

1 x ANNUAL SALARY          2 x ANNUAL SALARY-SUP2X * PENDING

OPTION                                        BI-WEEKLY COST         INSTRUCTIONS
                                                                     MAKE YOUR BENEFIT ELECTION CHOICES
WAIVE COVERAGE                               ○    $0.00               BY CLICKING THE BUTTON FOR THE
                                                                     DESIRED PLAN. THE COVERAGE YOU
1 x ANNUAL SALARY ($175,000.00)              ○    $23.42              CURRENTLY HAVE IS INDICATED BY THE
                                                                     GREEN BUTTON
2 x ANNUAL SALARY ($300,000.00)              ○  EOI  $40.15
                                                                     YOU MAY PURCHASE SUPPLEMENTAL
                                                                     LIFE INSURANCE COVERAGE. OPTIONS
         SUPPLEMENTAL LIFE 2 x ANNUAL SALARY REQUIRES EVIDENCE OF     FOR PURCHASING SUPPLEMENTAL LIFE
 EOI REQUIRED  INSURABILITY. YOU ARE GUARANTEED SUPPLEMENTAL LIFE 1 x   INSURANCE ARE:
         ANNUAL SALARY                                                   * 1 x SALARY
                                                                         * 2 x SALARY
                                                                         * 3 x SALARY
                                                                         * 4 x SALARY
                                                                         * 5 x SALARY

THE MAXIMUM AMOUNT OF COVERAGE
                                                                     AVAILABLE IS $300,000

ANY INCREASE IN COVERAGE IS SUBJECT
                                                                     TO UNDERWRITING APPROVAL. BEFORE
                                                                     THE FULL BENEFIT AMOUNT WILL
                                                                     BECOME EFFECTIVE. UNDERWRITING

⇦ GO TO DENTAL              GO TO FLEXIBLE SPENDING ACCOUNTS ⇨                    CANCEL WITHOUT SAVING

| WORKSCAPE | WELCOME JOHN NEWMAN | | BACK TO WELCOME  HELP  LOGOUT |
|---|---|---|---|
| ① TOBACCO USER | ② REVIEW YOUR INFORMATION | ③ MAKE YOUR ELECTIONS ④ REVIEW AND CONFIRM CHANGES | FAQ ENROLLMENT |

| MEDICAL | DENTAL | SUPPLEMENTAL LIFE | FLEXIBLE SPENDING ACCOUNTS | EMPLOYER PAID BENEFITS | ANNUAL ENROLLMENT ON 01/01/2010 |

EMPLOYER PAID BENEFITS

EMPLOYER PAID BENEFITS

| BENEFITS | OPTION |
|---|---|
| SHORT-TERM DISABILITY (STD) | 66 2/3% OF WEEKLY EARNINGS |
| LONG-TERM DISABILITY (LTD) | 60% OF MONTHLY EARNINGS |
| BASIC LIFE INSURANCE | 2 x ANNUAL SALARY |
| BASIC AD&D INSURANCE | 2 x ANNUAL SALARY |
| BUSINESS TRAVEL & ACCIDENT INSURANCE | $250000 |
| EMPLOYEE ASSISTANCE PROGRAM | EMPLOYEE AND FAMILY INCLUDING SPOUSE AND DEPENDENTS |

INSTRUCTIONS
THE BENEFITS SHOWN TO THE LEFT ARE PROVIDED BY YOUR COMPANY AT NO COST TO YOU

YOU DO NOT NEED TO MAKE AN ELECTION ON THIS SCREEN

⇐ GO TO FLEXIBLE SPENDING ACCOUNTS       GO TO REVIEW AND CONFIRM CHANGES ⇒       BACK TO WELCOME

*FIG. 37*

WORKSCAPE  WELCOME JOHN NEWMAN  BACK TO WELCOME  HELP  LOGOUT

① TOBACCO USER   ② REVIEW YOUR INFORMATION   ③ MAKE YOUR ELECTIONS   ④ REVIEW AND CONFIRM CHANGES

FAQ ENROLLMENT

01/01/2009 — 01/01/2010 — 12/31/9999

NEW HIRE

ANNUAL ENROLLMENT

REVIEW AND CONFIRM CHANGES
YOUR ELECTIONS

| BENEFIT | OPTION - COVERAGE LEVEL | EFFECTIVE START DATE | PER PAY PERIOD EMPLOYEE COSTS | PER PAY PERIOD EMPLOYER COSTS |
|---|---|---|---|---|
| EMPLOYEE PAID PRE-TAX BENEFITS | | | PRE-TAX | |
| MEDICAL | AETNA POS - FAMILY | 01/01/2010 | $255.00 | $1,020.00 |
| DENTAL | DELTA DMO - EMPLOYEE ONLY | 01/01/2009 | $3.33 | $13.32 |
| HEALTHCARE REIMBURSEMENT ACCOUNT | $0.00 ANNUAL CONTRIBUTION | 01/01/2009 | $0.00 | $0.00 |
| DEPENDENT CARE REIMBURSEMENT ACCOUNT | $0.00 ANNUAL CONTRIBUTION | 01/01/2009 | $0.00 | $0.00 |
| | | TOTAL PRE-TAX COST: | $258.33 | $1,033.32 |
| EMPLOYEE PAID POST-TAX BENEFITS | | | POST-TAX | |
| SUPPLEMENTAL LIFE | 2 x ANNUAL SALARY | 01/01/2010 | $40.15 | $0.00 |
| | | TOTAL POST-TAX COST: | $40.15 | $0.00 |
| EMPLOYER PAID BENEFITS | | | | |
| SHORT-TERM DISABILITY (STD) | 66 2/3% OF WEEKLY EARNINGS | 01/01/2009 | $0.00 | $3.13 |
| LONG-TERM DISABILITY (LTD) | 60% OF MONTHLY EARNINGS | 01/01/2009 | $0.00 | $6.56 |

EOI

⇦ GO BACK TO MAKE YOUR ELECTIONS          FINISH ⇨          CANCEL WITHOUT SAVING

*FIG. 38*

| WORKSCAPE | WELCOME JOHN NEWMAN | | | BACK TO WELCOME HELP LOGOUT |
|---|---|---|---|---|
| ① TOBACCO USER | ② REVIEW YOUR INFORMATION | ③ MAKE YOUR ELECTIONS | ④ REVIEW AND CONFIRM CHANGES | FAQ |

ANNUAL ENROLLMENT ON 01/01/2010

01/01/2009      01/01/2010      12/31/9999

NEW HIRE

REVIEW AND CONFIRM CHANGES

ANNUAL ENROLLMENT

YOUR ELECTIONS

◎ YOU ARE DONE!

PLEASE CLICK THE 'PRINT' BUTTON TO PRINT THIS CONFIRMATION STATEMENT FOR YOUR RECORD    [PRINT]

SUBMITTED ON 09/30/2009 BY JOHN NEWMAN

BASED ON YOUR CHANGES, YOU ARE REQUIRED TO FILL OUT THE FOLLOWING FORMS:    [BACK TO WELCOME]

EVIDENCE OF INSURABILITY FORM (EOI)

HARTFORD EOI PERSONAL HEALTH APPLICATION    DOWNLOAD FORM    [LOGOUT]

| BENEFIT | OPTION - COVERAGE LEVEL | EFFECTIVE START DATE | PER PAY PERIOD EMPLOYEE COSTS PRE-TAX | PER PAY PERIOD EMPLOYER COSTS |
|---|---|---|---|---|
| EMPLOYEE PAID PRE-TAX BENEFITS | | | | |
| MEDICAL | AETNA POS - FAMILY | 01/01/2010 | $255.00 | $1,020.00 |
| DENTAL | DELTA DMO - EMPLOYEE ONLY | 01/01/2009 | $3.33 | $13.32 |
| HEALTHCARE REIMBURSEMENT ACCOUNT | $0.00 ANNUAL CONTRIBUTION | 01/01/2009 | $0.00 | $0.00 |
| DEPENDENT CARE REIMBURSEMENT ACCOUNT | $0.00 ANNUAL CONTRIBUTION | 01/01/2009 | $0.00 | $0.00 |
| TOTAL PRE-TAX COST: | | | $258.33 | $1,033.32 |

WORKSCAPE   WELCOME DAN FORD
HELP  LOGOUT

[HR TOOLS] [WELCOME]

SEARCH
EMPLOYEE SEARCH
EOI SEARCH
EVENT SEARCH
REPORTS
NEW HIRE EMPLOYEES
DEPENDENT AGE OUT
CENSUS
OUTPUT FILE STATISTICS
OUTPUT FILE COUNT
SHOW MORE...
[CREATE A CUSTOM REPORT]
[MANAGE REPORTS >]
PREMIUM REPORTING
PREMIUM BILLING
RESOURCES
COBRA ADMINISTRATION

EMPLOYEE SEARCH

QUICK SEARCH
SEARCH BY NAME, SSN OR EMPLOYEE ID

[                    ]  [SEARCH]

ADVANCED SEARCH
ENTER VALUES IN THE FIELDS BELOW TO FIND ALL EMPLOYEES THAT MATCH ALL YOUR CRITERIA

FIRST NAME: [                    ]

LAST NAME: [                    ]

SSN: [                    ]
EXAMPLE: 999-99-9999, 999999999

EMPLOYEE ID: [                    ]
EXAMPLE: x9999

[SEARCH]

WORKSCAPE  WELCOME DAN FORD                                    BACK TO WELCOME  HELP LOGOUT

EVENT SEARCH

FIRST NAME

LAST NAME

EMPLOYEE
(ORACLE) ID

SSN

STATUS ▷

EVENT
OCCURRED   FROM DATE ▦  TO DATE ▦
DECLARED   FROM DATE ▦  TO DATE ▦

[SEARCH] [CANCEL]

[VIEW]

| NAME | SSN | EMPLOYEE ID | EVENT NAME | EVENT DATE | EVENT STATUS | ENTERED BY | ENTERED ON | EXPIRE DATE |
|------|-----|-------------|------------|------------|--------------|------------|------------|-------------|
|      |     |             |            |            |              |            |            |             |
|      |     |             |            |            |              |            |            |             |
|      |     |             |            |            |              |            |            |             |
|      |     |             |            |            |              |            |            |             |
|      |     |             |            |            |              |            |            |             |
|      |     |             |            |            |              |            |            |             |
|      |     |             |            |            |              |            |            |             |
|      |     |             |            |            |              |            |            |             |
|      |     |             |            |            |              |            |            |             |

*FIG. 44*

| WORKSCAPE | WELCOME DAN FORD | | | BACK TO WELCOME HELP LOGOUT |
|---|---|---|---|---|
| CLOSE REPORT AND GO BACK | | | | |
| ENROLLMENT STATISTICS REPORT | RUN AT 01:28:55 PM | REFRESH NOW | | EXPORT AS: EXCEL |
| FOR DATE RANGE - ANY - \| BENEFIT - ANY BENEFIT \| OPTION - ANY OPTION \| COVERAGE LEVEL - ANY COVERAGE LEVEL \| EVENT - ANY - \| EMPLOYEE STATUS ANY STATUS | | | | |
| DEPARTMENT - ANY - \| DIVISION - ANY - \| CHANGE PARAMETERS | | | | |
| THERE IS NO GROUPING APPLIED. CLICK A COLUMN HEADER TO GROUP | | | | |
| BENEFIT ⊕ | OPTION ⊕ | COVERAGE | NUM ELECTING | % |
| MEDICAL | BUY UP OPTION | EMPLOYEE ONLY | 13 | 1 |
| MEDICAL | BUY UP OPTION | EMPLOYEE PLUS ONE | 45 | 3.3 |
| MEDICAL | BUY UP OPTION | FAMILY | 12 | 0.9 |
| MEDICAL | CORE PLAN | EMPLOYEE ONLY | 10 | 0.7 |
| MEDICAL | CORE PLAN | EMPLOYEE PLUS ONE | 25 | 1.8 |
| MEDICAL | CORE PLAN | FAMILY | 18 | 1.3 |
| MEDICAL | HIGH DEDUCTIBLE OPTION | EMPLOYEE ONLY | 45 | 3.3 |
| MEDICAL | HIGH DEDUCTIBLE OPTION | EMPLOYEE PLUS ONE | 97 | 7.1 |
| MEDICAL | HIGH DEDUCTIBLE OPTION | FAMILY | 147 | 10.8 |
| MEDICAL | NO COVERAGE | (NOT APPLICABLE) | 88 | 6.4 |
| DENTAL | BCBS DMO | EMPLOYEE ONLY | 88 | 6.4 |
| DENTAL | BCBS DMO | FAMILY | 108 | 7.9 |
| DENTAL | DELTA DMO | EMPLOYEE ONLY | 85 | 6.2 |
| DENTAL | DELTA DMO | FAMILY | 72 | 5.3 |
| DENTAL | NO COVERAGE | (NOT APPLICABLE) | 88 | 6.4 |
| SUPPLEMENTAL LIFE | 1 x ANNUAL SALARY | (NOT APPLICABLE) | 103 | 7.5 |

FIG. 45

| WORKSCAPE | WELCOME DAN FORD | | | | | | | | | BACK TO WELCOME  HELP LOGOUT | |
|---|---|---|---|---|---|---|---|---|---|---|---|
| NEW HIRE REPORT  RUN AT 01:29:41 PM  REFRESH NOW | | | | | | | | | | EXPORT AS: EXCEL | |
| HIRE DATE RANGE - ANY - \| LOCATION - ANY - \| DEPARTMENT - ANY - \| COMPANY - ANY - \| DIVISION - ANY - \| UNION - ANY - \|COST CENTER - ANY - \| | | | | | | | | | | | |
| CHANGE PARAMETERS | | | | | | | | | | | |
| NAME | EMPLOYEE ID | DATE OF HIRE | DAYS REMAINING | ELECTION START DATE | ELECTION END DATE | LAST ELECTION DATE | LOCATION | DEPARTMENT | COMPANY | DIVISION | UNION | COST CENTER | EMAIL ADDRESS |
| SIMPSON,J | 2410 | 09/19/2009 | 49 | 09/19/2009 | 11/18/2009 | | LOC-NY | TS | COMPANY | QA | UNION2 | COSTCEN1 | DEV1@ROV... |
| LOPEZ,JOH | 2409 | 09/13/2009 | 43 | 09/13/2009 | 11/12/2009 | | LOC-MA | TS | COMPANY | ENG | UNION1 | COSTCEN1 | DEV1@ROV... |

*FIG. 46*

| WORKSCAPE | WELCOME DAN FORD | | | | | BACK TO WELCOME  HELP  LOGOUT | | |
|---|---|---|---|---|---|---|---|---|
| DEPENDENT AGE OUT REPORT   RUN AT 01:30:17 PM   REFRESH NOW | | | | | | | EXPORT AS: EXCEL | |
| GROUP TYPE ALL DATE RANGE 09/30/2009 - 09/30/2009 FIRST NAME - ANY - LAST NAME - ANY - ID - ANY - BENEFIT ALL OPTION ALL | | | | | | | | |
| LOCATION - ANY - DEPARTMENT - ANY - COMPANY - ANY - DIVISION - ANY - UNION - ANY - COST CENTER - ANY - | | | | | | | | |
| | | | | | | | CHANGE PARAMETERS | |
| DEPENDENTS REACHING MAX STUDENT AGE | | | | | | | | |
| SUBFULLNAME | ID | DEPFULLNAME | AGE | BIRTHDAY | BENEFIT | OPTION | AGEOUTDATE | LOCATION | UNION | EMAILADDRESS |
| | | | | | | | | | | |
| | | | | | | | | | | |
| | | | | | | | | | | |
| | | | | | | | | | | |
| | | | | | | | | | | |
| DEPENDENTS REACHING MAX CHILD AGE | | | | | | | | |
| SUBFULLNAME | ID | DEPFULLNAME | AGE | BIRTHDAY | BENEFIT | OPTION | AGEOUTDATE | LOCATION | UNION | EMAILADDRESS |
| | | | | | | | | | | |
| | | | | | | | | | | |
| | | | | | | | | | | |
| | | | | | | | | | | |

*FIG. 47*

| WORKSCAPE | WELCOME DAN FORD | | | | BACK TO WELCOME  HELP LOGOUT |
|---|---|---|---|---|---|
| DEPENDENT AGE OUT REPORT   RUN AT 01:30:17 PM | | REFRESH NOW | | | EXPORT AS: EXCEL |
| | GROUP TYPE | ALL ▷ | LOCATION | ALL ▷ | |
| | DATE RANGE | SEP30, 2009 - SEP 30, 2009 ▷ | DEPARTMENT | ALL ▷ | |
| | FIRST NAME | | COMPANY | ALL ▷ | |
| | LAST NAME | | DIVISION | ALL ▷ | |
| | ID | ▷ | UNION | ALL ▷ | |
| | BENEFIT | ALL ▷ | COST CENTER | ALL ▷ | |
| | OPTION | ALL ▷ | | | |
| | RUN REPORT   CANCEL | | | | |

| DEPENDENTS REACHING MAX CHILD AGE | | | | | | | | | | |
|---|---|---|---|---|---|---|---|---|---|---|
| SUBFULLNAME ▷ | ID ▷ | DEPFULLNAME ▷ | AGE ▷ | BIRTHDAY ▷ | BENEFIT ▷ | OPTION ▷ | AGEOUTDATE ▷ | LOCATION ▷ | UNION ▷ | EMAILADDRESS ▷ |
| | | | | | | | | | | |
| | | | | | | | | | | |
| | | | | | | | | | | |

*FIG. 48*

| WORKSCAPE | WELCOME DAN FORD | | | BACK TO WELCOME  HELP  LOGOUT |

CENSUS REPORT
-ANY- | CHANGE PARAMETERS

COMPLETED REPORTS

PREVIOUSLY RUN REPORTS ARE SHOWN BELOW. FOR THE FULL LIST OF
ALL COMPLETED REPORTS VISIT THE "COMPLETED REPORT LIST"
SCREEN. AFTER 60 DAYS COMPLETED REPORTS WILL BE PURGED FROM
THE SYSTEM. THOSE REACHING THAT POINT SOON ARE DENOTED WITH
AN ICON BELOW

▨ DOWNLOAD AS EXCEL
⊙ DELETE REPORT

REFRESH LIST

| NAME | DATE RUN | COMPLETED DATE | STATUS | ACTION |
|---|---|---|---|---|
| CENSUS REPORT REPORT_DATE=2009/ 0' | 09/25/2009 02:14:29 PM | | SUBMITTED (NEW) | |
| CENSUS REPORT REPORT_DATE=2009/ 0' | 09/25/2009 02:14:29 PM | 09/25/2009 02:14:35 PM | COMPLETED (NEW) | ▨ ⊙ |
| CENSUS REPORT REPORT_DATE=2009/ 0' | 09/24/2009 07:13:07 AM | 09/24/2009 07:13:12 AM | COMPLETED (NEW) | ▨ ⊙ |

| WORKSCAPE | WELCOME DAN FORD | | | | | BACK TO WELCOME HELP LOGOUT |
|---|---|---|---|---|---|---|
| OUTPUT FILE STATISTICS | RUN AT 01:47:24 PM | REFRESH NOW | | | | EXPORT AS: EXCEL |
| STATEMENT DATE RANGE 09/30/2009 - 09/30/2009 | STATEMENT TYPE - ANY - | FIRST NAME - ANY - | LAST NAME - ANY - | EMPLOYEE ID - ANY - | EMPLOYEE SSN - ANY - | |
| CHANGE PARAMETERS | | | | | | |

| STATEMENT TYPE | ▷ NAME | ▷ EMPLOYEE SSN | ▷ EMPLOYEE ID | ▷ LOT NAME | ▷ EVENT NAME | ▷ COUNTER | ▷ RUN DATE |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

*FIG. 51*

| WORKSCAPE | WELCOME DAN FORD | | | BACK TO WELCOME  HELP  LOGOUT |
|---|---|---|---|---|
| OUTPUT FILE COUNT | RUN AT 01:47:58 PM | REFRESH NOW | | EXPORT AS: EXCEL |
| STATEMENT DATE RANGE 09/30/2009 - 09/30/2009 | | STATEMENT TYPE - ANY - \| CHANGE PARAMETERS | | |
| STATEMENT TYPE | ▷ RUN DATE | ▷ LOT | ▷ COUNT | ▷ |
|  |  |  |  |  |
|  |  |  |  |  |
|  |  |  |  |  |
|  |  |  |  |  |
|  |  |  |  |  |
|  |  |  |  |  |
|  |  |  |  |  |

*FIG. 52*

| WORKSCAPE WELCOME DAN FORD | | BACK TO WELCOME  HELP  LOGOUT |
|---|---|---|
| INPUT FILE SEARCH  RUN AT 01:48:24 PM  REFRESH NOW | | EXPORT AS: EXCEL |
| FILE DATE 09/01/2009 - 09/30/2009 \| INPUT FILE TYPE - ANY - \| CHANGE PARAMETERS | | |
| INPUT FILE TYPE | ▷ START TIME | ▷ END TIME ▷ |
| AURORAINPUTXML | MON SEP 14 21:05:34 GMT+0530 2009 | MON SEP 14 21:05:50 GMT+0530 2009 |
| AURORAINPUTXML | MON SEP 14 20:56:57 GMT+0530 2009 | MON SEP 14 21:00:40 GMT+0530 2009 |
| AURORAINPUTXML | MON SEP 14 21:01:09 GMT+0530 2009 | MON SEP 14 21:01:46 GMT+0530 2009 |

*FIG. 53*

| WORKSCAPE | WELCOME DAN FORD | | | | BACK TO WELCOME  HELP  LOGOUT | |
|---|---|---|---|---|---|---|
| CLOSE REPORT AND GO BACK | | | | | | |
| ENROLLMENT TRANSACTION REPORT  RUN AT 01:48:52 PM  REFRESH NOW | | | | | EXPORT AS: EXCEL | |
| FOR DATE RANGE - ANY -  \|  CHANGE PARAMETERS | | | | | | |
| TOTAL ELIGIBLE | % NOT ENROLLED | % ENROLLED | | % BY WEB | % BY HR/CSR | |
| 50,000 | 55.6% | 44.4% | | 48.4% | 1% | |
| DATE ▷ | LOGGED INTO WEB ▷ | LOGGED INTO HR ADMIN ▷ | ENROLLED VIA WEB ▷ | | ENROLLED VIA HR ADMIN OR CSR ▷ | |
| 2008-11-15 | 12,300 | 200 | 10,000 | | 200 | |
| 2008-11-14 | 15,000 | 270 | 12,000 | | 100 | |
| 2008-11-13 | 22,300 | 210 | 8,900 | | 350 | |
| 2008-11-12 | 42,000 | 350 | 11,680 | | 290 | |
| 2008-11-11 | 18,500 | 210 | 20,800 | | 120 | |
| 2008-11-10 | 29,500 | 85 | 7,500 | | 240 | |
| 2008-11-9 | 9,500 | 320 | 7,800 | | 130 | |
| 2008-11-8 | 7,300 | 3,250 | 6,500 | | 120 | |
| 2008-11-7 | 8,200 | 200 | 7,000 | | 200 | |
| 2008-11-6 | 5,600 | 200 | 4,200 | | 200 | |
| TOTAL | 170,200 | 5,295 | 96,380 | | 1,950 | |

▤ DATA \| ⊠ CHART ⟵ 5404

| WORKSCAPE | WELCOME DAN FORD | | | BACK TO WELCOME HELP LOGOUT | |
|---|---|---|---|---|---|
| CLOSE REPORT AND GO BACK | | | | | |
| BENEFIT ELECTION SUMMARY REPORT | RUN AT 01:50:24 PM | REFRESH NOW | | EXPORT AS: EXCEL | |
| FOR DATE RANGE - ANY - | BENEFIT - ANY - | OPTION - ANY - | COVERAGE LEVEL - ANY - | EVENT - ANY - | EMPLOYEE STATUS - ANY - | DEPARTMENT - ANY - | DIVISION - ANY - |
| CHANGE PARAMETERS | | | | | |

| BENEFIT | OPTION ELECTED | OPTION ID | COVERAGE ELECTED | TOTAL ENROLLED |
|---|---|---|---|---|
| MEDICAL | WAIVE COVERAGE | MED-NONE | (NOT APPLICABLE) | 292 |
| MEDICAL | CORE PLAN | CORE | EMPLOYEE ONLY | 208 |
| MEDICAL | CORE PLAN | CORE | EMPLOYEE PLUS ONE | 298 |
| MEDICAL | CORE PLAN | CORE | FAMILY | 357 |
| MEDICAL | BUY UP OPTION | BUYUP | EMPLOYEE ONLY | 272 |
| MEDICAL | BUY UP OPTION | BUYUP | EMPLOYEE PLUS ONE | 280 |
| MEDICAL | BUY UP OPTION | BUYUP | FAMILY | 308 |
| MEDICAL | HIGH DEDUCTIBLE OPTION | HIGHDEDUCTIBLE | EMPLOYEE ONLY | 365 |
| MEDICAL | HIGH DEDUCTIBLE OPTION | HIGHDEDUCTIBLE | EMPLOYEE PLUS ONE | 390 |
| MEDICAL | HIGH DEDUCTIBLE OPTION | HIGHDEDUCTIBLE | FAMILY | 279 |
| DENTAL | WAIVE COVERAGE | DEN-NONE | (NOT APPLICABLE) | 337 |
| DENTAL | DELTA DMO | DELTA | EMPLOYEE ONLY | 261 |
| DENTAL | DELTA DMO | DELTA | FAMILY | 354 |
| DENTAL | BCBS DMO | BCBSDMO | EMPLOYEE ONLY | 286 |
| DENTAL | BCBS DMO | BCBSDMO | FAMILY | 308 |
| SUPPLEMENTAL LIFE | WAIVE COVERAGE | SUPLIFE-NONE | (NOT APPLICABLE) | 206 |
| SUPPLEMENTAL LIFE | 1x | SUP1x | (NOT APPLICABLE) | 425 |
| SUPPLEMENTAL LIFE | 2x | SUP2x | (NOT APPLICABLE) | 374 |
| SUPPLEMENTAL LIFE | 3x | SUP3x | (NOT APPLICABLE) | 213 |

*FIG. 56*

| WORKSPACE | WELCOME DAN FORD | | BACK TO WELCOME  HELP  LOGOUT |
|---|---|---|---|
| CLOSE REPORT AND GO BACK | | | |
| PLAN MIGRATION REPORT  RUN AT 01:51:07 PM  REFRESH NOW | | | EXPORT AS:  EXCEL |
| MEDICAL | | | |

| CHANGED FROM | CHANGED TO | # EMPLOYEES WHO CHANGED | % OF TOTAL MEDICAL CHANGES |
|---|---|---|---|
| MED-NONE WAIVE COVERAGE | BUYUP BUY UP OPTION | 64 | 7% |
| MED-NONE WAIVE COVERAGE | CORE CORE PLAN | 35 | 4% |
| MED-NONE WAIVE COVERAGE | HIGHDEDUCTIBLE HIGH D | 24 | 2% |
| CORE CORE PLAN | BUYUP BUY U | 19 | 2% |
| CORE CORE PLAN | MED-N WAIVE | 113 | 12% |
| CORE CORE PLAN | HIGHD HIGH D | 127 | 13% |
| BUYUP BUY UP OPTION | CORE CORE | 60 | 6% |
| BUYUP BUY UP OPTION | HIGHD HIGH D | 33 | 3% |
| BUYUP BUY UP OPTION | MED-N WAIVE | 164 | 17% |
| HIGHDEDUCTIBLE HIGH DEDUCTIBLE OPTION | CORE CORE PLAN | 8 | 1% |
| HIGHDEDUCTIBLE HIGH DEDUCTIBLE OPTION | MED-NONE WAIVE COVERAGE | 136 | 14% |
| HIGHDEDUCTIBLE HIGH DEDUCTIBLE OPTION | BUYUP BUY UP OPTION | 193 | 20% |

PLAN MIGRATION DETAILS

ALL EMPLOYEES WHO CHANGED FROM WAIVE COVERAGE TO HIGH DEDUCTIBLE OPTION

| EMPLOYEE ID | NAME |
|---|---|
| EMP0000 | JOHN DOE |
| EMP0001 | JOHN DOE |
| EMP0002 | JOHN DOE |
| EMP0003 | JOHN DOE |
| EMP0004 | JOHN DOE |
| EMP0005 | JOHN DOE |
| EMP0006 | JOHN DOE |

*FIG. 57*

JOHN NEWMAN (2405) | EMPLOYEE PROFILE | SUMMARY | TIMELINE | HELP CLOSE

RECENT ACTIVITY (WITHIN 120 DAYS)    COVERAGE AS OF TODAY    ( FULL COVERAGE TIMELINE > )

ANNUALENROLLMENT
EVENT DATE: 01/01/2010
DECLARED ON: 10/02/2009   [VIEW EVENT DETAILS]

ENROLLMENTLOADEVENT
EVENT DATE: 01/01/2009
DECLARED ON: 10/02/2009   [VIEW EVENT DETAILS]

NEWHIREEVENT
EVENT DATE: 01/01/2009
DECLARED ON: 10/02/2009   [VIEW EVENT DETAILS]

ANNUALENROLLMENT
EVENT DATE: 01/01/2009
DECLARED ON: 10/02/2009   [VIEW EVENT DETAILS]

△ OLDER ACTIVITY    ALL EVENTS | WORK LIFE EVENTS | SYSTEM EVENTS

| BENEFIT | DESCRIPTION | EFFECTIVE DATE |
|---|---|---|
| BASIC AD&D INSURANCE | 2 x ANNUAL SALARY | 01/01/2009 |
| EMPLOYEE ASSISTANCE PROGRAM | EMPLOYEE AND FAMILY INCLUDING SPOUSE AND DEPENDENTS | 01/01/2009 |
| MEDICAL | BLUE CROSS BLUE SHIELD PPO - EMPLOYEE ONLY | 01/01/2009 |
| BASIC LIFE INSURANCE | 2 x ANNUAL SALARY | 01/01/2009 |
| SHORT-TERM DISABILITY (STD) | 66 2/3% OF WEEKLY EARNINGS | 01/01/2009 |
| DENTAL | DELTA DMO - EMPLOYEE ONLY | 01/01/2009 |
| HEALTH CARE REIMBURSEMENT ACCOUNT | 1500 | 01/01/2009 |
| LONG-TERM DISABILITY (LTD) | 60% OF MONTHLY EARNINGS | 01/01/2009 |
| SUPPLEMENTAL LIFE | 1 x ANNUAL SALARY | 01/01/2009 |
| BUSINESS TRAVEL & ACCIDENT INSURANCE | $250000 | 01/01/2009 |
| DEPENDENT CARE REIMBURSEMENT ACCOUNT | 2500 | 01/01/2009 |

*FIG. 61*

JOHN NEWMAN (2405) | EMPLOYEE PROFILE | SUMMARY | TIMELINE | ANNUALENROLLMENT       HELP CLOSE

EVENT              | EVENT DATE   | LAST SUBMITTED ON | STATUS
ANNUALENROLLMENT   | 01/01/2010   | 10/14/2009        | NOTPENDED

ACTIVITY TIMELINE                                    ○ SESSIONS: 2  ○ SUBMISSIONS
10/2/2009                                                              11/3/2009

SUBMISSION DETAILS FOR 10/14/2009 09:02:29 AM
BENEFIT CHANGES MADE       ☐ INCLUDE 6 UNCHANGED BENEFITS

| BENEFIT | CHANGED FROM | CHANGED TO |
|---|---|---|
| DCRA | 0 | 1500 |
| DENTAL | DELTA (EMPLOYEE ONLY) | DELTA (FAMILY) |
| HCRA | 0 | 2000 |
| MEDICAL | BCBS (EMPLOYEE ONLY) | AETNA (EMPLOYEE ONLY) |
| SUPLIFE | 1 x ANNUAL SALARY | 2 x ANNUAL SALARY |
|  |  | ⊙ PENDING DOCUMENTATION |

SESSION DETAILS
START TIMESTAMP     10/14/2009 09:01:26 AM
END TIMESTAMP       10/14/2009 09:02:29 AM
SESSION DURATION    00:01:03
SESSION ACTIVITY    CONFIRMED
                    HR ADMIN  DAN KAUFMAN

*FIG. 62*

JOHN NEWMAN (2405) | EMPLOYEE PROFILE | SUMMARY | TIMELINE | ANNUALENROLLMENT | HELP CLOSE

COVERAGE TIMELINE AS OF: 1/1/2009 ............................................. 12/31/2016
10/14/2009

[+ ADD ITEMS TO TIMELINE] [◉ VIEW BY EVENT]    10/14/2009

▷ NEWHIREEVENT (1/1/2009)
▷ ENROLLMENTLOADEVENT (1/1/2009)
▷ ANNUALENROLLMENT (1/1/2009)
▽ ANNUALENROLLMENT (1/1/2010)

BASICADD
BASICLIFE              01/01/2009 - 12/31/9999
BTA                    BASIC AD&D INSURANCE
✓ DCRA                 2 x ANNUAL SALARY
✓ DENTAL               EFFECTIVE 01/01/2009 - 12/31/9999
EAP                    COST PER PAY PERIOD $0.00
✓ HCRA                 DEFAULTED BY POLICY
LTD                    COM.WORKSCAPE.OBA.POLICY.
✓ MEDICAL              DEFAULTTOFIRSTELIGIBLEPOLICY
STD
✓ SUPLIFE
✓ SUPLIFE

▷ DEPENDENTAGEOUTEVENT (1/1/2015)

*FIG. 63*

WORKSCAPE    WELCOME JOHN SMITH    BACK TO WELCOME  HELP  LOGOUT    FAQ

ANNUAL ENROLLMENT  01/01/2010 ON {1}

1. REVIEW YOUR INFORMATION  2. MAKE YOUR ELECTIONS  3. ENROLLMENT EXPERIENCE  4. REVIEW AND CONFIRM CHANGES

REVIEW YOUR CURRENT ELECTIONS | REVIEW YOUR DEPENDENTS | REVIEW YOUR BENEFICIARIES

REVIEW YOUR DEPENDENTS

PLEASE TAKE A MOMENT TO REVIEW YOUR DEPENDENTS ON FILE
TO ADD A DEPENDENT, CLICK THE "ADD A DEPENDENT" BUTTON

[ADD A DEPENDENT]

| | | | | DEPENDENT COVERAGE | |
|---|---|---|---|---|---|
| ACTIONS | NAME | RELATIONSHIP | BIRTHDATE | MEDICAL | DENTAL |
| ✎ ⊖ | MICHELLE SMITH | SPOUSE | 05/20/1965 | NO | NO |
| ✎ ⊖ | SAMUEL SMITH | SON | 09/12/1986 | NO | NO |
| ✎ ⊖ | SARAH SMITH | DAUGHTER | 09/22/1983 | NO | NO |
| ✎ ⊖ | ROSE SMITH | DAUGHTER | 11/21/1986 | YES | NO |

✎ = VIEW/UPDATE DETAILS    ⊖ = REMOVE DEPENDENT FROM FILE

[← GO TO REVIEW YOUR CURRENT ELECTIONS]    [GO TO REVIEW YOUR BENEFICIARIES →]

[CANCEL WITHOUT SAVING]

SYSTEM INITIATED PENDING STATE AUTHORIZATION IN A BENEFITS ADMINISTRATION DOMAIN MODEL

CROSS-REFERENCE TO RELATED APPLICATIONS

This application is a continuation of U.S. patent application Ser. No. 14/290,466, filed on May 29, 2014, which is hereby incorporated by reference in its entirety; U.S. patent application Ser. No. 14/290,466 is a continuation of U.S. patent application Ser. No. 12/579,985, filed on Oct. 15, 2009, which is hereby incorporated by reference in its entirety; U.S. patent application Ser. No. 12/579,985 claims the benefit of the following provisional applications, each of which is hereby incorporated by reference in its entirety: U.S. Prov. Appl. 61/105,593, filed Oct. 15, 2008 and U.S. Prov. Appl. 61/105,615, filed Oct. 15, 2008.

BACKGROUND

Field

The inventive methods and systems described herein generally relate to human capital management and particularly relate to a scalable platform for enterprise level human capital management including performance, compensation, benefits, and the like.

Description of the Related Art

Human resource management systems must provide support for diverse applications such as compensation planning and execution, performance appraisal and management, alignment of compensation and performance, benefits administration, benefits user self service, and the like. There exists a need for a scalable human resource management system that facilitates the effective application of these services to a wide range of entity sizes, structures, and business processes while ensuring a high degree of configurability and client data separation for use on distributed, networked computing environments.

SUMMARY

In an aspect of the invention, methods and systems comprising a user interface for interacting with the applications in accordance with various embodiments of the present invention are provided. The systems may include a persistence layer for storing a benefits administration domain model; a business logic layer comprising the domain model; a plurality of employee benefits management applications; and a presentation layer comprising a user interface for interacting with the applications. The methods may include storing a benefits administration domain model in a persistence layer of a human capital platform; manipulating domain objects of the domain model with employee benefits management applications; configuring the benefits management applications within a business logic layer of the platform; and presenting a user interface for facilitating user interaction with the applications using a presentation layer of the platform.

In the aspect of the invention, the domain model may comprise domain objects representing employee benefits information. In the aspect of the invention, the domain model may also comprise domain objects representing employee information and employee benefits information.

In the aspect of the invention, the plurality of applications may include an employee benefits enrollment application, an employee beneficiary and dependent maintenance application, an employee life event application, an administration application, an input file application, an output file application, a reporting application, or some other type of application.

In the aspect of the invention, the plurality of applications may also include an employee benefits application. In the aspect of the invention, the employee benefits application may further include employee self-service and administrator self-service.

In the aspect of the invention, the plurality of applications may also include benefit eligibility applications, enrollment applications, or some other type of applications.

In the aspect of the invention, the persistence layer may include a database for storing the benefits administration domain model, synchronization facilities for updating the domain model, and the like. In the aspect of the invention, updating the domain model may include bulk updating of the domain model.

In the aspect of the invention, the persistence layer may also include security for limiting access to the database. In the aspect of the invention, the security may allow a plurality of independently accessible domain models to be stored in the database. In the aspect of the invention, the independently accessible domain models may be stored in separate schemas.

In the aspect of the invention, the user may be an employee, a benefits administrator, or the like.

In the aspect of the invention, the benefits administration applications may include an employee benefits application that includes employee self-service and administrator self-service features that are accessible via the user interface. In the aspect of the invention, the benefits administration applications may also include benefit eligibility applications, enrollment applications, and the like.

In the aspect of the invention, the benefits administration model may be stored in a database that is accessible through the presentation layer.

In the aspect of the invention, the domain model may be updated with synchronization facilities. In the aspect of the invention, updating the domain model may include bulk updating of the domain model.

In an aspect of the invention, methods and systems for a domain model comprising a plurality of objects in accordance with various embodiments of the present invention are provided. The aspect may include providing a domain model comprising a plurality of objects containing employee and employee benefits information and dynamically adjusting, with a processor, the plurality of objects using the transaction information in each object to reproduce a state of the domain model as it existed when any one of the transactions was applied. In the aspect of the invention, each of the plurality of objects containing employee and employee benefits information may contain data describing all state changes of the object and all transactions applied to the object.

The aspect may further include separating effective dates from the domain model to facilitate the objects dynamically adjusting to operate with properties and associations in effect as of an effective date. In the aspect of the invention, the effective date may be a date range. Embodiments may further include responding to a query of the domain model with the processor by retrieving data from at least one version of at least one of the plurality of objects that is indicated by the effective date; dynamically adjusting the plurality of objects based on an effective date; responding to a query of the domain model with the processor by retrieving data from at least one version of at least one of the plurality of objects that is indicated by the reproduced state of the domain model; and responding to a query of the domain model with the processor by retrieving data from at least one version of at least one of the plurality of objects that is indicated by an effective date.

In an aspect of the invention, methods and systems for an effective dated domain model comprising a plurality of effective dated objects in accordance with various embodiments of the present invention are provided. The aspect may include providing a domain model comprising a plurality of effective dated objects containing employee and employee benefits information and dynamically adjusting, with a processor, the plurality of objects using the transaction information in each object to reproduce a state of the domain model as it existed when any one of the transactions was applied. The aspect may include each of the plurality of objects containing employee and employee benefits information may contain data describing all state changes of the object and all transactions applied to the object. The aspect may include separating effective dates from the domain model to facilitate the objects dynamically adjusting to operate with properties and associations in effect as of an effective date. In the aspect, the effective date may be a date range. The aspect may further include responding to a query of the domain model with the processor by retrieving data from at least one version of at least one of the plurality of objects that is indicated by the effective date; responding to a query of the domain model with the processor by retrieving data from at least one version of at least one of the plurality of objects that is indicated by the reproduced state of the domain model; and responding to a query of the domain model with the processor by retrieving data from at least one version of at least one of the plurality of objects that is indicated by an effective date.

In an aspect of the invention, methods and systems for an effective dated domain model comprising a plurality of effective dated objects in accordance with various embodiments of the present invention are provided. The aspect may include providing a domain model comprising a plurality of effective dated objects containing employee and employee benefits information, wherein each of the plurality of objects may contain data describing all state changes of the object and all transactions applied to the object; receiving a query of the domain model that references an effective date; and dynamically adjusting, with a processor, the plurality of objects using the transaction information in each object to reproduce a state of the domain model as it existed on the effective date. The aspect may include responding to the query by retrieving data from at least one version of at least one of the plurality of objects that is indicated by the reproduced state of the domain model. The aspect may include separating effective dates from the domain model to facilitate the objects dynamically adjusting to operate with properties and associations in effect as of an effective date. In the aspect, the effective date may be a date range.

In an aspect of the invention, methods and systems for applying a change to an effective dated domain model in accordance with various embodiments of the present invention are provided. The aspect may include accessing a domain model to acquire a current version of a domain object containing employee and employee benefits information; determining an effective start date for a change of a portion of the domain object, the domain object being associated with a current generation; creating a new generation of the domain object that includes a copy of the current generation; creating a new version of the domain object within the new generation based on a current version; and allocating the effective start date to the new version.

In the aspect of the invention, methods may further include storing the new generation with a processor in a human resources management database.

In an aspect of the invention, methods and systems for supporting a pending state in a domain model in accordance with various embodiments of the present invention are provided. The aspect may include providing a domain model comprising a plurality of objects containing employee and employee benefits information and dynamically adjusting, with a processor, the plurality of objects using the pending state in each object to produce a state of the domain model that includes the pending state based on the business application context. In the aspect of the invention, each of the plurality of objects containing employee and employee benefits information may reflect a pending state of the object based on a business application context.

In the aspect of the invention, the pending state may be accessible to the processor in a pending delegate of the object. In the aspect of the invention, the pending delegate may only be accessible through the object.

The aspect may also include configuring a pending state of a domain model; receiving a change to an employee benefits data item in a domain object of the domain model that requires authorization; using a processor to create a pending delegate of the domain object; and accessing the data item in the pending delegate.

In the aspect of the invention, accessing the data item in the pending delegate may include accessing the pending delegate through the domain object and may be achieved only through the domain object. In the aspect of the invention, creating the pending state may be based on the configuration of the pending state and may include employee and employee benefit data.

In the aspect of the invention, the aspect may include configuring a pending state of a domain model; determining a change to benefits data accessible in a domain object of the domain model that requires authorization; using a processor to create a pending delegate of the domain object; and accessing the data item in the pending delegate.

In the aspect of the invention, accessing the data item in the pending delegate may include accessing the pending delegate through the domain object and may be achieved only through the domain object. In the aspect of the invention, creating the pending state may be based on the configuration of the pending state.

In an aspect of the invention, methods and systems for benefits selection in accordance with various embodiments of the present invention are provided. The aspect may include taking an employee benefits domain model comprising a hierarchical set of benefits eligibility criteria and a plurality of domain objects representing employee attributes; using a processor to receive an employee identifier and access the domain model to retrieve attributes of the employee; presenting a first selection of benefits to the employee based on a comparison of the employee attributes with the benefits eligibility criteria; receiving a benefits selection from the employee; and presenting a second selection of benefits to the employee based on the comparison and the selection.

In the aspect of the invention, accessing the domain model may be based on a target date. In the aspect of the invention, the plurality of domain objects may be effective dated. In the aspect of the invention, the attributes retrieved may be associated with a domain object version that has an effective from date less than the target date and an effective to date greater than the target date. In the aspect, the attributes retrieved are retrieved from a domain object version that includes the target date within an effective date range of the object version.

In an aspect of the invention, methods and systems for repairing employee benefits data in a benefits administration management domain model in accordance with various embodiments of the present invention are provided. The aspect may include receiving a change related to an employee benefit; modifying a domain object representing the employee benefit; calculating with a processor an impact on portions of the domain model that include a state of the employee benefit; and updating the domain model so that the state of the employee benefit is adjusted based on the impact.

In the aspect of the invention, the domain object may be an effective dated domain object. In the aspect of the invention, the state of the employee benefit may be associated with an effective date of the effective dated domain object.

In the aspect of the invention, the state may be a future state relative to a target date, a past state relative to a target date, or the like.

In the aspect of the invention, the change related to an employee benefit may be a change in rules, a change in employee indicative data, or any other change. In the aspect of the invention, employee indicative data may include one or more of an employee residential address, an employee zip code, and a union membership.

In the aspect of the invention, the change related to an employee benefit may also be a newly declared event.

In the aspect of the invention, calculating the impact may be based on the received change, on the received change and the state, or on some other factor.

In the aspect of the invention, the state may be a pending state of a domain object. In the aspect of the invention, the pending state may be captured in a pending delegate.

In the aspect of the invention, the state may be associated with an effective dated domain object. In the aspect of the invention, updating may include recording updates in a domain object version.

In the aspect of the invention, the domain model may comprise effective dated domain objects.

In an aspect of the invention, methods and systems for repairing employee benefits data in a benefits administration management domain model in accordance with various embodiments of the present invention are provided. The aspect may include receiving a change related to an employee benefit; calculating with a processor an impact on portions of the domain model that include a first state of the employee benefit; calculating with a processor an impact on portions of the domain model that include a second state of the employee benefit; and updating the domain model so that the employee benefit is adjusted based on the impact.

In the aspect of the invention, updating the domain model may include modifying a domain object representing the first or second state of the employee benefit.

In the aspect of the invention, the change related to an employee benefit may be a change in rules, a change in employee indicative data, or any other change. In the aspect of the invention, employee indicative data may include one or more of an employee residential address, an employee zip code, and a union membership.

In the aspect of the invention, the change related to an employee benefit may also be a newly declared event.

In the aspect of the invention, calculating the impact may be based on the received change, on the received change and at least one of the first state and the second state, or on some other factor.

In the aspect of the invention, the state may be a pending state of a domain object. In the aspect of the invention, the pending state may be captured in a pending delegate.

In the aspect of the invention, the state may be associated with an effective dated domain object. In the aspect of the invention, updating may include recording updates in a domain object version.

In the aspect of the invention, the domain model may comprise effective dated domain objects.

In an aspect of the invention, methods and systems for interacting with a benefits administration platform in accordance with various embodiments of the present invention are provided. The aspect may include transmitting benefits information from a server to a remote computing facility over a network; presenting the benefits information to a user in a user interface using the computing facility; receiving a response to the benefits information from the user using the computing facility; transmitting the response to the server; computing changes to the benefits information based on the response; and updating a server-accessible domain model of the benefits based on the computed changes. The aspect may further include transmitting the changes to the computing facility.

In the aspect of the invention, transmitting the benefits information from the server to the remote computing facility may include retrieving the benefits information from the domain model. In the aspect of the invention, retrieving the benefits information may be based on a user identifier provided from the web browser.

In the aspect of the invention, the user interface may run using ADOBE FLASH technology, the user interface may be built using ADOBE FLEX technology, and the user may be a benefits subscriber. In the aspect of the invention, the benefits information may include one or more of: employee profile data, beneficiary data; dependent data; benefit election data; benefit-related event data; employee health data; medical benefits; dental benefits; life insurance benefits; flexible spending account data; and employer paid benefits. In the aspect of the invention, the benefits subscriber may be an employee. In the aspect of the invention, the response may impact one or more of: employee profile data, beneficiary data; dependent data; benefit election data; benefit-related event data; employee health data; medical benefits; dental benefits; life insurance benefits; flexible spending account data; and employer paid benefits.

In the aspect of the invention, the user may be a benefits administrator. In the aspect of the invention, the benefits information may include one or more of: enrollment transaction trends; new hire enrollment data; employee search; event search; enrollment status; dependent age data; census data; benefit election data; medical benefit data; billing data; event timeline data; and employee attribute timeline data. In the aspect of the invention, the response may impact one or more of: employee profile data, beneficiary data; dependent data; benefit election data; benefit-related event data; employee health data; medical benefits; dental benefits; life insurance benefits; flexible spending account data; and employer paid benefits.

In the aspect of the invention, the user interface may display an events timeline.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 2 depicts an architecture view of the platform.

FIG. 10 depicts a welcome screen of the benefits administration system.

FIG. 11 depicts an employee profile screen.

FIG. 12 depicts a beneficiary maintenance screen.

FIG. 13 depicts a dependent maintenance screen.

FIG. 16 depicts a voluntary programs screen.

FIG. 17 depicts a screen for common forms.

FIG. 18 depicts a current benefits screen.

FIG. 19 depicts a screen for declaring a life event.

FIG. 20 depicts a screen with duly filed information for a life event declaration.

FIG. 21 depicts a welcome screen for enrollment.

FIG. 22 depicts a screen for indicating tobacco usage

FIG. 23 depicts a screen for reviewing the current enrollment.

FIG. 24 depicts a screen for reviewing dependent information.

FIG. 25 depicts a screen for adding a dependent.

FIG. 26 depicts a screen illustrating input data validation

FIG. 27 depicts a screen showing added dependents.

FIG. 28 depicts a beneficiary review screen.

FIG. 29 depicts a screen for adding beneficiary information.

FIG. 30 depicts a screen for assigning an allocation to a beneficiary.

FIG. 31 depicts a screen for making an election for one benefit.

FIG. 32 depicts a screen for electing medical benefits.

FIG. 33 depicts a timeline change upon election of a coverage level.

FIG. 34 depicts a selection page for supplemental life insurance.

FIG. 35 depicts a pending change to supplemental life insurance.

FIG. 36 depicts a flexible spending account election screen.

FIG. 37 depicts an employer paid benefits page.

FIG. 38 depicts a review and confirm changes page.

FIG. 39 depicts a benefit confirmation screen

FIG. 40 depicts returning to the welcome screen with a new pending life event listed for approval.

FIG. 41 depicts various tools available to the administrator.

FIG. 42 depicts various tools available to the administrator, and a screen for conducting an employee search.

FIGS. 43a, 43b, 43c, and 43d depict an administrator evidence of insurability search.

FIG. 44 depicts an administrator screen for an event search.

FIG. 45 depicts an administrator enrollment statistics report.

FIG. 46 depicts an administrator new hire report.

FIG. 47 depicts an administrator dependent age out report.

FIG. 48 depicts an administrator dependent age out report filtered according to particular criteria.

FIG. 49 depicts the status of queued census reports.

FIG. 50 depicts a customization interface for creating an administrator census report.

FIG. 51 depicts an administrator output file statistics report.

FIG. 52 depicts an administrator output file count report.

FIG. 53 depicts an administrator report for input file search.

FIG. 54 depicts an administrator enrollment transaction report.

FIG. 56 depicts an administrator benefit election summary report.

FIG. 57 depicts an administrator plan migration report.

FIG. 61 depicts an audit screen of all transaction, events, and elections for a subscriber.

FIG. 62 depicts election changes that occurred at a particular event.

FIG. 63 depicts an audit timeline view

FIG. 64 depicts a screen for annual enrollment.

DETAILED DESCRIPTION

Figure 1:
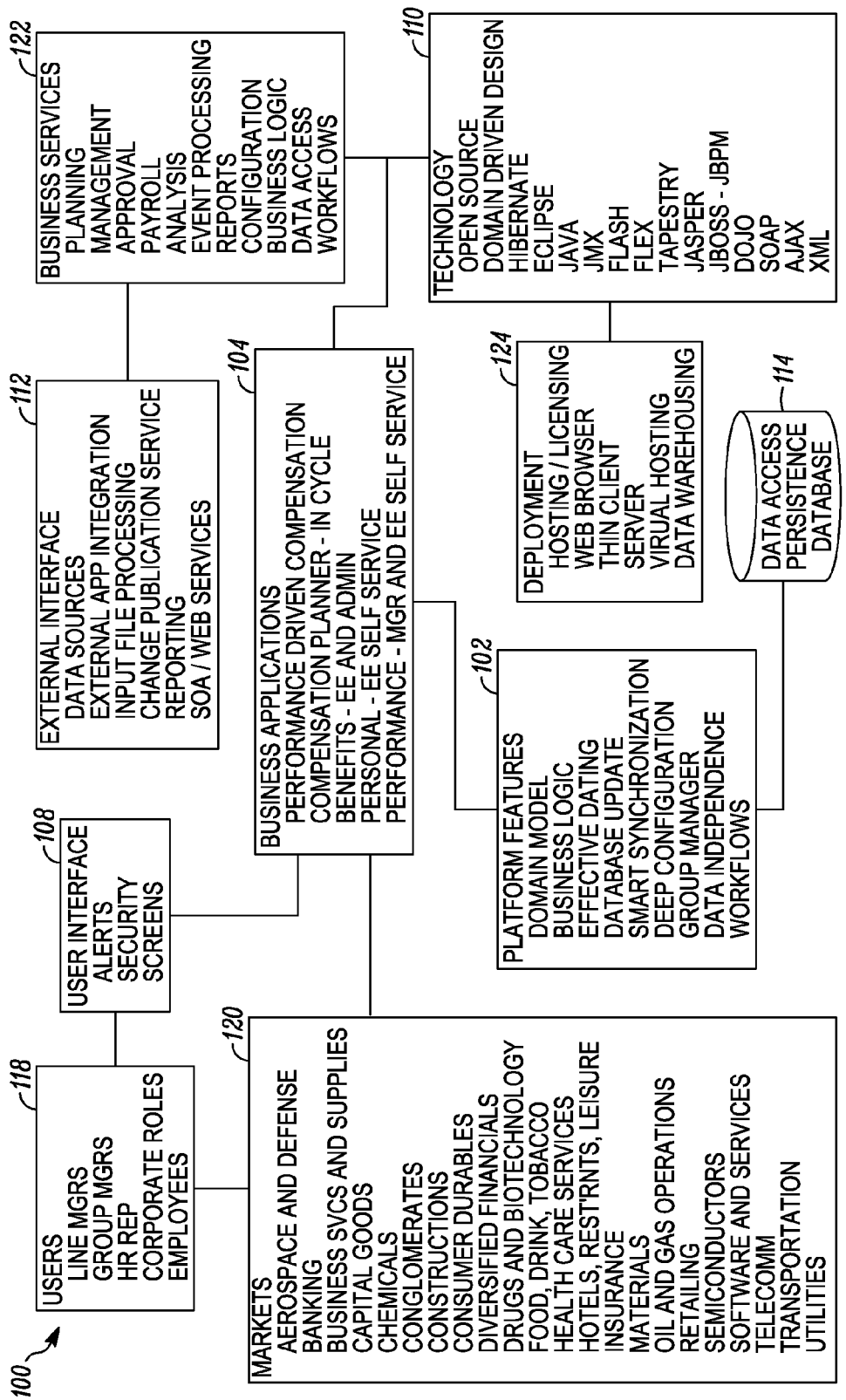
FIG. 1 depicts diverse elements of a human resource management platform.

A human resource management platform may include a centralized domain model where application logic comes together in one place; a deep and mature configuration model that provides extensive configurability; a unique design for groups and hierarchies that facilitates leveraging them for natural and efficient rule distribution; smart synchronization features to facilitate loading bulk data and recomputing ramifications of changes detected in the data; data independence and pending world features that allow the platform to maintain independent data sets pertaining to the same core entity or organization concurrently while allowing a wide range of data update options; an effective dating framework that may facilitate accurately maintaining chronological states of the platform and its associated data in the past, present, and future at the same time; high-performance, scalable, and enterprise-class support; and many other features and capabilities as described herein.

The platform may include domain driven design features that may be well suited to a scalable product family that can be readily tailored to a variety of client needs. Business logic may be centrally located in the domain model, which may form an object-oriented backbone to the platform.

The platform may include a deep configuration model that may provide rich model-based configuration capabilities that can be prepared externally and loaded into the platform to handle a wide range of requirements from clients. The configuration model may include configuring values, structures, scripted functionality, and the like.

The platform may provide a rich user experience through an intuitive and interactive user interface that is centered on the user's experience, using a combination of textual and graphical means to present information relevant to the user's job.

The platform may be scalable to support any size population and feature set from very small to very large. The platform may support deployments of 400,000 users or more. Feature sets may be expanded to meet requirements that fall outside the bounds of the deep configuration model capabilities.

Applications in human resource management must have high volume file processing capabilities. Information for which a client is the system of record may be regularly loaded through full file processing, and information derived within the platform 100 must be sent to various parties in formats that they require. Therefore, the platform may be open to integration with other systems and facilities in areas such as specialized decision support tools, supplying data feeds, receiving data, and the like. Integration may be provided through front and back end integration points, flexible input and output file mapping capabilities, and the like.

The platform 100 may support third party integration to facilitate bringing together the best content and user experience to solve human resource management challenges. The platform 100 may present several mechanisms for integrating third parties into the system, providing a seamless experience to the end user, including—linking to remote content—a user interface can be easily tailored to provide context-sensitive links to content provided by a client or third party; accessing local content—certain content may be accessed from within a firewall or through a server, such as for security purposes. The user interface can be tailored with internal content links to provide internal content; consuming web services—the platform 100 contains web service integration support that enables applications to consume web services from third parties. In an example, users may be directed to third party control, with connections initiated and results obtained through web services; publishing web services—third party tools may also use portions of application functionality provided by web services that can be published by the platform 100 or by a provider of the platform 100. In an example, publishing web services may be used for real-time data synchronization by clients or for information queries and updates by internal tools; data import and export—the platform 100 may support batch loading of full updated files from clients, and export of files formatted for specific recipients.

Because human capital management operation can be very complex, with a variety of special cases, and seemingly ad hoc rules that must be followed, users may be subjected to software in this space that reflects that complexity in its user interfaces and support requirements. In contrast, the platform is designed to control substantially all of the complexity through a high degree of automation for client feature development, production code generation, specialized tools creation, and product build and deployment processes.

Referring to FIG. 1 which depicts various elements that may be associated with embodiments of the human resource management platform 100, platform features 102 may include a domain model that may include business logic, an effective dating framework, database update or synchronization capabilities, smart synchronization facilities for updating data and the domain model in the database with enterprise business system data, deep configuration features, group manager features, data independence functionality, workflows, and the like. The platform 100 may also be associated with business applications 104 such as performance driven compensation applications, compensation planning applications that supports both in-cycle (focal) and out-of-cycle planning, benefits applications that can be used by employees, human resource administrators, and third parties, employee and manager self service applications, performance planning, appraisal, and feedback applications that support input from employees, co-workers, and managers, and other business applications as may be described herein or may be envisioned or needed for effective use of the human resource management platform. The platform 100 may be associated with a user interface that may provide alert capabilities, access security, and a wide variety of user interface screens, such as those associated with each of the business applications 104. The platform 100 maybe associated with various technologies 110 that may be used for development, deployment, operation, maintenance, upgrade, and the like. Platform technologies 110 may include open source software, domain driven design, JBOSS HIBERNATE, ECLIPSE, JAVA, JMX, ADOBE FLASH, ADOBE FLEX, TAPESTRY, JASPER, DOJO, SOAP, AJAX, XML, and the like. The platform 100 may be associated with and support external interfaces 112 such as business system data sources, external application linking and integration, web services, input file processing and compliance checking, change publication services, reporting, and the like. The platform 100 may include or be associated with one or more databases 114 that may provide persistence of data and access to input data and derived data including the domain model. The platform 100 may be associated with users 118 that may include line managers, group managers, human resource administrators, various other corporate roles, information technology specialists, employees, third parties, and the like. The platform 100 may be deployable in a wide variety of markets 120, some of which may include large entities. Markets may include aerospace and defense, banking, business services, capital goods, chemicals, conglomerates, construction, consumer goods, diversified financials, drugs and bio technologies, food, beverage, and tobacco businesses, health care, hotel service, travel and leisure services, insurance, materials, oil and gas production and distribution, retailing, semiconductors, telecommunications, transportation, utilities, and the like. The platform 100 may be associated with and may beneficially support business services 122 such as planning, management, financial approval, payroll, employee-related analysis, event processing, reporting requirements, business system configuration, business logic realization, secure employee data access, workflows, and the like. The platform 100 may also be associated with deployment 124 that may facilitate hosting, licensing, web browser integration, thin client deployment, server-based deployment, virtual computing, virtual data warehousing, and the like.

Referring to FIG. 2, a functionality view of the platform 100, the platform 100 may include a presentation layer 202, a business logic layer 204, and a persistence layer 208. The presentation layer 202 may facilitate user access through a web-based interface that may be almost entirely implemented in ADOBE FLEX, running in the user's web browser, and communicating to a platform server through an SSL connection. The user may interact with the platform 100 over a secure connection, and may be authenticated via single sign-on to use the platform either through a third party security portal or through a login screen associated with the platform 100. Functionality and visibility to certain data may be restricted from the user due to platform 100 authorization rules. Administrators may get access to additional functionality and visibility of additional data, which may include access to workflow results, historical and auditing information. Other portions of the platform may provide services to the presentation layer 202 through which users access the services and functionality of the platform 100. The presentation layer 202 may also include HTML capabilities, provide support for a reporting mechanism (e.g. Jasper reporting or other equivalent reporting mechanisms), provide PDF formatted documents, and the like.

The platform 100 may provide a business logic layer 204 that generally can be understood to be a middle tier in the product architecture where substantially all of the application logic is disposed. A rich object model, which may be stored on a server, interacts with the presentation layer 202, computes implications of data input to the platform, and may store itself in a database that may be part of a persistence layer 208. Configuration loaded into the platform creates and modifies objects, and web services may be published or consumed to provide a communication path with the model to outside partners. Application components build on this model, adding capabilities such as succession, performance, compensation, benefits administration, and the like.

The platform 100 may provide a persistence layer 208 that may be largely automated in the platform, with an object-relational mapping strategy for synchronizing a database and an in-memory model using database synchronization software such as JBoss Hibernate. As described herein, the platform may include an effective dating framework that may be automated with this layer. The database that is accessed through the persistence layer 208 may contain no business logic so that it can provide a fast storage and query response for objects in the model. The persistence layer 208 may include denormalized representations of portions of the database to support analytics, reporting, and the like. The persistence layer 208 also implements some security aspects and provides a basis for fast data loading and separation of data sets.

The human resource management platform 100 may provide facilities for updating the object model and database based on data received from external business systems, such as financial, organizational, legal, and the like. Generally, human resource management systems rely on data captured and managed in external business systems that may be used for strategic and operational purposes by businesses. External data may include insurance, benefit programs, and the like from third parties. The platform 100 provides smart synchronization facilities that enable bulk loading of data from these systems on a regular basis while providing rules driven, time efficient automatic updating of the data and model content used by the platform 100. Smart synchronization may support various computing environments, such as parallel processing or distributed computing architectures to benefit updating data in deployments of the platform in large organizations (e.g. utility companies with more than one hundred thousand employees, large numbers of transactions, and the like).

Figure 3:
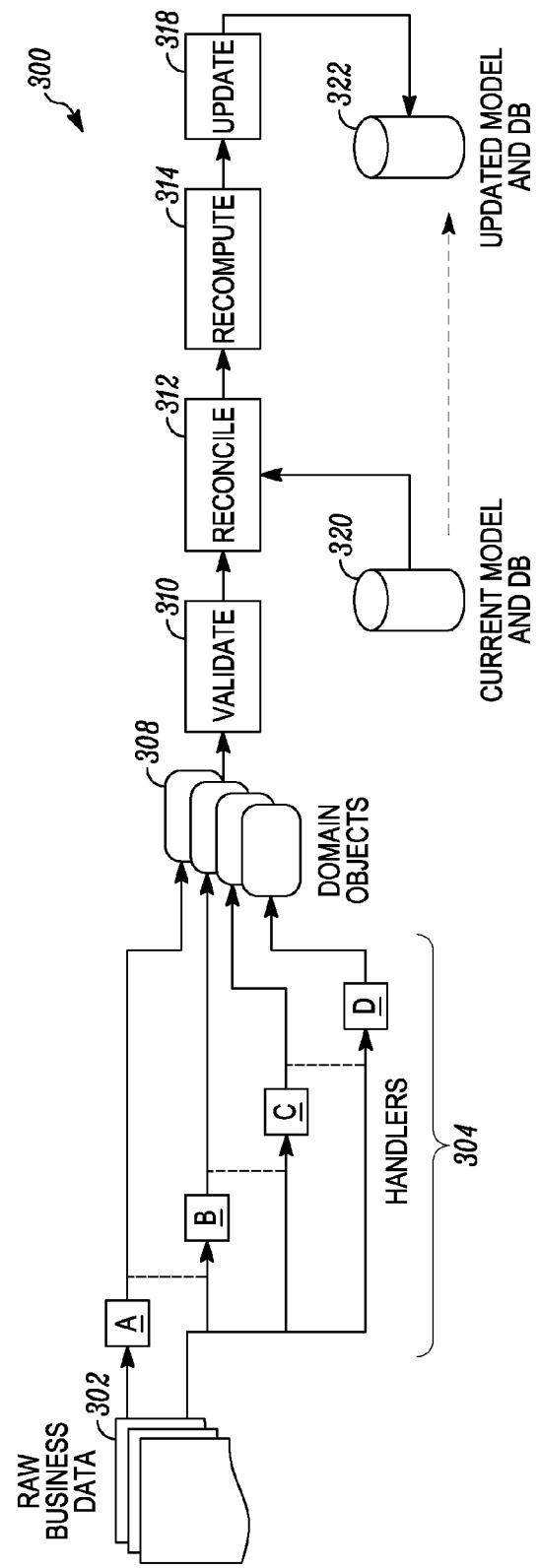
FIG. 3 depicts smart synchronization aspects of the platform.

Referring to FIG. 3, which depicts a smart synchronization facility 300 of the platform 100, bulk loading of data may benefit the various business applications supported by the platform 100 such as performance driven compensation and benefits administration. Smart synchronization 300 may provide capabilities to bring the bulk data into the platform 100 rapidly and upload the model/database quickly. Smart synchronization 300 also supports data that is effective dated and may support receiving data in industry standard formats (HRXML and other consortium formats). Although data received and processed through smart synchronization 300 eventually results in a database update, changes are applied to the object model and the updated object model elements are persisted in the database through a bulk database update process.

The smart synchronization facilities 300 may be designed as a pipeline architecture with a series of transformations that convert raw business data 302 into object data 308 using handlers 304. The object data 308 is validated for errors and the like (e.g. raw data 302 contains 200 job descriptions, yet the current model holds 10,000 job descriptions). The validated object data is then reconciled 312 with the current model data 320 to determine differences, such as changes in salary, new employees, new jobs, organizational changes, and the like. The changes may be provided to a recomputation engine 314 that recomputes all derived model data, taking into consideration the changes provided by the reconcile process 312. As the object data in the model is updated through the recomputation process 314, it may be organized into groups of like database transactions to improve the efficiency of these updates. In an example, if an organization of 7,000 employees is moved in an organizational hierarchy, the hierarchy link of each of these employees may be grouped and forwarded to the database update engine 318 to improve the efficiency of the update. When all derived model data is recomputed through the recomputation engine 314 and the model data is persisted in the database through the update facility 318, the object model and database now references the updated model and database 322.

Portions of smart synchronization 300 may be implemented as a pipeline to support operation on separate processors, servers, and the like. This may be facilitated by the inherent separation of employee data. While the types of data required for each employee may be the same, the information is very unique and can be processed independently. Similarly, although data and formulas for processing data for a business application such as performance driven compensation may be different when compared to processing data for benefits administration, the main smart synchronization steps and algorithms may be the same. Smart synchronization 300 may be similar to and/or may be used to implement coverage repair in a benefits administration business application. This is further described in the benefits administration application specification.

Smart synchronization 300 may also be embodied as a rules engine that allows a company to decide how data in the platform 100 reacts to changes in the data that is sent into the platform 100 on a regular basis such as from various other business systems.

Smart synchronization 300 may operate in parallel on any plurality of instances of the current model 320 as may be required with data independence described herein elsewhere.

Smart synchronization 300 also supports a full audit trail of all changes made, which may be important for regulatory compliance and other change verification processes.

Because smart synchronization 300 recomputes all derived data, planned changes that are recorded in the platform 100 and are not yet effective in the current model 320, but will be effective at a future point in time, if a data item that impacts these planned changes is received, the computations that affect the planned change will automatically be executed. In an example, if a manager has entered plans for merit increases for eight of her employees and the external business data indicates that one of these employees is to be transferred to another manager before the merit increase is to be effective, smart synchronization 300 will detect this employee change and compute the data necessary to support the planned employee transfer and the planned merit increases. Changes may include: moving an employee compensation budget from the first manager to the second manager; ensuring that any pending authorization workflows for the merit increase are moved to the role responsible for authorizing merit increases for the second manager; adjusting other aspects of the employee compensation (e.g. bonus) based on the department rules of the second manager, and the like. In this way, the updated model 322 reflects these planned changes so that each manager can see how the planned changes will impact their departments in the future.

Recomputation of derived data may be required because all of the budgets, guidelines, workflows, and the like may be configured into the platform 100 but may not be inherent in the external business systems. Therefore, any given change made outside the platform 100 (ex: an employee is hired, transferred, fired, quits, etc) and input to the platform 100 for synchronization has no way of knowing what the downstream impact to other parts of the platform 100 will be. This automatic recomputation allows managers and administrators to focus on the business of the specific change (dealing with an employee resignation) rather than the complexities of the impact of the change to the platform 100.

Smart synchronization 300 may include separating external business data 302 into separate files or categories of data, such as data that relates to jobs, salary, employees, groups, workflow approvers, and the like. Alternatively the data may already be separated into individual files, such as a job file, an employee file, and the like. Each file or category of data may be processed separately, which may further improve the efficiency of the synchronization process.

The reconcile process 312 may infer a deletion or a change of an item based on a comparison of the raw business data 302 and the current model 320. Using an example of a job description, the reconciliation process 312 may compare each existing job with the jobs in the job data input file; determine what is new, what has changed, and what has been removed. In this example each job may be assigned a unique identifier. If the unique identifier in the input data 302 matches to a job in the current model 320, then reconciliation 312 determines if the job data has changed by comparing the input job data to the current model job data. If the unique identifier in the input data 302 does not exist in the current model 320, the input data job is flagged as a new job to be added during the recomputation process 314. If one or more unique job identifiers in the current model 320 is not found in the input data, then these jobs in the current model 320 are tagged as to be deleted. The job is not directly deleted because it may be used or referenced elsewhere in the platform 100. Although the platform 100 does not receive a 'delete job' action, smart synchronization 300 infers that an entry in the platform 100 that is not included in the current job input file is to be removed. An item that is tagged to be deleted may result in the recompute process 314 archiving the job to ensure proper traceability for regulatory and governance compliance.

The platform 100 is scalable to facilitate support of entities with very high employee counts. Entities with upwards of 400,000 employees can be supported by the platform 100. Smart synchronization 300 facilitates scalability through memory management techniques that may include using caching and pagination to perform the synchronization process on large model elements with a reasonable amount of memory. Because of the widely diverse impact of a change that relates to employee groups that are defined and/or maintained within the platform through the group manager functionality (described elsewhere herein), recomputation 314 requires very large amounts of data to be available for processing. One memory management technique used includes keying input data with a natural key (e.g. social security number for employee, hierarchy key for a group, and the like). The natural key may be used in conjunction with the individual object model element unique identifier to cache relevant data so that the recomputation processing 314 can be executed very efficiently.

Smart synchronization 300 includes an update facility 318 that persists the recomputed model data to produce the updated model and database 322. As described herein, techniques to make this update process efficient include, among other techniques, grouping like database transactions together into a single update request. Even if calculations are simple, due to the large quantity of calculations and database changes required each time that smart synchronization 300 is performed the data to be updated is ordered to facilitate batching the update requests.

In an example, a database update tool, such as HIBERNATE may be used because it supports efficient batching of requests. With HIBERNATE, the platform 100 may accumulate a large number of updates (e.g. 10,000) into a single request rather than issuing 10,000 individual requests. Batching is also used when data is read out of the database for reconciliation 312 or recomputation 314 so that fewer transaction requests must be processed during the smart synchronization process 300.

Smart synchronization 300 may also include handlers 304 that may operate in a pipeline or may themselves be composed of a pipeline of data processing sections. The organization, order, and features of the handlers 304 may be configured as part of a build time configuration process. This handler 304 customization may allow receiving data that is unique for a deployment of the platform 100 (e.g. adding or handling a special job code). Although handlers 304 are generally ordered to process data from the most generic (e.g. jobs) to the more specific (e.g. groups), the order of the handlers can be changed so that a group handler 304A may be executed before or after a job handler 304B. Handlers 304 can execute a wide variety of tasks, such as to copy data, check a length of description, and the like. Configuring handlers 304 may be performed with an interface coded using Java.

Effective dating is a strategy for managing data that changes over time. Traditional data processing takes place in the present, and results are stored from now until they are changed in the future. With effective dating, you can set the effective date to a date or date range, and read data as it was (or is projected to be), or write data for the present, past or future. Most effective dating designs fail due to poor performance or overly complex logic, passing dates and date ranges throughout the code and obscuring the business logic. The platform 100 includes a sophisticated layer that separates dates from the application logic and manages effective dates deep in the architecture outside of application logic, keeping the logic itself simple. For certain business applications supported by the platform 100, effective dating is fundamental. For example, in benefits administration, benefits eligibility, plan changes, coverage effective dates, pending coverage and events all occur at various times, making it difficult to keep track of the benefits and costs associated with employees at any time. The platform 100 provides tools to create an effective dated model implementation and persistence layer. This unique capability provides a scriptable, simple point-in-time programming model to developers, for customizations, and scripted configuration. It also effective dates a configuration of the platform 100 itself, so that changes in configuration can be scheduled to take effect at some point in the future, or retroactively in the past. Automation and layering may be techniques that make this successful. The effective dating framework also has a built-in capability referred to as pending worlds which allows a type of long-lived transaction. Unlike a true transaction, however, it is not totally isolated. Rather, it is a branching strategy that allows write-through from the main non-pending world. This allows live what-if scenarios that are automatically updated when non-pending information is changed that may affect the pending world. For example, in benefits administration, if an employee declares a birth event, a new pending world is created where the new dependent and any elections are stored until the event is approved. If a subsequent plan changes affects eligibility or changes rates, the benefits in both the pending and non-pending worlds will be updated accordingly.

Figure 4:
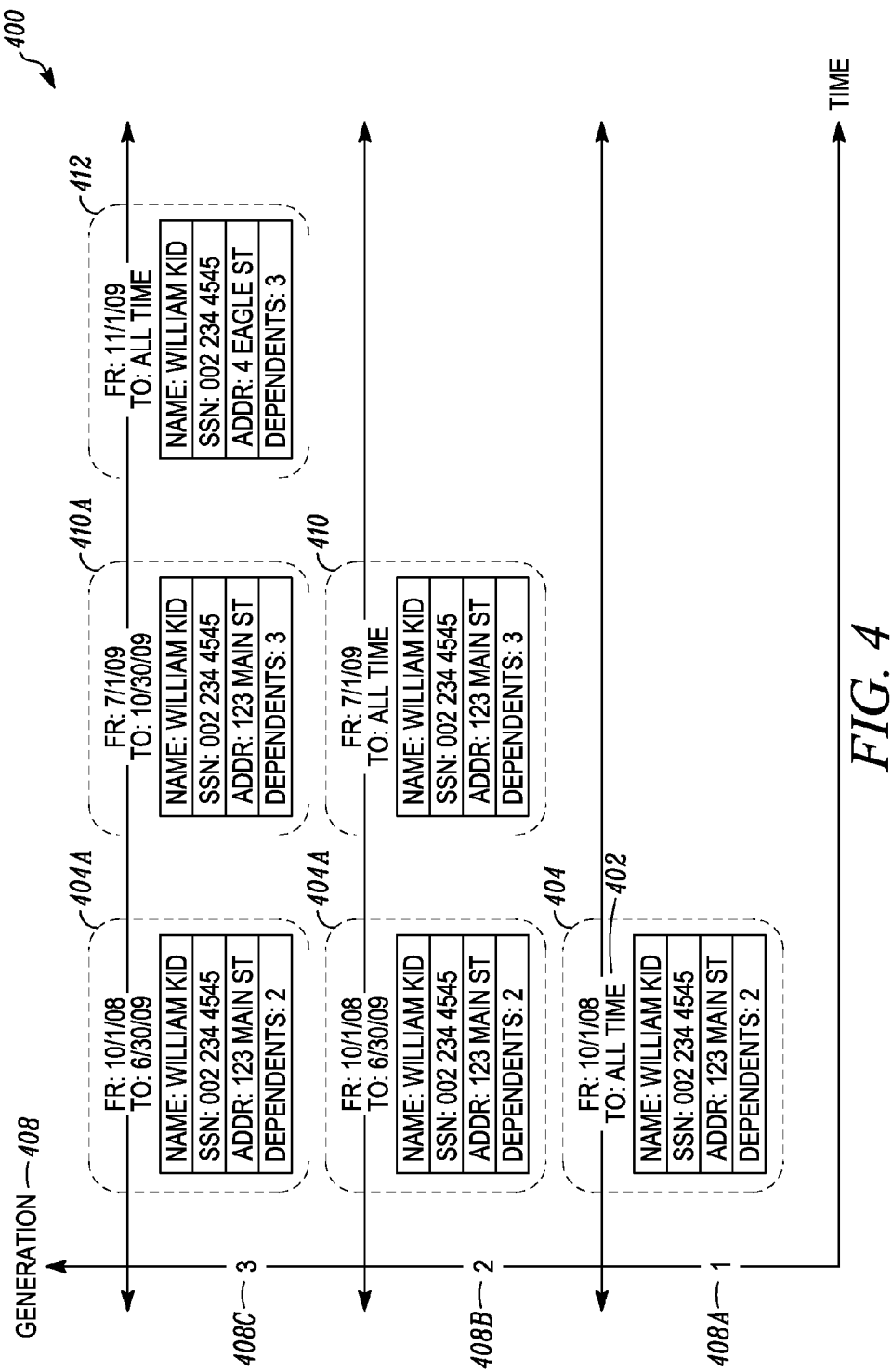
FIG. 4 depicts effective dating aspects of the platform.

Referring now to FIG. 4, which depicts a simplified embodiment of effective dating, effective dating 400 may enable changes made to each domain object 404 to be associated with an effective date 402 and with a generation 408. Tracking of changes to domain objects may be supported with a two dimensional effective dating mechanism. When placed on an X-Y chart, as shown in FIG. 4, the X axis may represent an effective date time line and the Y axis may represent generations of an object. Within each object generation 408 (each 'value' of Y), each effective-date-differentiated version of the object is tracked based on effective dates known when the object generation is saved (e.g. when it is persisted in the persistence layer). The current object generation (indicated by its Y value) includes the previous object generation effective dated object versions, plus additional changes introduced since the previous object generation was saved. Once the current object generation is saved, any further changes that impact the object will be applied to a new object generation (indicated by a new Y value) that starts out as a clean copy of the most recently saved object generation.

Each version of a domain object has an effective date that may include an effective 'from' date and an effective 'to' date to allow selective access of a version of the object based on this effective date range.

FIG. 4 includes three object generations, generation 1 (408A), generation 2 (408B), and generation 3 (408C). In the simplified example of FIG. 4, generation 1 includes one version of the object 404 with effective dates Oct. 1, 2008 to all time. Generation 2 includes a copy 404A of the object 404 from generation 1 with effective dates adjusted to Oct. 1, 2008 to Jun. 30, 2009 and a second version 410 of the copy 404A that includes certain changes and has effective dates Jul. 1, 2009 to all time. Generation 3 includes a copy of object version 404A, a copy 410A of object version 410 with adjusted effective dates Jul. 1, 2009 to Oct. 3, 2009, and an updated version 412 of the object version 410A that includes certain changes and an effective date of Nov. 1, 2009 to all time.

In the example of FIG. 4, when the change in the number of dependents from 2 to 3 is entered, the generation 1 object version 404 is saved and a copy 404A of the generation 1 object version is allocated to generation 2. The effective 'to' date of the object version 404A is set based on the 'from' effective date of the number of dependents change. A copy 410 of object version 404A is created in generation 2, the dependent changes are made to it and it is effective dated so that there is no gap between the 404A version and the 410 version of the object.

Once generation 2 is saved to the database, a subsequent object change (in this example an address change) is applied to a new generation (generation 3) of the object. Generation 3 starts as a copy of generation 2 and includes object version 404A and a copy 410A of object version 410 with an adjusted effective 'to' date based on the effective date of the address change. The object version 410A is copied to a new object version 412, the address change is applied and the effective dates are set.

Although the example of FIG. 4 is a simplified example of effective dating, the order of changes could be different and the end result would be the same. If in the example the 408C change occurred first (with an effective date of 11/1) and then in a next generation the 408B change occurred (with an effective date of 7/1) the changes would result in the same final generation because the platform 100 allow updates to be applied in any effective dating order.

Execution instances of a business application (e.g. compensation quarterly planning) may be associated with a target date that may represent the calendar date for which the business application is being executed. In an example of how a target date may be interpreted by an object to provide the data effective on the target date, generation 3 of FIG. 4 represents an object being queried. An instance of a business application associated with a target date of Jun. 1, 2009 will access information from object version 404A because Jun. 1, 2009 falls within the effective date range Oct. 1, 2008 to Jun. 30, 2009 of version 404A. This includes the user name, social security number, address of 123 Main St, and dependent count of 2. A business application being executed with a Sep. 1, 2009 target date will access object version 410A which includes the user name, social security number, address of 123 Main St, and dependent count of 3. An instance of a business application being executed with a target date of Nov. 1, 2009 will access version 412 which includes the user name, social security number, address of 4 Eagle St, and dependent count of 3. This example is specifically simplified to show how effective dating 400 may be used by business applications in the platform 100. Note that all this is operating on the latest generation—that is, updated with the latest information and further including all values that were in effect in any domain object version. Generally, only an administrator inspecting auditing information and selected reports may look at older domain object generations. However, the entire platform 100 can operate with a target date set to any previous date in such a way that the platform 100 would read from the earlier generation that was available at that target date.

An objective of effective dating may be to support point-in-time simplicity in the platform 100 that allows selecting a target date similarly to setting a clock to a particular date/time and getting access to only the information effective at the set date/time. The business applications operate based on the target date so that an applications programmer does not need to create any logic to determine which entry to use; the underlying platform provides the correct data. Effective dating 400 allows for an application to identify a particular time and access to the data is implemented by the platform below the business application/logic layer, but above the database. Effective dating 400 may be different from prior attempts that created separate database tables for different times. The prior attempts generally do not perform well on large databases, do not support bulk data loading, and do not support using data caching for updates. One embodiment indicates that a future state is kept in a separate table that is copied to a currently active model shortly after midnight to bring the current model to the current (no longer future) state. While this may be effective, it may not meet the performance requirements of large enterprise-class deployments. Other prior attempts at effective dating included creating separate tables or change tables and then pass dates throughout the business applications to try to figure out what a state of an object was at a specific date. This puts an onerous burden on a programmer and makes the application code significantly more complex and brittle. These differences may substantially improve the value and effectiveness of using effective dating 400.

A benefits administration business application executing in association with the platform 100 may use the effective dating mechanism 400 described above to provide the 'point-in-time' simplicity within the application to deal with events in each subscriber's life that affects benefits. Application logic in the application may control the target time so that it becomes the context that all objects implicitly reference to provide data from the version that has an effective date that includes the target time. The application controlled target time can be in the past, present, or future.

Effective dating 400 may facilitate making a record of events and changes over time. Effective dating 400 can also be used to infer events. In an example, if a change in an employee's address is detected in the raw input business data, an employee move event that occurred effective with the date that the new address was introduced to the platform 100 may be inferred from the data change. Effective dating 400 may be applied to dates themselves, providing a record of changes to dates. In an example, correcting an employee hire date may create two hire dates for the employee, one in effect up until the correction was made, and the other in effect after the correction. Therefore, an accrual that is dependent on an employee start date can be automatically corrected when the system performs coverage repair based on the new hire date. Coverage repair is a process used in the benefits administration application for reconciling effective dated data changes introduced into the system with business rules in effect during that time. The configuration model that has all the rules of the objects is also effective dated so we can access the rules (model definition) with an effective date.

In an example of effective dating used in a benefits administration management business application, an object may include a current salary of an employee. The employee's manager may enter a change to the employee salary with an effective 'from' date in the future (a planned salary change). This change may trigger an automatic function that processes object versions and generations as described above. Queries of the model that include a date request that is before planned salary change 'from' date will reflect the current employee salary. Queries of the model that include a date request that is on or after the future effective date of the planned salary change will reflect the planned salary.

Changes to an object (e.g. an employee changes his address) may also affect all versions of the object with a future 'from' effective date. This ensures that when the version of the object with the future 'from' effective date is accessed, the data provided from the object includes all changes made prior to the 'from' effective date that are still pertinent. Further in the planned salary change example described above, after the manager enters the planned salary change, the employee changes his residential address. This change may result in creating a new generation of the object that includes a new version of the object that has a 'from' effective date based on the date the employee moves. This change will also result in updating the employee residential address contained in the version of the object that reflects the planned salary change. Therefore, when the planned salary change object becomes effective, the updated employee residential address will be present in the model.

Effective dating 400 may be based on an effective dating framework that can be applied to any standard object model design. A compile-time effective dating framework tool may be used to create an effective dated model from any object model such as object oriented designs, classes, states, and the like. The compile-time effective dating tool may be executed against a client-specific adaptation of the domain model to make objects time sensitive. Effective dating 400 as used within the platform 100 facilitates supporting time tracking at a low level that is separate from the object model and therefore allowing applications to retrieve database state data from different time spaces without having to carry any time dependencies into the object API in the application layer.

Effective dating 400 may also facilitate auditing. While conventionally, auditing is based on keeping track of all changes through some sort of audit table (e.g. tracking who made a change, etc) to ensure meeting regulations, the effective dating 400 framework allows each object to manage its own history and allow a view of the system at any point in time. Because all changes are effective dated, the platform 100 offers many layers of state that can be rolled back for auditing or any other purpose. Such complete and independent auditing is not necessarily inherent in any other domain model-based environment.

Data being imported or exported can be effective dated. Exported data may include effective dates represented as portions of a record for use by third parties such as insurance providers. When data from external business systems is input, such as with smart synchronization 300, if there is no date information associated with records that can be used to generate the effective date, the date of first synchronization of the data records may be considered the effective date. Smart synchronization 300 may be configured to recognize a date that is associated with an input record that is to be used to generate an effective date for the entry.

The platform may support managing employees within groups and hierarchies to facilitate hierarchical management of compensation, performance, benefits, and other human resource related activities. Hierarchies may be applied to data structure, creation, organization, and the like in performance and compensation planning and management. The platform may facilitate organizing employees into groups and/or hierarchies that may mirror the reporting and functional groups and hierarchies of the entity. The performance and/or compensation hierarchy may include aspects of the functional hierarchy of a company, while including aspects that are independent of the functional hierarchy. The performance and/or compensation hierarchy may include adaptations or modifications of functional hierarchies of an organization. In an example, a functional hierarchy may identify directors as higher in the hierarchy than senior managers. However, a compensation hierarchy may place experienced senior managers and junior directors at the same level in the hierarchy. In this way, senior managers, who may be performing many director levels responsibilities, may be evaluated for compensation similarly to junior directors. An example of this is long-term incentive awards which are usually awarded to managers only by senior directors or executives. Alternatively, the compensation hierarchy may be independent of a reporting or functional hierarchy. In an example, all directors, independent of their reporting or functional hierarchy in the business may share a common hierarchy level which may be related in a compensation hierarchy to all senior managers who share a different hierarchy level. An organization with geographically diverse business units and even different languages may find relating directors from a first region and senior managers from a second region provides a more competitive compensation offering. Organizing the compensation of a large business in a compensation hierarchy may allow visibility to compensation factor differences between different business units.

The human resources management platform 100 may also provide group management facilities that allow for managing hierarchies within the platform that may be different from organizational and reporting hierarchies that may be represented in business system data input to the platform. Matrix management may be represented in the platform 100 so that an employee who has business-line reporting to a first manager and is working on a project that is under the management responsibility of a second manager, may be grouped with the other project members under the second manager. Although a business system view of this employee may show the employee working directly for the first manager, a performance and compensation view may be adjusted to show this employee in a group managed by the second manager. Group management facilities provide benefits to users of the platform 100 that include not needing to create complex conversion software programs that adjust the business group view to the matrix group view so that a compensation planning system can accommodate matrix management.

Figure 5:
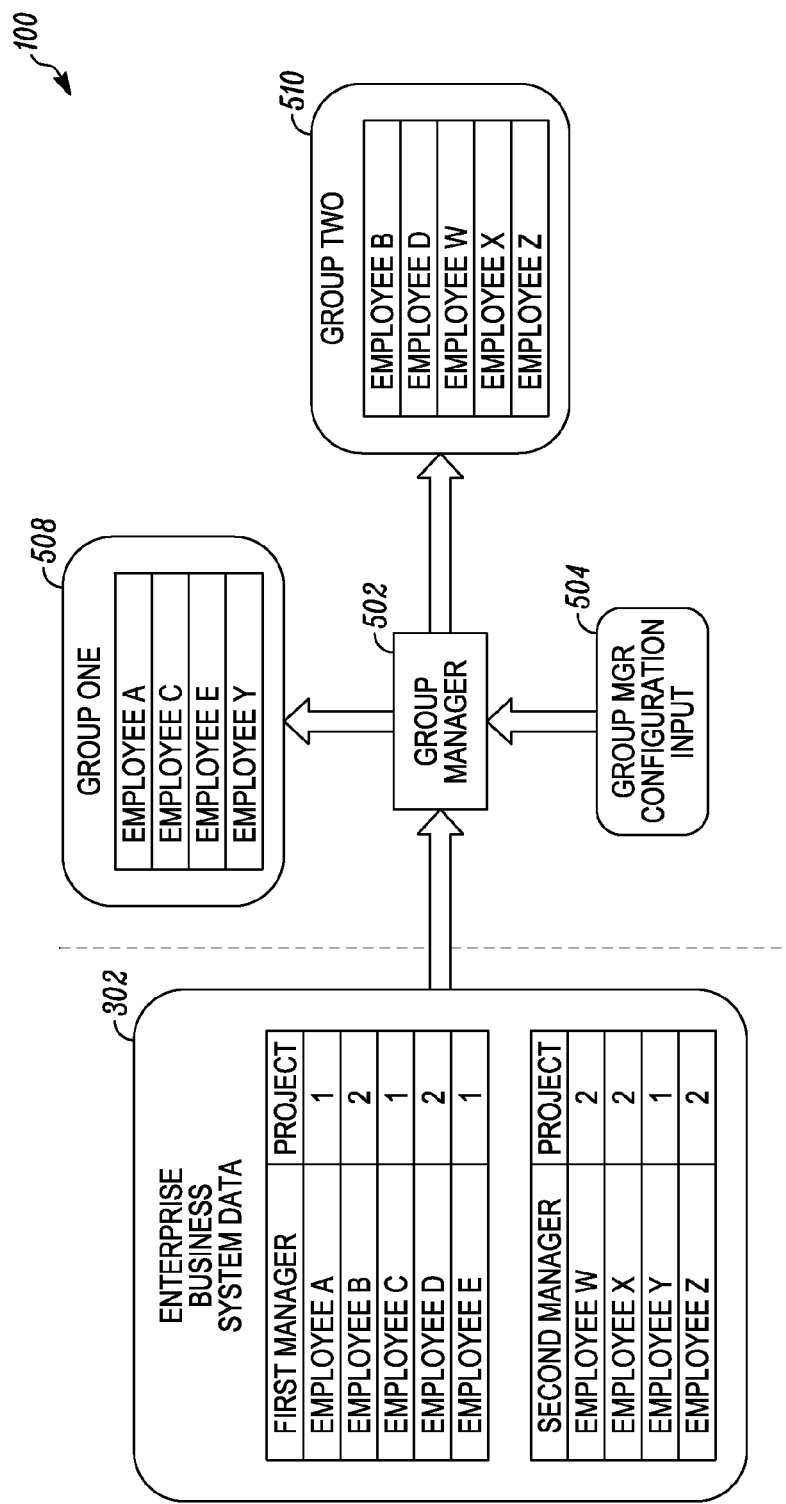
FIG. 5 depicts group manager facilities of the platform.

Referring to FIG. 5, that depicts a functional view of group manager facilities operating within the platform 100, enterprise business system data 302 may include line management grouping or hierarchies as shown. In the example of FIG. 5, a first line manager manages five employees—A, B, C, D, and E. A second line manager manages four employees—W, X, Y, and Z. In the example, each employee is currently assigned to work on one of two projects, project 1 and project 2. When this business system data 302 is supplied to the platform 100, the group manager 502 may be configured through configuration input 504 to detect each employee's project assignment as a natural key for grouping. The five employees of the first manager and the four employees of the second manager may be grouped into two groups within the platform 100: group one 508 that may include employees A, C, E, and Y who are associated with project 1; and group two 510 that may include employees B, D, W, X, and Z who are associated with project 2. Through this simplified example, an embodiment of the group manager 502 is used to organize employees into groups other than those known and represented in the enterprise business system data 302.

Group manager 502 may be associated with smart synchronization 300 in that the data that is processed through the smart synchronization process may include grouping through group manager 502. Group manager can be used to define a specific hierarchy to control how the data being received from the external business systems 302 impacts groups that are defined through group manager 502. Group manager 502, when combined with smart synchronization 300 may also facilitate avoiding the creation and support of complex software that modifies data extracted from the business system 302 so that certain changes in the data only impact members of a work group. In an example, if a bonus program for employees working on project 1 is changed, either the individual managers have to maintain the data manually for each project 1 employee or special export software must be used adjust the bonus for each employee working on project 1 as the data is transferred from the business system to the platform 100. The group manager 502 significantly benefits human resource administrators and managers so that data can be handled in groups that they define, rather than wrangling with data in the business system to overcome its limitations.

The group manager 502 allows for specific assignment of an employee to a group. However, the group manger 502 also allows criteria based employee and functional department grouping. Users of the group manager 502 may identify certain criteria, such as project assignment as a definition for group membership. In this way, by identifying an attribute associated with employees (e.g. employees with currently vested stock options, sales people, non-exempt employees, and the like), a group of these employees may be defined within the platform 100. Business applications, such as a performance driven compensation application may use these criteria defined groups to apply rules, perform processing and the like. In an example, a bonus plan may be established for non-exempt employees. By grouping employees by this criteria (non-exempt status), the bonus plan can be automatically applied to only non-exempt employees in all departments.

The platform 100 may support data independence techniques that may allow independent update of parts of the model, such as those parts that correspond to compensation or performance plans. In an example, one planning session may require a freeze on the reporting hierarchy while another planning session uses a continuously updated hierarchy. Data independence may also facilitate an alternate state of the whole model that allows modeling, "what-if" scenarios, and the like.

Separate datasets, also referred to herein as shadow datasets or shadow models may be created through the data independence framework for specific application needs, such as salary or benefits planning. Each dataset may include rules that control which objects or data elements may be updated as information is provided to the platform from external business systems. A shadow of the entire model may also be created. Each data set starts with a copy of the current model, but may be configured to stop receiving updates after some date, while the current data set continues to always reflect the latest data loads.

A performance-driven compensation application of the platform 100 may access a current dataset. The current dataset contains objects that reflect the latest information provided by the external business systems. Because external business systems provide data from a snapshot in time (e.g. "today") the current dataset reflects that snapshot. The current dataset can be thought of as simply a dataset that does not filter any changes resulting from an update of data from the external business systems. The current dataset may have no notion of what may have existed in the dataset before an update and there is no notion of pending or future changes.

Data independence may allow each dataset to be configured to allow specific updates and to prevent (freeze out) others through an update filter configuration feature.

Because each data set is updated based on its update filter configuration, some data sets freeze all information, rejecting anything new, while others may reject all updates, or accept only certain types of information changes. Datasets can be configured with filters that only allow the updates that the filters are configured to allow, while holding all of the other data in the dataset frozen.

The current dataset may be a reference copy of the latest data that may be stored elsewhere in the model, such as in other datasets. Alternatively, the current data set may be a logical representation of the model based on using the current date to access an appropriate version of each object in the model based on the effective dating mechanism described herein.

Figure 6:
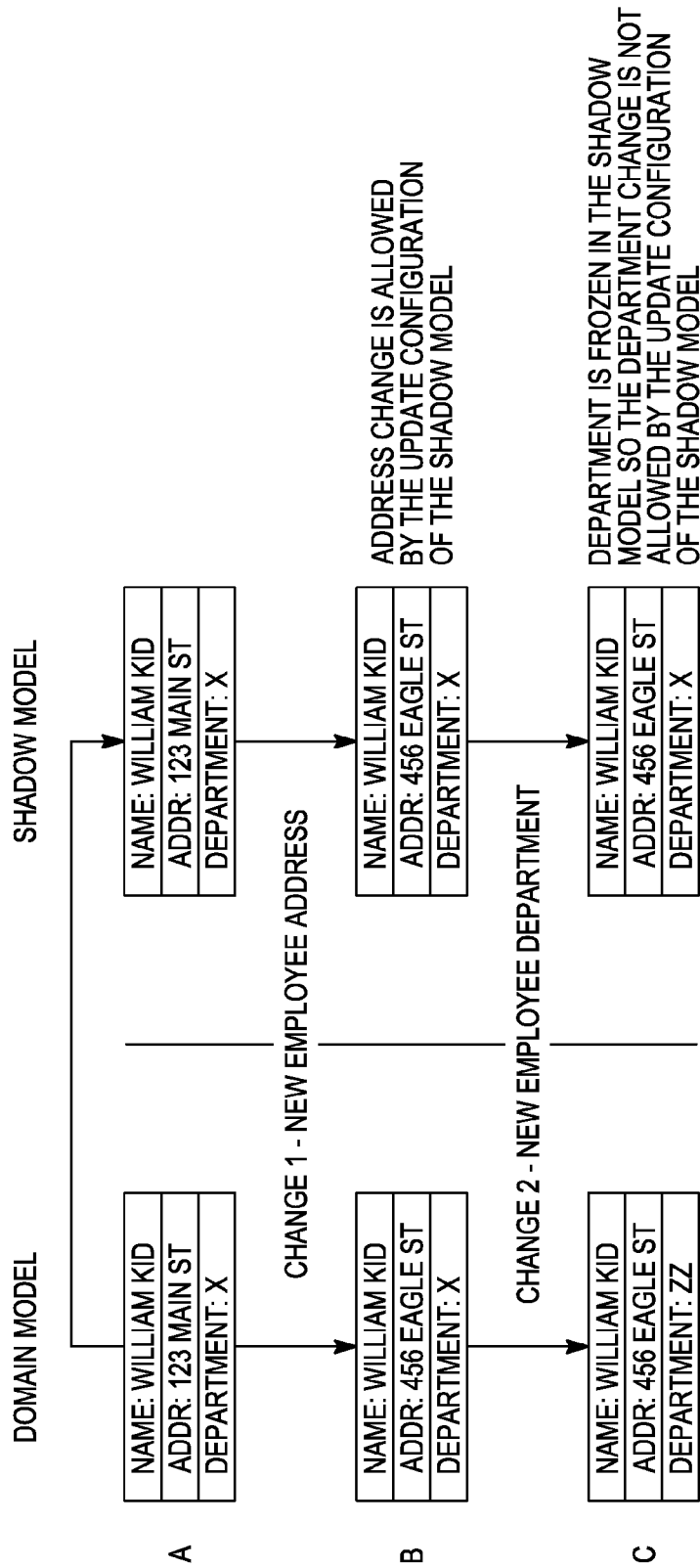
FIG. 6 depicts a data independence embodiment.

Referring to FIG. 6 which depicts how data independence may be used advantageously by business applications of the platform 100, a shadow model may be established when data independence is required for a particular purpose, such as compensation planning FIG. 6 depicts the domain model on the left side and the data independent shadow model on the right side of the figure. Three instances of the domain model and the shadow model are shown: instance A, B, and C. Instance A represents the domain and shadow models when the shadow model is established to support a compensation planning session. A change is introduced into the platform that may impact the data in the domain model and in the shadow model. The change introduced is a new address for an employee. The result of processing this change is shown in instance B of the domain model and the shadow model. In both the domain and the shadow model the change may be implemented because this piece of data is determined to not be relevant to the compensation planning session. A second change is introduced. The second change is a change of the department of the employee. Because this change is relevant to the compensation planning session, it is implemented in the domain model but it is frozen out of the shadow model so that the compensation planning session can proceed without the change causing undesirable results. The impact of the second change is depicted in instance C in which the department change is made to the domain model but not to the shadow model.

A user of the platform 100 may have reasons to want to have different sets of data available to their employees and managers for various business application tasks. A focal-based compensation planning session may require data that is updated differently (or not at all) than data for an off-cycle based compensation planning session. Focal-based planning is done at a focal-point in time may involve looking at data across a static population—the populate in the organization at the time the focal-based plan is being prepared). Off-cycle compensation planning is generally dominated by making changes based on current manager input, so currently updated data (rather than data frozen in time) may be required. To support both of these needs, data independence facilitates effectively stopping the updating of data for any group defined in the platform 100. In one embodiment, data independence establishes the shadow model by making a copy of domain model data that a manager needs to run an application (e.g. comp planning) and freezing out any subsequent changes to that copy of the data. By freezing the data for the specific purpose, other uses (e.g. off-cycle) or other focal-point activities can make and see data changes made after data is frozen. At some point a user may want to open up the frozen data and update or not update the data. However, all changes made since the data was frozen may be implemented. The manager who requested the data to be frozen may not be able to choose which changes to allow.

The platform 100 may include pending state and pending world features that may be useful to a benefits administration application because today's decisions (e.g. an election of benefits) may result in a pending state, which includes pending approvals (e.g. changes are entered but are conditional and therefore do not take effect until they are approved). A pending state could also be a declaration of a new dependent, which may require approval or simply an election which cannot take effect until evidence of qualification is received. Because the changes are conditional until approved, they are independent from the 'current state of the model' until the change is approved and effective. Therefore, pending states can be created in the platform so that the pending data is not used in activities before the pending data is approved, such as sending data to the suppliers of these benefits. Another purpose of the pending world is to maintain a complete and up-to-date view of the model that would be in effect if all the pending state were approved, as the user may expect it to be once all the conditions are met.

Changes may be introduced while the pending state is still outstanding. Subsequent changes that do not require approval may be implemented during the interval of time between when the election or change is entered and the approval is finalized. Therefore the platform 100 supports updating both the current object and the pending state so that changes that are not pended are made during the pending event. To support pending events and a pending world of pending events, an automated function may be executed during compilation of the software to be deployed for a client installation. This automated function may detect model classes that require a pending event state and may configure these classes to hold the pending event information when it is entered. In this way the current domain model or the pending events can be accessed based on a set of rules rather than requiring a pending identifier to be accessed during run time or needing to switch between a pending object and a current domain object.

In particular, each object may be associated with pending events. An object may be configured to have a pending state that is maintained in a pending delegate which is accessible through the object based on an assertion of the pending state within a business application. A pending delegate may be a copy of an object that includes changes to elements of the object that are not yet approved (i.e.: pending changes). In an example, when an employee makes a first pending decision, a pending world is created for that employee, and each object changed as a result of that pending decision maintains those changes in its pending delegate. The pending world is asserted by the application when functioning on behalf of an employee who has pending state at that time. A pending delegate is maintained in parallel with the object so that all non-pending changes are implemented in the object and its pending delegate. If and when a pending change is approved, the approved change is applied to the object through the object change process described in reference to the effective dating framework described here, thus ensuring that all dependencies of the change are made within the object and within the model. The information in the pending delegate that has been approved is no longer pending, so if there are no other pending changes in the pending delegate, the pending delegate may be marked as deleted from that time forward. If there are additional pending changes in the pending delegate, the pending delegate remains alive until all pending changes are either approved or denied, at which point that pending world can be discarded. If the pending change is denied approval, it may be removed from the pending delegate and may be archived for audit purposes and the pending world discarded.

The changes recorded in the pending delegate are only visible when an application specifically requests access to pending delegate information. This may be done through changing a context of the application that may be specific to an employee so that pending information is returned from the object when the application accesses the object. In an example, a business application of the platform 100 may be serving multiple users at the same time, so the pending state may be specific to a processing thread associated with a user. This allows multiple threads to keep separate pending state so that one user thread may have no pending state and is shown only current information, and another user thread accesses object data based on a pending world established by pending state in that user thread.

A deployment of the platform 100 may be configured to support a pending world by configuring actions and activities to trigger the use of the pending state. With this global pending context set, changes to an aspect of an object that has been configured to handle pending events may result in the automatic creation of a pending delegate. If the changes are directed at an aspect that itself is configured to support a pending state, a pending delegate of the object is created on demand by creating a copy of the object and passing the change to be handled by the delegate.

The pending state functionality may be implemented as part of the effective dating framework where pending delegates and their associations to non-pending objects are both fully effective dated objects.

The platform 100 provides a very flexible solution to managing deployed client data that supports both the down-market and the complex enterprise market. The platform 100 supports building the database schema as part of the client deployment build process, such that a client's data is maintained in its own database schema. This separation strategy satisfies many clients' concerns about data separation from other clients, and allows the flexibility to either co-locate the schema with others in the same database instance, or dedicate an instance to the client. This allows deploying more than one client's model and persistent data within one physical or logical database without any risk of exposing client information to other clients. Clients without domain model customizations or build-time configuration can share the application binaries, since runtime configuration results in only data content changes and no change in application code or database schema. This per-schema client strategy also allows applying table-level or schema-level encryption on a client by client basis so that encryption may be applied for a first client and not for a second client within the same database that is accessed by the same application binary.

Each client's data is maintained in a schema separate from other clients' data. This has several benefits. Each schema has its own access credentials, which prevents one client from accessing the others data, and prevents an application from unintentionally mixing data from two clients. This flexibility facilitates co-locating client deployments on virtual or non-virtual environments based on scale, performance metrics, usage patterns, and the like. It helps to use the platform 100 to exploit the characteristics of the low-touch down-market client while still delivering on the strict requirements of the complex enterprise-class client within the same platform 100 architecture.

The platform may provide reporting facilities. The reporting facilities may be accessible from each of a performance application, compensation application, benefits application, and any other application, user interface, administrative interface, or data interface associated with the platform. Reporting facilities may provide reports of information stored in one or more databases and domain models associated with the applications. Reports supported by the reporting facilities may include ad-hoc, standard, custom, and other reports such as customized, template based, automatic, interactive, scheduled, and the like. The reporting facilities may also interact with the domain model and one or more databases of the platform to generate one or more denormalized databases (e.g. reporting database) for facilitating reporting, such as customized reporting. A denormalized database may include domain model information, database data, computed data, referenced data, indirect data, consolidated data, third party data, formatted data, variable data, report templates, and other data or calculations that allow a user to report information based on the user's preferences. A denormalized database may be a compilation of information from one or more databases of the platform, one or more domain models of the platform, data gathered from sources external to the platform, user defined computed data, default computed data, and the like. The denormalized database may be updated periodically, such as each day, thereby providing a timely snapshot of information relevant to a user's reporting preferences. In addition to periodic updates, information in the denormalized database may be updated as needed, such as when information affecting a report is changed in the domain model or database. Providing a denormalized database may also improve report response time because report requests may not have to access either the domain model or the full database. Providing a denormalized database may also allow the use of industry standard or publicly available reporting software and techniques for reporting off of the denormalized database. A denormalized database may be organized to further optimize report response time such as by arranging most frequently accessed data to be readily available. A denormalized database may also be organized to allow a user to retrieve information, such as in a report, in ways that coordinate with their business processes, workflows, or preferences.

The custom reporting facilities may take advantage of the denormalized database and allow a user to report information out of the platform in ways that the user would normally want to get data. With custom reporting, the user may match reports to existing or predefined formats in which a user's current business process generates data. In an example, a user may already have various data in customized Access or Excel tables that, when viewed, present their data in a specific format or matching a preferred organization of the data. A custom report may be configured to deliver the required information to be viewed like the Access or Excel tables.

The ad-hoc reporting facilities and standard reporting facilities may query the domain model for data to satisfy a report request. By accessing the domain model, instead of the database, ad-hoc and standard reporting may reduce the transactional loading of the database, thereby improving overall platform performance. Reports based on the domain model may still query the database. However, they may benefit from using a single implementation of logic in the objects (e.g. business layer), rather than requiring implementing reporting logic on top of raw data and risking conflicts or taking on maintenance problems of duplicated logic. Alternatively, ad-hoc and standard reporting facilities may query the denormalized database. Any type of reporting facility may access any of the domain model, databases, and denormalized database as needed or specified to retrieve data to satisfy report requests.

The platform may simultaneously support ad-hoc, standard, and custom reporting so that a user may select one or more types of reporting on demand. Custom reporting may be based on templates that may also be used to organize or identify data to be retrieved, calculated, consolidated and the like into the denormalized database. By identifying the data requirements of the denormalized database based on the reports to be generated from it, the denormalized database may be automatically adjusted based on a custom report template each time the denormalized database is updated. In an example, a user may provide a spreadsheet file that contains the data in the format requested for a custom report. The user may reference the spreadsheet file when configuring a custom report through the platform. The platform may analyze the spreadsheet, such as the formulas, formats, data values, data names, macros, and the like to generate a custom report template to replace the spreadsheet report. At the next update of the denormalized database, such as a based on a user request, the platform may access the domain model and the database to retrieve relevant data, perform calculations as needed to deliver data that matches the spreadsheet data into the denormalized database.

Figure 7:
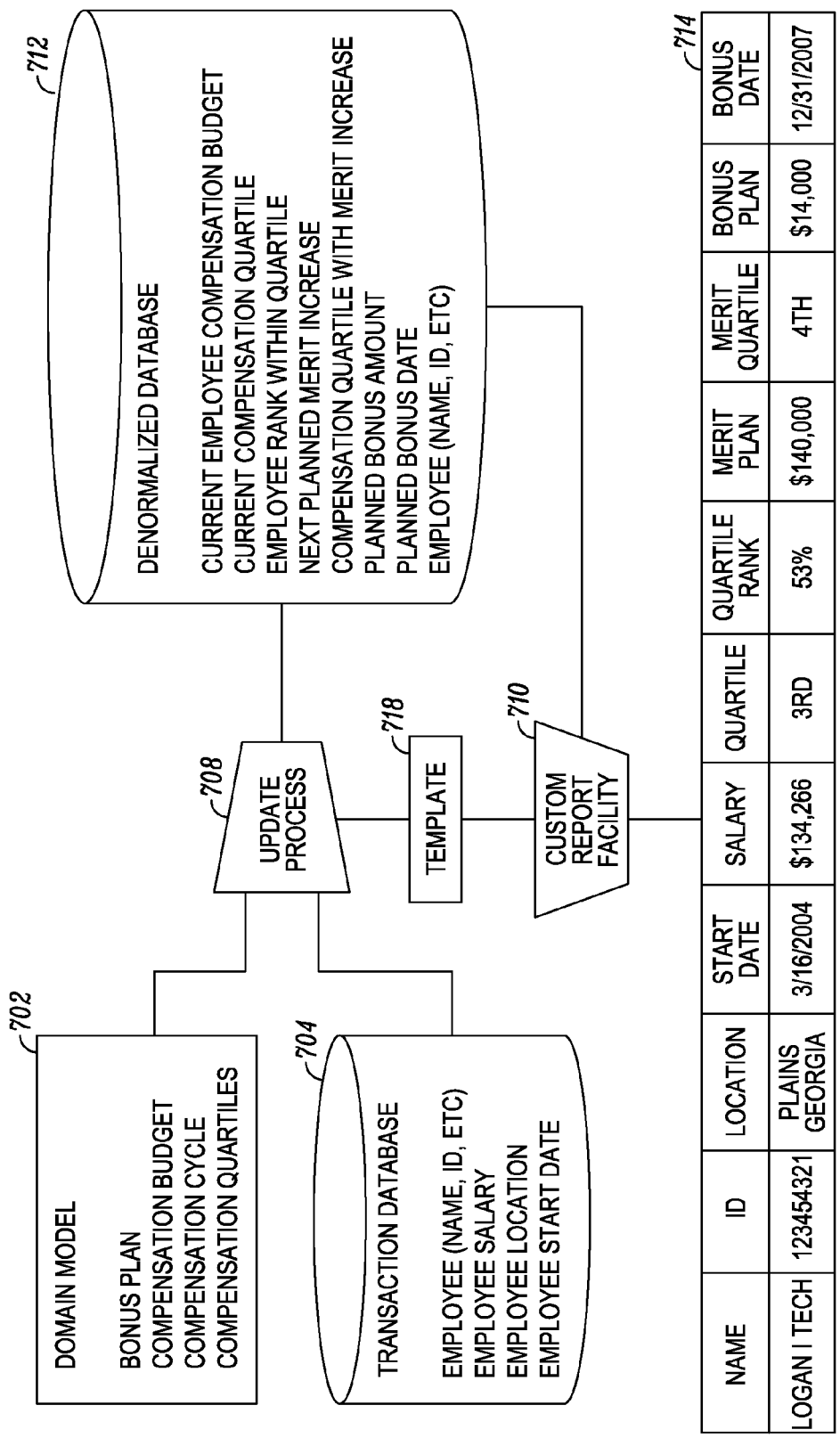
FIG. 7 depicts platform reporting flows.

Referring to FIG. 7 which depicts an exemplary report that has been generated from an updated denormalized database, exemplary data that may be recorded in a denormalized database is shown. The denormalized database 712 may be updated through update process 708. The update process 708 may reference custom report template 718 to determine aspects of data to be included in the denormalized database 712 update. Updating may include performing calculations, consolidation, extrapolation, sorting, and other operations on data such as data from the domain model 702 or the transactional database 704. Updating may also include copying data from any of the data sources. Updating may include modifying one or more preexisting entries in the denormalized database 712 so that data associated with a preexisting entry reflects data provided by the update process 708. Updating the denormalized database 712 may also include replacing entries, creating new entries, deleting entries, replacing a portion or the entire denormalized database 712, creating an alternate to an existing denormalized database 712, and the like. Updating portions of the denormalized database 712 may include incremental updates to one or more entries. In an example of incremental updating, the update process 708 may compare data from a preexisting entry in the denormalized database 712 to updated data for the preexisting entry and apply the updated data based on the results of the comparison. If the updated data is different than the preexisting data, the update process 708 may replace the preexisting entry data with the updated data. If the comparison result indicates the updated data is not different, then the preexisting entry data may not be replaced with the updated data.

The denormalized database 712 may include a date/time field that may indicate the date and/or time of the most recent update. The date/time field may apply to the entire denormalized database 712, a portion of the denormalized database 712, or individual entries in the denormalized database 712. The date/time field may be used by the update process 708 to determine which preexisting entries in the denormalized database 712 to update. Data provided to the update process 708 may include a similar date/time field to indicate the most recent change to the data. The update process 708 may compare the date/time of the most recent change of the source data with the date/time of the most recent update of the preexisting data to determine which data to update. In an example use of date/time fields associated with updating the denormalized database 712, a preexisting entry in the denormalized database 712 may have most recently been updated yesterday and its associated source data may have been most recently changed today. The update process 708 may determine that the source data has changed more recently than the preexisting data has been updated and, as a result replace the preexisting data with the updated data. The update process 708 may query the domain model 702 and/or the transaction database 704 so that only data changed more recently than the most recent update of the denormalized database 712 is provided. In this way, the update process 708 may utilize the query capabilities of the platform when updating the denormalized database 712.

The template 718 may identify aspects of data associated with a custom report 714. The update process 708 may reference the template 718 when requesting or obtaining data for reporting. The template 718 may include one or more data fields that may identify an entry or entries in the domain model 702 and/or the transactional database 704. The data fields may include employee name, employee salary, compensation cycle, and the like. A template may identify data that does not exist in any data source and therefore may have to be produced; such as by update process 708. Denormalized database 712 data that has to be produced may alternatively be produced by one more applications, such as a compensation application and stored in the domain model 702, the transaction database 704 or another data storage that may be accessed by update process 708. Data that may be produced may include various computations, calculations, and other combinations or processing of source data. In an example of produced data, current employee quartile may be calculated from current employee compensation package, and compensation quartiles. In the example, if the employee compensation package is $134,266 and the third quartile covers a compensation range of $120,000 to $150,000, the employee compensation quartile would be computed to be the third quartile. This computed data may be stored in the denormalized database 712 so that it could be reported by the custom report facility 710 and presented to a user, such as the example custom report 714 of FIG. 7.

The platform may support various templates. Templates that may be used by the update process 708 may include spreadsheet work files or work books from applications such as Microsoft Excel, Microsoft Works, and the like. Template formats supported may include xml files, custom report format files, existing compensation, performance, and benefits report generation format files, and the like. A template may identify specific data entries, data entry types, data groups, data sources, various other aspects of data, and the like.

A plurality of templates 718 may be associated with a custom reporting facility 710 to support generating various custom reports. Each template may identify data to be included in an update of the denormalized database 712. The update process 708 may combine templates so that data that is common to more than one template 718 may be retrieved from the domain model 702 and/or the transactional database 804 once. The common data may be stored in the denormalized database 712 in more than one location so as to facilitate generating custom reports 714. Alternatively, data commonly identified in more than one template 718 may be stored as a single entry in the denormalized database 712.

The platform may support ad-hoc reporting that may be used to easily create reports. Ad-hoc reporting may directly access the domain model, the transactional database, or may report from the denormalized database. Ad-hoc reporting may facilitate a user creating a set of report preferences that may be used in a query of the model to filter or select preexisting model objects for reporting. Ad-hoc reporting may be template based, menu based, code based, and the like. A query language such as SQL may be used in an ad-hoc reporting facility. The platform may support creating a user specific ad-hoc profile, storing the user-specific profile, exporting report data to third party software such as Microsoft Excel, generating ad-hoc reports in HTML, PDF, and other display formats.

The platform may support standard reporting. Standard reporting may support predefined reports. Standard reporting may be template-based to facilitate deployment and integration. Ad-hoc and standard reporting may report off of the domain model rather than the transactional database.

Figure 8:
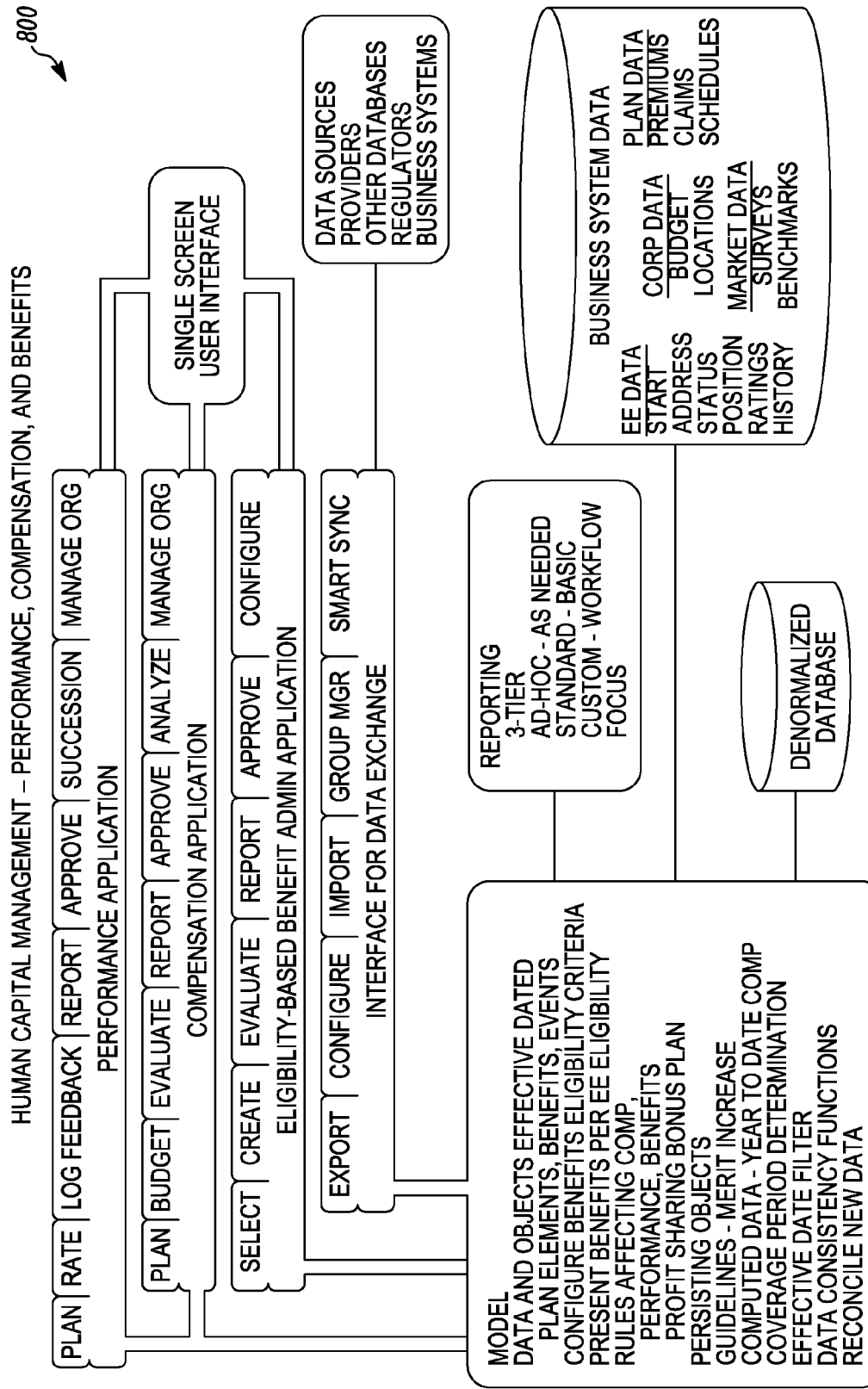
FIG. 8 depicts a unified human resources management platform.

Referring to FIG. 8, compensation, performance, and benefits applications may be combined in one product that may provide a uniquely employee-centric human resource management platform—a comprehensive human capital management (HCM) platform 800. This may include pulling the entire benefits administration application into the performance-driven compensation application to produce a HCM platform 800 that provides capabilities beyond a straightforward combination of applications because various user roles will have the ability to do a rainbow of activities within the HCM 800 based on the services that are deployed. A user role may encompass a benefits client role, a compensation client role and a performance/succession client role as an employee, hr manager, administrator, benefits manager, and the like.

The HCM 800 may be configured to take advantage of group manager hierarchy features to consolidate rules within the combined business applications and to leverage the sophisticated capabilities of security, data independence, data isolation, and the like to ensure each user role has proper visibility to relevant data while excluding access to non-relevant or sensitive user data. This concept of visibility may be moved to a lower level or to an application specific level in the HCM 800. The HCM may be embodied as an integrated management suite that may be accessible through a single user interface screen.

Figure 9A:
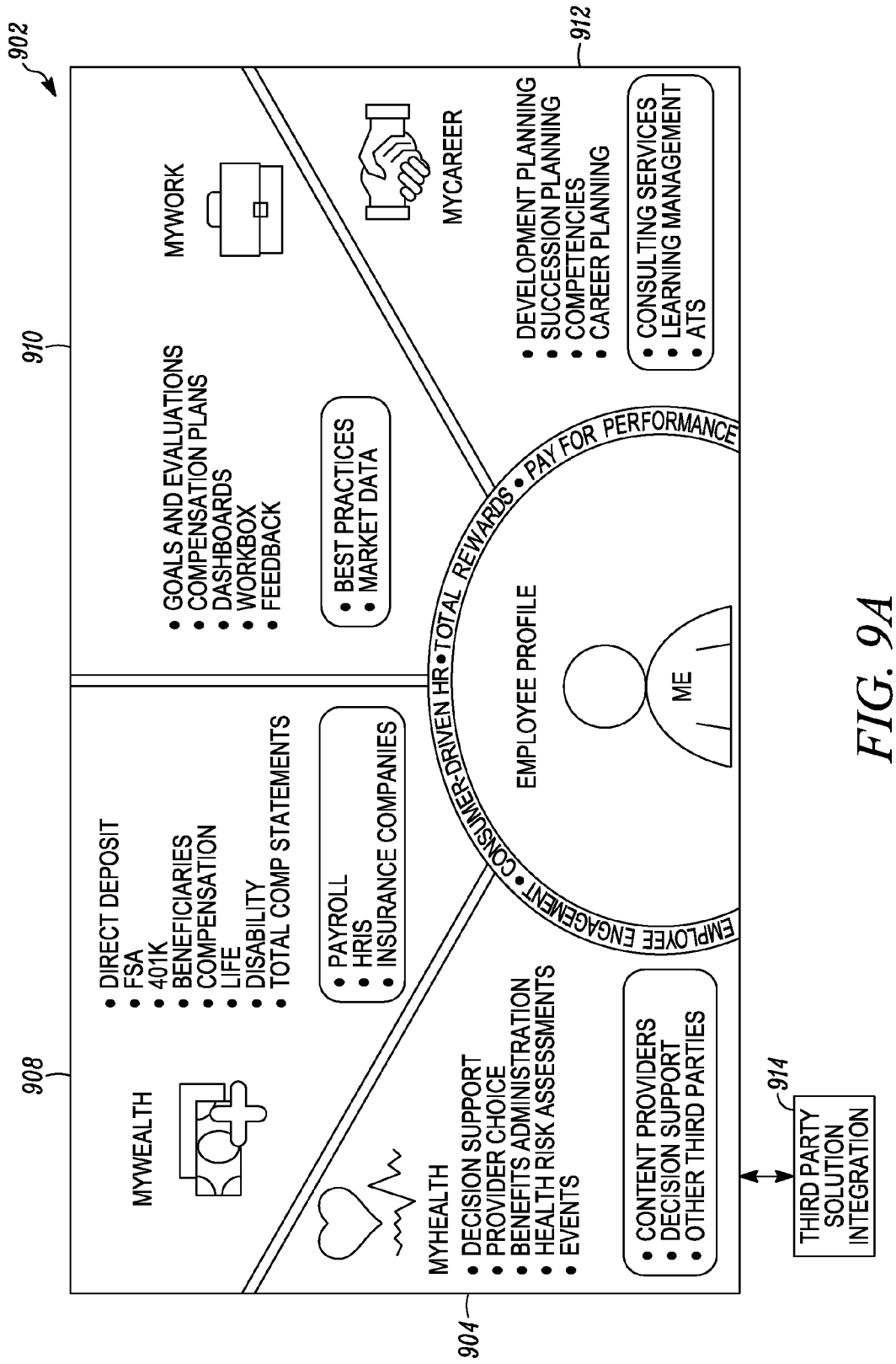
FIG. 9A depicts an employee-centric view of the unified platform of FIG. 9A.

Referring to FIG. 9A a user-centric overall offering may depict an overall offering employee view 902 of services available through the HCM 800. These services may pertain to health ('My Health' 904), finance ('My Wealth' 908), workflow ('My Work' 910), career development ('My Career' 912), and some other types of services relevant to the employee. The overall offering employee view 902 may be designed in order to provide at least a visual segregation of these services.

The 'My Health' 904 service may provide the employee with applications related to health services such as support for health decisions, options and choices regarding health care providers, administration service for health benefits, health risk assessments available, events and promotions, and some other services. For example, through 'My Health' 904 service, the employee may be able to obtain information related to a free eye check up camp organized by a health agency. In an embodiment of the present invention, such events and promotions may be organized in coordination with the employer of the employee.

The entities that may be interfacing with this service of the HCM platform 800 may include content providers that may supplement the information and content related to health services and benefits; decision support parties that may assist with the decision oriented activities (e.g., choice of health care provider); and other third parties. For example, health care events may be hosted by other third parties such as hospitals, NGOs, cultural organizations (Rotary Clubs, Red Cross, among others), and some other third parties.

In accordance with an embodiment of the invention, the other third parties may also be involved with solution integration.

The 'My Wealth' 908 service may provide the employee with applications related to financial services such as deposit account (e.g., facilities, statements), beneficiary and compensation benefits (e.g., bonus, overtime payments), life insurance (e.g., premiums), disability compensations, payroll statements, and some other types of financial services. For example, through 'My Wealth' 908 service, the employee may be able to access the monthly statement regarding the compensation and benefits accrued or the employee may be able to directly submit premium payments for medical or life insurance through this service.

Payroll department, Human Resource Information System (HRIS), and third parties such as insurance companies are the entities that may interact through this service.

Similarly, the 'My Work' 910 service may be responsible for providing a collection of workflow oriented applications and services to the employee. These applications and services may include but may not be limited to goals and evaluations, compensation and salary plans, dashboards and workbox, feedback, and some other applications and services. For example, the employee may be able to view various salary options provided by the company, such as fixed or variable component of the salary, and may be able to customize the salary structure according to the needs. In another example, dashboards and workbox applications may facilitate better management of workflow and productivity. In addition, these dashboards may provide effective visualization or presentation options (e.g., providing a graph or chart to track the progress of ongoing projects). Feedback, appraisals, evaluations, and recommendations may also be submitted and viewed by the employees through this service.

In accordance with an embodiment of the present invention, the 'My Work' 910 service may also include best practices and market data related to workflow. For example, this service may complement other services that may help the overall workflow (e.g., time-tracker services).

Likewise, the 'My Career' 912 service may be focused on the career development aspects of the employee. This service may include various applications related to career development and planning, succession or promotion planning, competencies (specialized or generic), and some other types of applications. For example, the employee may be provided with some additional training and certification courses for enhancement of skill set.

The 'My Career' 912 service may involve other entities such as consulting services, learning management service providers, ATS, and some other options for supporting career oriented needs of the employee.

In accordance with an embodiment of the present invention, a third party solution integration facility 914 may be provided to unify various services (related to employee's health, wealth, work, and career) of the HCM platform 800.

The overall offering employee view 902 benefits the overall human resource management process by providing an active and effective environment for employee engagement in various human resource activities, rewards for both the employer and the employee in terms of work, productivity, and benefits; a transparent solution for driving pay-for-performance, and a consumer-driven human resource.

Figure 9B:
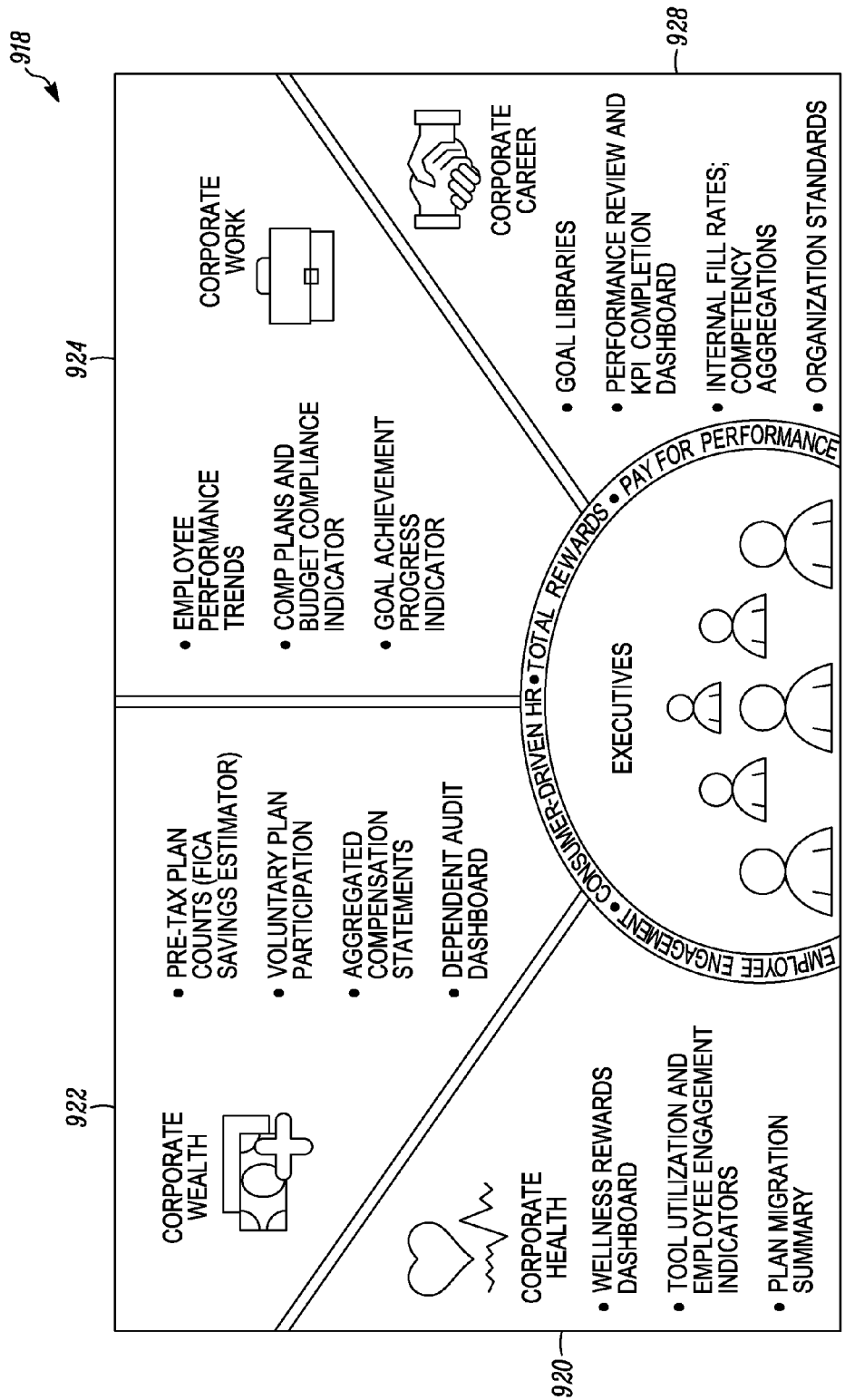
FIG. 9B depicts an administrator-centric view of the unified platform of FIG. 9A.

FIG. 9B depicts an overall offering administrator view 918 for human resource (HR) administrative and executive team. The administrator view 918 may include services pertaining to health ('Corporate Health' 920), finance ('Corporate Wealth' 922), workflow ('Corporate Work' 924), career development ('Corporate Career' 928), and some other types of services (i.e., for all the employees). The applications in these services may help the HR administrative and executive team assess various trends and indicators pertaining to employees' health, finance, workflow, and career.

The 'Corporate Health' 920 may include applications related to health and wellness rewards and benefits, tool utilization and employee engagement (indicators and trends), health plan migration summaries and other documentations. For example, a dashboard may be provided in 'Corporate Health' 920 that tracks the number of sick leaves availed by the employees. In addition, such a dashboard may provide facilities for rewarding employees who have not taken any sick leave in a given period. The rewards may be monetary, gifts, vouchers, coupons, certifications, and some other types of rewards.

The other service in the corporate interface screen 918 may include the 'Corporate Wealth' 922. This service may include applications such as dashboards for audit trails, pre-tax plan counts (e.g., Federal Insurance Contributions Act (FICA) savings estimator), voluntary plan participation, aggregated compensation statements, dependent audit dashboards, and some other types of applications.

Similarly, the 'Corporate Work' 924 service may encompass workflow activities with regard to the entire organization. Some of the applications in this service may be employee performance trends, company plans and budget compliance indicators, goal achievement progress indicators, and some others. For example, the 'Corporate Work' 924 service may provide the invoice status of all projects. In another scenario, sales per employee ratios or workforce productivity ratios may be provided by this service for assessing the overall productivity of the organization.

Yet another service, 'Corporate Career' 928 may include a compilation of every employee's Key Performance Areas (KPAs), corporate goal libraries or repositories, a dashboard for reviewing performance appraisals/evaluations and Key Performance Indicators (KPIs), internal fill rates, competency aggregations, organization's standards, codes of conduct, and some other applications and functionalities. For example, a brief overview (requirements, procedure, preparations, guidelines, etc.) regarding the hiring process may be provided by 'Corporate Career' 928.

In accordance with another embodiment, various aspects of corporate career such as 'Corporate Social Responsibility' or 'Employee Initiatives' may also be provided by this service.

Configuration is a means by which a system's look or behavior can be changed to meet client requirements without programming. Configuration in the platform 100 includes model-based aspects, primarily through an XML file that includes structures, data, parameterized strategies, and scripting to tailor the platform's look and feel and behavior. The platform 100 may support build-time configuration that may be applied before the platform 100 is deployed to produce a targeted solution. Build-time configuration may provide a way that the platform 100 can maintain speed and scalability by having the configuration compiled into the platform 100 rather than manipulated as data at runtime. Most configurations of the platform 100, however, are runtime configuration, which can be loaded into a running platform 100 without taking it down and rebuilding it. Some types of effective dated configuration may be loaded while the platform 100 is running, without affecting current users.

The platform 100 offers several means for configuring applications including offline configuration tools, online configuration tools, user interface configuration, and the like. Offline configuration may be supported through configuration files that are loaded as XML files and may be created by configuration programs, filed, and the like that may be associated with the platform 100. These tools may enable business analysts to create the configurations through intuitive user interfaces, and export them into XML files. The files may be used in build-time configuration or used in run-time configuration and loaded into a running system. These tools are especially beneficial if the configuration model is complex or effective dated. Online configuration may partitioned so that a subset of runtime configuration may be available only to authorized users through application functionality, such as: administrator functionality that facilitates changing the details of a dimensional guideline rule, adjusting bonus calculations or updating performance ratings; role management that may facilitate defining roles and managing assignments to individuals and groups; group management that may facilitate maintaining reporting hierarchies, budget groups and other group and hierarchical organizations of employees; and the like. Configuration capabilities of the platform may include user interface configuration. The platform may support several configuration points in the user interface, such as: internationalization that may be supported through configurable resource files, for locale-specific text, formats, and content; application configuration files that may be loaded into the presentation tier to configure application flow; cascading style sheets that may be used to tailor the look and feel of the user interface; and the like.

The human resource management platform 100 may include data access components or elements for insulating applications and services from the details of data transformation and mapping. Data access components may include features that facilitate persistence of data, such as single domain objects such as a "noun" or a "component". Persistence of data attributes such as mapping of data formats may also be provided by the data access components. Data access components may also provide services for the human resource management platform 100 such as creating, reading, updating, and deleting data. Aspects of the human resource management platform 100 that may use data access components include, without limitation, internal applications, business services, external applications, and the like. Data access components may be implemented by building XML documents from SQL/JDBC results sets.

The human resource management platform 100 may include a plurality of data access components wherein each component may provide data access services as herein described for different data sources. For example, a data source such as a third party employee insurance database may require a different set of data access functions than an internal employee vacation accounting database. Reading a record from the external insurance database may include mapping data such as employee insurance member ID so that automatic premium payments may be properly credited by the human resource management platform 100.

As changes are made to data sources, an associated data access component may, or may not, need to change to support the changed data source. In an example, a data source that is changed to include security features associated with a user interface of the data source, may not impact the data access component for that data source. Whereas, a data source that changed field names or definitions may impact a data access component, requiring a new mapping between the data source and the human resource management platform 100 functions or business services accessing the data source. Data access components may combine, dissect, generate, and persist XML documents to facilitate business functions and services performing tasks.

The user interface gives end users information they need to make decisions, and those decisions ultimately result in changes persisted in the database. This section describes Workscape Technology Platform capabilities that enable our application suite to maintain and store data accurately and efficiently.

The platform 100 may include an object model and may implement object-relational mapping. Application logic may be centered in a business logic layer 204 on a server, such as in an object model implemented in Java. Generally, a good object design combines state and behavior. In the platform 100, the behavior may be embodied in business logic and encapsulated in object methods. When changes to data associated with the model are committed, the object state is translated to the database in an automated fashion, such as by using JBoss Hibernate, an object-relational mapping tool. Hibernate is an example of a tool that can be adapted to successfully manage large amounts of data, such as by revising code to enhance the tool.

Transactions with the model and database may be most effective if they are controlled outside the business logic layer 204. In the platform 100, transactions are initiated before application logic is invoked and the application logic signals synchronization points to the persistent database 114 so that the actual transaction management is performed by the underlying persistence layer 208, adding security and robustness to the platform 100.

The platform 100 provides support for enterprise level and down market small size client deployments. Features of the platform 100 may minimize effort for deploying to low-complexity clients, such as alternative data input, no customization, limited configurability, deployment options, and the like. Alternate data input may include input via spreadsheets so that clients with limited volume and complexity may be able to provide their data through spreadsheets that may be supplied with the platform 100. The spreadsheet may have embedded functionality that automates the transformation and loading of information, giving the customer more control and limiting deployment or startup effort. Because customizations take time and expertise they add to implementation costs. When client requirements fall within the range of configurability of the platform 100 (e.g. within run-time configurability), the platform 100 can be quickly configured and programming may not be required. Further, when client requirements can fit within a limited set of configurable options, the time to configure the system is reduced, and some configuration responsibility may be transferred to the client. Testing time may also be drastically reduced. As described above, the platform 100 may store each client data in its own schema, which facilitates easier deployment through a template approach for configuration, installation, and use, and template use for supporting third party data configuration ERPS, such as SAP, and the like.

The deployment of the platform 100 may involve a single package of files and several scripts to complete integration with a client environment. One or more business applications can run on a computing resource, such as a virtualized resource, with one or more clients being served by the applications. A database server can host multiple client deployments per database instance or place clients in a separate database instance. The platform may support deploying all components of the platform 100 on dedicated hardware, or packaged into an appliance for remote hosting within a firewall protected network. Deployment may also support deploying different portions of the platform (presentation layer, business application layer, model layer, and data persistence layer, for example) to be executed on different systems to facilitate distributed processing environments.

The human resource management platform 100 may include a user interface that may be accessed through a web browser of a computer such as a networked computer facility. The user interface may include various screens for facilitating a user interacting with the platform 100. In addition to the various screens as herein described for interacting with applications, and the like, the user interface may also facilitating issuing alerts to users. Alerts may be issued based on a range of criteria that is described elsewhere herein. An alert issued through the user interface may include a configurable visual indication on a computer display such as a pop-up window, or other visual notification. The alert may include a configurable audible aspect as well that may play through a speaker system of the computer through which the user interface is accessed. Alerts may be context specific so that an alert issued through the user interface may be based at least in part on the current activity of the user. In an example, a visual alert of a violation of a budget guideline may be presented to the user while the user is modifying budgets. Alerts may also be included in real-time decision support features of the human resource management platform 100.

The user interface, or one or more portions of the user interface, may be based on computer programming technology including without limitation DHTML, ADOBE FLEX, AJAX, JAVA, JAVASCRIPT, ADOBE FLASH, a combination thereof, or a combination of one or more thereof and other computer programming languages, constructs, technology, images, graphics, menus, and the like.

Alerts presented through the user interface may guide the user in such a way that the user can take appropriate action by interacting with the alert. In an example, a user may be changing a budget allocation that impacts another user's budget. An alert indicating that the other user's budget is impacted may be issued to the user and may provide a one-click action button to notify the other user of the budget impact. The alert may also provide a one-click action button to escalate the alert to other users, such as those higher in the user's reporting hierarchy.

The Workscape Technology Platform provides a robust security model that combines an adaptable authentication mechanism with role-based authorization. The platform provides standard integration points for connecting it into the client's SSO of choice. For clients who do not wish to integrate into an authentication service, the platform supplies an alternate username and password authentication model, with configurable password generation and management. Authorization is controlled by configuration of roles and permissions, and associating roles with individuals or groups of individuals. Permissions are keys that unlock product functionality, and open access to certain type of information to those who hold the permission. Roles can be created and configured that bundle together sets of these permissions, and then the roles can be assigned to individual users or assigned automatically to those who meet certain criteria. The platform automatically resolves the permissions granted to a user when the user logs in, and enforces the data visibility and functionality restrictions at a very low level, below where configuration or business logic operates. Permissions are used to control visibility to data at a low level in the architecture. Queries into the database are filtered at a low level, to avoid pulling information into the system that the user is not authorized to access.

Authorized users are recognized when they log in and are presented with additional administration functions based on their roles. Administrators may have access to functionality, or read-only access to certain employee data, or full rights to act as certain employees. Certain administrators may also be able to affect runtime configuration parameters of the application, changing its behavior in real time. The human resource management platform 100 may include information that is confidential and personal about employees, employers, corporate or business plans, and the like. To facilitate providing appropriate protection of such confidential and personal information, the user interface of the human resource management platform may include security services. Security services such as unique user names, user login names, secret passwords, authority access levels, and the like may be embodied in the human resource management platform 100. The user interface may include initial login validation through a secure access method such as requiring a potential user to enter a user name and associated secret password. This first level of security may be configurable through one or more services such as UpdateUser, ProcessLogin, and CancelLogin. An authorized administrator may access one or more of these services to establish and manage user accounts for the purposes of securing the human resource management platform 100 login processes. Alternatively, one or more of these services may be automated and may be invoked by a user interacting with the human resource management platform 100 through a login screen of the user interface. In an example, an administrator may invoke the UpdateUser service to change a user password, such as in response to a request from the user. In another example, a user may successfully login to the human resource management platform 100 with a valid username and password and manually invoke the UpdateUser service to change an aspect of the user's account (e.g. password). A user manually invoking UpdateUser may be considered a self-service aspect of the human resource management platform 100. Services such as ProcessLogin and CancelLogin may be invoked automatically. In an example, a user selecting a 'login' type button on a login screen of the user interface may automatically invoke the ProcessLogin service to perform user credential validation. If the credential validation fails, CancelLogin may be automatically invoked. Manual use of these services may support an administrator creating login credentials for a user account (ProcessLogin) or removing a user (CancelLogin).

The human resource management platform 100 may include publication change services to facilitate publishing changes to data or data elements. Changes to data, such as databases of the human resource management platform 100 that are made by both internal and external applications may be published. In an example, an internal application that makes a change to employee email contact information may publish that information so that subscribers to the publication change service may receive the updated employee email contact information. Similarly, an external application, such as a third party health insurance application, may publish information about changes to employee status (e.g. change in coverage selected, change in coverage status) and the like. Publication change services may also provide queue management for subscribers to the service so that a higher priority publication may be pushed higher in a queue of a subscriber than a lower priority publication. In this way, urgent changes or changes that may be required to fully support subsequent changes may be processed before less urgent or dependent changes. Internet publication and change notification methods such as RSS may be supported by the publication change services of the human resource management platform 100.

The human resource management platform 100 may use a publication change service to manage subscription to third party or external applications to facilitate receiving information. The business functions and other element of the human resource management platform 100 may use the publication change services to facilitate timely updating any externally supplied data used by the business functions. Such inbound data may be published to the human resource management platform 100 with certain policies and attributes determined by the source system of the data. The publication change services may process the attributes to ensure compliance with the policies is maintained as data is published within the human resource management platform 100. Publication methods such as RSS may be included in the publication change services inbound capabilities.

Publication change services may work cooperatively with other elements of the human resource management platform 100 so that the publication change service may receive a confirmation of receipt from the other elements. Alternatively, the publication change service may issue announcements or push changes to subscribers without accepting or requiring a confirmation of receipt.

The publication change services may monitor a data repository or some portion of a data repository so that any changes made to the data repository can be published. Monitoring may be based on events—such as changes, on a schedule—such as each hour, on a request—such as a business function initiated subscription request, and the like. Although the publication change services may monitor a data repository to detect changes to the repository, the publication change service may be configured to only publish certain data elements or classes of elements. In an example, a data repository that contains employee confidential and non-confidential information may be monitored, yet only changes to the non-confidential information may be published when a change is detected. The human resource management platform 100 may support data in a data repository that can be published without using the full capabilities of the publication change services. In an example, data in XML file format in a data repository may be published to applications of the human resource management platform 100 that use XML formatted data simply by transferring the XML formatted data to the applications.

Elements of the human resource management platform 100, such as internal applications, business services, business functions, data access components, platform services, publication change services, and the like may use XML or JAVA to communicate. XML Schema such as OAGIS 8.0 and HR-XML standards may be employed in communications. Communications may also be accomplished by forming, exchanging, and decoding Business Object Documents that may themselves be encoded in XML. A business object document of the human resource management platform 100 may include an application area (e.g. for identifying a sender) and a data area (e.g. for defining a business operation).

A business object document may include an XML verb—such as add, delete, lookup, and the like, and a noun—such as a data value, data field, and the like. A business function or service receiving the business object document may use the data referenced in the noun to perform the function described by the verb. In an example, an UpdateDependents verb with a Dependent noun may add the name of the dependent to the employee's list of dependents. The business service or function that performed the UpdateDependents may provide a business object document response that includes information such as date of update, status of the update, flags or messages returned by the business service, and the like. The business object document communication flow may include request-response XML verb pairs that define a service method. In an example, a lookupDependents business service method accepts an XML document conforming to the LookupDependents schema and responds with an XML document conforming to the ShowDependents schema. Communicating through business object documents also facilitate making changes to functions, services, and applications, such as program or algorithm changes, without having to change aspects of the communication or the interfaces to the human resource management platform 100 elements.

Business object documents may be used in communication between the human resource management platform 100 and external services, applications, users, devices, and the like. To provide security, and maintain compatibility with industry standard messaging and communication systems, a business object document may be wrapped in an envelope such as is used in web service requests defined by S O A P. Security, error checking, and the like may be supported by through the enveloping process, thereby allowing the human resource management platform 100 elements to focus on the content of the business object document.

The human resource management platform 100 may also include business services to provide service to applications. Business services may include managerial services for managing proxies and authority delegation, payroll services for processing employee related pay, compensation services for planning and managing compensation plans and programs, benefits services for beneficiary and dependent management, communication services for handling corporate communications, corporate services for corporate wide data such as job descriptions and directories, worklist services for individuals to access work items, self-service services for employees to access and maintain information, security services for managing users and access, budgeting services for administering and monitoring budgets, reporting services, integration services for providing transfer management, hierarchy services for establishing and maintaining employee hierarchies, process services for defining and monitoring business processes, and performance management services for facilitating performance rating and goals management.

The platform may support off-cycle changes to any aspect of compensation, performance, and benefits. Off-cycle changes may be integrated with focal transactions so that a user, such as a manager, may access and maintain both off-cycle and focal transactions through a single user interface. Such integration may facilitate giving a manager the ability to plan all compensation changes for an entire compensation cycle (e.g. one calendar year) through a single interface. The same interface may be used throughout the year for off-cycle changes and maintenance, such as for approving a compensation plan and for acting on the approved plan. The single user interface for focal and off-cycle changes may also be facilitated by budget sharing, application logic and rule sharing, and the like. In an example, an employee may achieve a performance goal that has associated with it a compensation increase. The employee achieves the performance goal in May and the next on-cycle compensation adjustment is December, so the employee's manager initiates an off-cycle change. The manager may use the single interface herein described to perform all the necessary steps to execute the off-cycle adjustment. In this example, because the compensation adjustment is included in the compensation plan since it was tied to a performance goal, the manager may review and approve the change to the employee's compensation plan through the single interface. The manager may, within the same interface establish any new compensation plans, such as any changes that may be approved at the end of the current compensation cycle. A single interface for focal and off-cycle compensation, performance, or benefits changes and maintenance eliminates needing to learn separate interfaces for off-cycle and on-cycle compensation planning and maintenance activity. The single interface also allows automatic coordinated access to plans and budgets, rather than using a disconnected off-cycle system, such as separate spreadsheets. Such disconnected or off-line methods prove impractical and error prone when applied to organizations with a large number of employees.

The human resource management platform 100 may include applications targeted to solve a variety of human resource and benefits administration problems. Applications of the human resource management platform 100 may include business applications such as benefits administration. A benefits administration application may provide a comprehensive benefits administration solution that facilitates handling a wide variety of benefits plans, programs, events, changes relating to plans and employees, very large employee populations, cross company integration, third party integration and the like. By joining a benefits administration application with a scalable human resource management platform, a benefits administration solution may facilitate extending best-in-class benefit programs throughout a multi-national organization. Applications of the human resource management platform 100 may be implemented based on various technologies to provide easy integration. In an example, applications may be written in the Java programming language, and they may be built using domain-driven design principles with a web-based rich client interface using ADOBE FLEX technology.

A benefits administration application may provide a variety of features to achieve benefits integration in an organization. A user interface of the application may include presenting all relevant information, feature selection, notifications, and user information on one computer display screen, or a linked group of screens. Such a user interface may facilitate operation and training to operate the application, while preserving time efficiency during use or maintenance.

The human resource management platform 100 may facilitate automated benefits review workflows through the use of online benefit review forms. The online benefit review forms may be integrated with the other aspects of the human resource management platform 100 such as employee management, benefits provider management, corporate objectives, and the like to facilitate use and data consistency throughout all the aspects of human resource management supported by the human resource management platform 100. Online benefit review forms may include configurable benefit review forms that support the best practices of the corporation. Aspects of the forms may be configurable specifically to ensure best practices are observed, while other aspects of the form may be configurable to support individual manager or employee needs.

The human resource management platform 100 may also support online benefit review form creation and management. The human resource management platform 100 may also support template based creation of online benefit review forms. In an example, a template may identify specific configurable areas of a benefit review form that may be specified by a facilitator of the human resource management platform 100. These areas may include corporate best practices, industry or government standard review criteria, employee based information from other aspects of the human resource management platform 100, and the like. The template may also include user configurable areas that may be configured by a manager and/or an employee to support aspects of benefit review not covered elsewhere in the form. In an example, a benefits provider portion of a benefit review form may be identified in a template as restricted from manager or employee changes because the information would be imported from the benefits provider management portion of the human resource management platform 100.

Online benefit review forms may facilitate harmonizing benefits review across departments, business units, geographies, subsidiaries, languages, and international laws, while offering the flexibility to support a wide variety of management styles, employee input, benefits administration plans, and the like.

A benefits administration application may include reporting facilities. Reporting may include standard reports and ad hoc reporting capabilities to support a wide range of reporting requirements. Reporting and analytics that may be integrated with the benefits administration application within the human resource management platform 100 may facilitate easy access to actionable data and analysis results. In an example, an analysis of benefits, such as a coverage analysis, may be included in the benefits administration application so that the coverage analysis may be reported per employee, per group, and the like.

The human resource management platform 100 may include audit features such as audit trails. Audit features may be associated with the benefits administration application. Audit features may support establishing audit monitoring tools to facilitate automated auditing of transactions associated with the platform. Automated auditing may facilitate compliance with accounting and other standards such as Sarbanes Oxley, OSHA, Fair Labor Standards Act, Minimum Wage Standards, and the like. Auditing may include confirming an effective benefits function has been established, all employee data in the system is accurate and appropriate to the personal issues of the employee, confidentiality of personnel data is maintained, benefits data is completely and accurately accumulated in underlying financial records in the proper accounting periods, reimbursements and other payments to employees (e.g. basic payments, tax adjusted payments, and the like) are properly calculated and authorized, tax legislation is being followed (national and local legislation) including entry verification, benefits costs are in line with budgeting objectives, and the like. Audit trails may facilitate recovery of entries, downloads, and changes in data associated with the platform 100. Feedback logs may be associated with the benefits administration application so that any form of feedback such as employee feedback, auditor feedback, visitor feedback, manager feedback, vendor feedback, provider feedback, and the like may be recorded. Feedback logs may periodically be reviewed by management, an administrator of the benefits administration application, or other participant in the platform 100. The review of feedback logs may be automated by a computer system performing keyword matching of feedback logs against a list of critical keywords or phrases. This may allow a feedback log entry that meets a criterion associated with keyword and keyphrase matching may automatically be presented to an administrator, management, or other appropriate participant in the platform 100. In this way, although all feedback logs may be recorded and permanently stored, those meeting an escalation criterion are sure to receive a human review by the appropriate person.

The benefits administration application may facilitate configuration of benefit programs. Benefit programs may be configured by a participant of the human resource management platform 100 such as a client. Benefit program configuration may include configuring benefit plans, future accounting periods (e.g. upcoming year benefit target plans), and the like. Configuration options associated with the benefits administration application may accommodate complex benefit plans, such as plans that incorporate automated benefits adjustments, and the like.

The human resource management platform 100 may be associated with input compliance verification facilities. Compliance of input may be valuable and useful to a benefits administration application by providing spelling checking, legal language checking, and the like. Compliance of input verification may include verifying input meets corporate and legal standards (e.g. minimum wage standards), and the like. Spelling checking may facilitate reducing mistakes in data records such as employee names. In an example, an employee name being input may be compared to all valid employee names and the input may be flagged for further verification if it does not match any of the valid employee names. This may also be useful to help distinguish between similar employee names, such as employees Robert Smith from Bobby Smith when the name Bob Smith is entered. Legal language check may facilitate ensuring that benefits or other requirements on which benefits may be based does not violate any regulations, contracts, and the like Benefits modeling may be associated with the human resource management platform 100 such as through a benefits administration application. Modeling benefits may be useful and beneficial to employee retention planning by providing a visible or tangible benefit to achieving a level of employee retention included in the modeling. The benefits administration application may allow employees to interact with the platform 100 to model various benefits alternatives based on aspects of benefits such as coverage, costs, providers, geographic coverage limitations, optional coverage, and the like. In an example, an employee who is interested in purchasing additional life insurance coverage may view the costs, eligibility conditions, limits, and other requirements of the coverage through the platform. The employee can further model steps for achieving various aspects of the requirements, such as taking and passing a physical exam or other medical assessment. In this way, the employee may determine that passing the physical exam is highest priority for eligibility.

Conventionally, benefits programs have been administered on a plan-year basis that shoehorns all employees into one planning and election cycle that is based on a calendar date rather than on natural dates related to employee needs for benefits. A plan-year based benefits program may limit changes an employee can make during the plan-year. This generally results in limited options being available to the employee other than during an open enrollment period prior to the start of a new plan-year. The benefits administration management business application of the platform 100 provides support for coverage periods that are distinct from but knowledgeable of plan-year programs. A coverage period may include any timeframe during which no changes are made to an employee-specific benefits program. Therefore, each coverage period can be individually managed. This reduces the complexity of real world changes that occur outside of a plan-year enrollment period. In a coverage period example, an employee who has a baby and changes health plan options from an employee plus spouse plan to a family plan would enter an event that would signify the end of one coverage period and the start of another coverage period. The one coverage period would be characterized by the employee plus spouse plan and the other coverage period would be characterized by the family plan. A change that causes one coverage period to end and a new one to start may be employee generated, company generated, provider generated, a combination of the two, and the like. In another coverage period example, a company may configure benefits premiums to be adjusted annually due to health insurance provider requirements. The date on which the premiums are adjusted would signify the start of a new coverage period for all affected employees.

The platform may facilitate support for benefits coverage periods through the effective dating framework described herein. When effective dating is applied in conjunction with coverage periods, benefits selections can be planned for a future coverage period while the current coverage period may be maintained within the same model/database. The effective dating framework advantages for a benefits administration management business application may be described through an example. In the example, a company using the platform 100 has defined a new coverage period to start January first. Therefore, in November, employees make benefit elections to be effective when the new coverage period starts. When the elections are made, the platform automatically calculates all the coverage changes through the remainder of the year under the current year rules, and propagates the changes into the next year, correcting or adjusting based on next year rules, and stores all the results in the effective dated model. To provide benefits information for the current coverage period, the platform 100 may set a target effective date to "today" and perform a query of the model based on this target date. To provide benefits information for the new coverage period, the platform may set a target effective date to "January" and perform a query of the model based on this target date.

To provide a an accurate view of the benefits information for the new coverage period starting in January, the benefits administration application may set the target effective date to some time in January so that queries of the model will return information that is based on the benefits elected for the new coverage period. This may allow sending extracts of data to a carrier that the carrier can use for planning of the new coverage period elections. To the extent that premiums are charged for a future coverage period, data extracts based on the future effective date will allow billing in advance of the new coverage period. For each employee who requires no changes in current or future coverage period benefits an itemized breakdown of anticipated billing for the new coverage period can be provided. A billing cycle generally has anticipation component (e.g. elections for the new coverage period) and a correction component (e.g. for changes made since the last billing period). While the correction component can be determined based on the current situation when a bill is prepared, the anticipation component must be determined by looking forward and calculating the bill based on the new time period selected through effective dating.

A benefits plan may itself be effective dated. Changes to a plan can be treated like any other benefits-related event and therefore can be effective dated. An election period that precedes a change in the plan may be associated with an effective dated event that can be derived from the effective date of the plan change. By configuring changes to the plan and enrollment periods as effective dated events, the administrator is given visibility to the actions related to the plan change. With the application of effective dating, mid-coverage year updates are more easily managed, tracked, and integrated. Precision is also significantly improved because all of the information is maintained for all time in the model and can be retrieved based on setting a target effective date for queries to the model.

The benefits administration management business application may perform coverage repair to ensure that changes that may impact coverage are properly applied to all object versions and generations. In an example of coverage repair, if an employee declares an event in December, and the employee has new benefits starting in January, the application adjusts the target date to the date of the December event and computes all benefit impacts based on rules in effect at that time. The application then switches the target date to January when the new benefits (and their associated rules) take effect, and computes any necessary changes that propagate into the new plan year based on January benefits rules and updates the future effective dated object version accordingly. In this way, the impact of an event that spans a current and future coverage periods is properly accounted for and coverage is repaired.

The benefits administration management business application may support decision-tree-based benefits eligibility selection. Benefits eligibility selection may be based on a hierarchical decision tree structure that supports differentiated benefits within a corporate wide benefits plan. Unlike flattened plans that do not properly account for dependencies between selections, decision-tree-based eligibility provided by the platform 100 allows selection of various benefits and benefit plans through a structured process based on a decision tree.

Eligibility at each level of the tree may be based on a variety of factors that can be determined within the context of selections (decisions) already made by the employee. The application may use factors such as employee status (exempt, non-exempt, union-represented), employee business unit, employee family criteria (single, married, married plus children), and the like to determine which selections to offer at each decision point in the tree. In an example, union employees may have certain benefit options by virtue of a collective bargaining agreement and may not be eligible for other benefits; company officers may be eligible for certain options that are not available to employees who are not company officers. Based on these and other factors, options will be presented to an employee making benefits selections.

The benefits administration business application may include a user interface that presents election choices based on decision tree that is adapted based on the current user credentials and the decisions made by the user. This approach does not limit the number of decision points, options to present at each decision point, or factors to consider in determining eligibility. The user may make an initial election and this initial election may satisfy a prerequisite for offering the user additional benefit elections.

The user interface of the benefits administration business application may provide time-based graphical representations of data collection that allows a user to view how benefits related information changes over time. Because benefits information changes over time, a time-based graphical user interface may make understanding the information more intuitive and understandable to the occasional user. Most employee users of the benefits administration application are infrequent users because interaction with benefits for administration or management purposes primarily occurs after an event-based change (birth, death, transfer, etc.). Therefore the information presented in the user interface is configured for rapid understanding.

The user interface may represent benefits in the form of a timeline that may depict coverage over time and how it changes. As new plan year approaches, a timeline view of the enrollment periods and deadlines for entering changes may be much more impactful and beneficial to a user than a list of dates. In addition, the benefits administration application can provide alerts (notification) to a user regarding upcoming deadlines or due dates. The alerts may be configured so that they can be generated at specific times or relative to an event date.

Data entry in the user interface may also include real time input validation so if the employee has entered incorrect or questionable information, feedback may be displayed immediately to the user so that the entry can be corrected while the user is still working on entries rather than after a complete screen is loaded and a 'next' button is clicked. Data entry may also be automated so that information that is known to the application can be preloaded into data fields to reduce the time required for data entry and to reduce errors associated with data entry.

The benefits administration business application includes an administrator user interface that may provide every-day users with ready access to most often used features, such as employee search, acting on behalf of the employee, coverage review, dependent data, past activity, and the like. Data may be presented in a timeline view that simplifies understanding of events, changes, and the like that may impact benefits. The timeline view, when combined with effective dating may show user activity for any period of time, such as an enrollment period that occurred prior to a new coverage period. The administrator user interface may answer questions visually by allowing the user to specify an event (a specific employee move), event type (dependent change for an employee, enrollment period), date (last day of an enrollment period), and displaying all pertinent benefits information in proximity to the specified event or date. In an example, a timeline view of an enrollment period may depict the enrollment period and may show specific points of user interaction with the benefits administration and management business application. Details of the points of user interaction may be viewed by selecting one or more of the points. Details may include user login activity, user benefits review activity (e.g. which benefits were reviewed, which were elected, and the like), and user changes.

The administrator user interface may also facilitate requesting and presenting plan migration or benefit enrollment reports that may show aggregated changes in plan selection or enrollment. These reports may show trends associated with plan membership, benefits options selections, and the like that may help in planning for offerings of benefit options in future coverage periods. In an example, after a merger of two companies, employee migration within the offered benefits may indicate that one or more plans or options are preferred over another.

The user interface of the benefits administration application may be configured to present benefits information, receive user input, and direct the user input to the functional modules of the platform, resulting in one or more updates of the information presented in the user interface.

The benefits administration application user interface for inputting and presenting benefits related information may be configured with additional support screens for presenting information associated with benefits planning and/or management. The support screens may present information used to derive the data elsewhere, such as formulas, rules, guidelines, sources of information, pending information, and the like. The support screens may also facilitate inputting information that may be used elsewhere in the benefits administration application, such as an employee's social security number, or an employee's educational degree, and the like. This information may facilitate identifying the employee who is the subject of the benefits planning activity. Information such as the number of employees having similar job functions, their average benefits cost, and the like are other examples of support screen information.

The present invention relates to an enrollment and management system for eligibility-based human resource benefits administration that may be used by an employee in a self-service operation. A human resource management system may enable employees to view and perform functions related to benefits administration through a user interface featuring usability and presentation features to facilitate the employee's experience. The user interface may be used to access, modify, and review employee benefits. Data feeding into the human resource management system may be accessed from a database. The database may be a data access persistence database. The benefits administration application may be capable of organizing and displaying time-sensitive changes. For example, employees may be able to examine benefits eligibility and coverage data as well as other human resource attributes at any point in time, either forward or back in time, instead of only at a single point in time or the current point in time. The benefits administration application may access data for any effective date and obtain an accurate view of what the employee was eligible for during that period and what elections the employee had made during that period. The benefits administration application may include a data integration processing component that may receive data from the employer and other sources that may be relevant to functions in benefits administration. Data may be effective-dated at various levels of aggregation, and the component may reconcile these data with existing data to maintain benefits coverage consistent with the merged data over time. Data relating to employees, dependents, beneficiaries, benefits eligibility, event processing rules, current enrollments, payroll contributions, and the like may entered into the system through the user interface. The data integration processing may also enable creating and formatting data to send to other parties, such as employers, carriers, COBRA processors, and the like.

Figure 10:
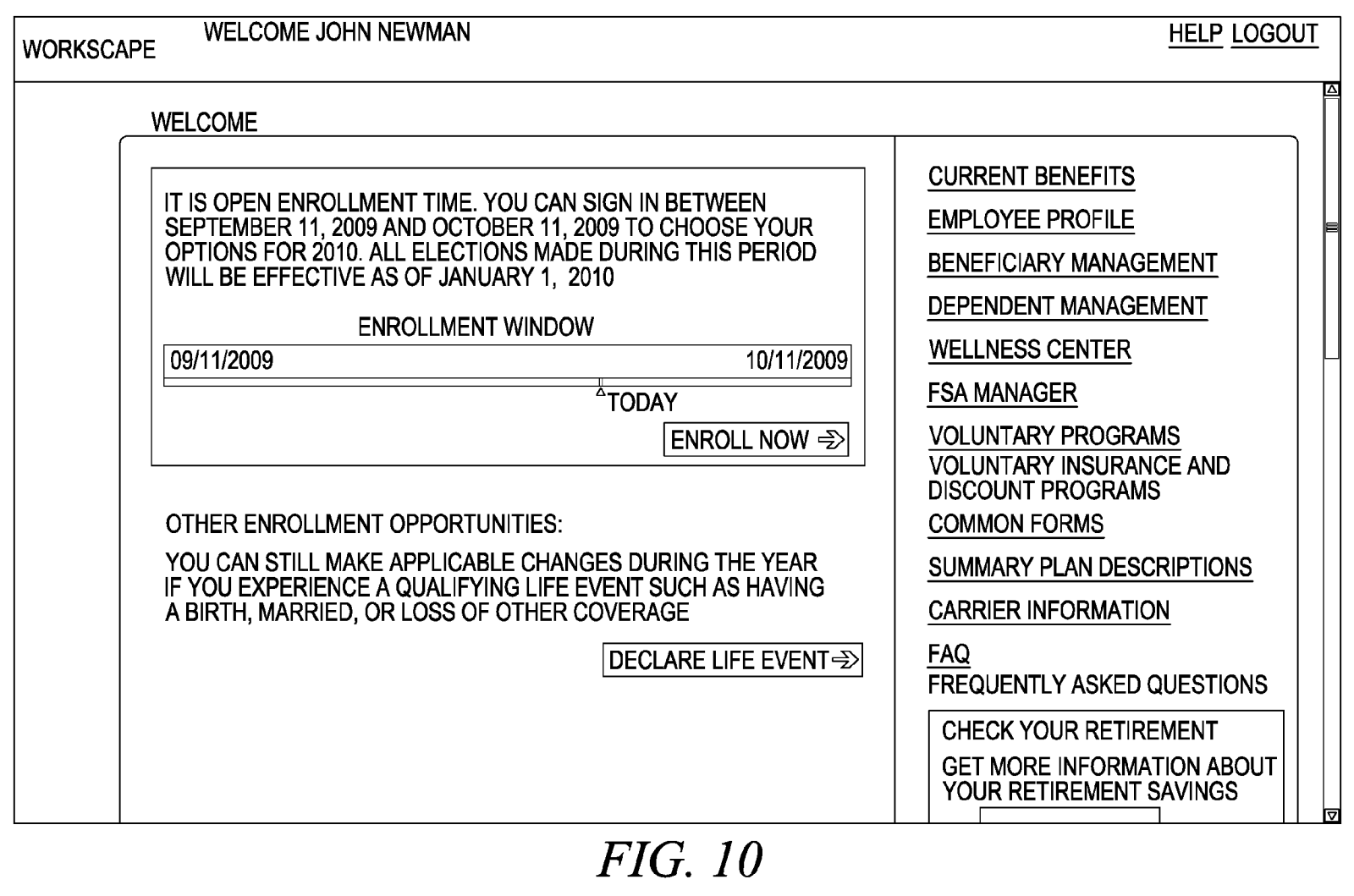

Referring to FIG. 10, a welcome screen of the benefits administration application may comprise notices relating to benefits coverage, such as a notification of open enrollment, with an option to take action relating to the notice. The welcome screen may comprise a timeline for various benefits actions to be taken, reviewed, cancelled, that are pending, and the like. Certain qualifying life events may present the opportunity to modify a benefits enrollment or coverage status. From the welcome screen, an employee may have the option of declaring a life event or perform enrollment activities related to a previously declared event. Other options accessible through the welcome screen may comprise access to current benefits, employee profile, beneficiary management, dependent management, wellness center voluntary programs such as voluntary insurance and discount programs, common forms, summary plan descriptions, carrier information, and frequently asked questions and the like. Throughout the application, instructions may appear on the screen being accessed. The instruction screens may be editable, personalized, configurable, and the like.

Clicking on the 'employee profile' may display a screen displaying the profile associated with a user login as shown in FIG. 11. The profile may include information such as name, address, phone number, email address, job title, location, union, gender, payroll frequency, hiring data, identification (ID) of the user, present status of the user, department ID, division ID, participation group and the like.

Clicking on the 'beneficiary management' link may display the beneficiary maintenance information on the screen as shown in FIG. 12. The beneficiary information presented on the screen may be edited/updated using an action button that may allow update of the existing beneficiary information. Further, the allocation percentage for each beneficiary benefit may be defined for each beneficiary by entering an appropriate number. For example, the beneficiary information may be selected for a basic life insurance, accidental death & dismemberment insurance, supplemental life insurance, business travel & accident insurance, 401 k and the like.

The screen may include a drop-down menu for adding a beneficiary and/or selecting a beneficiary type such as a person, trust, estate, charity and the like. Clicking the 'Add Beneficiary/Allocation' button may result in a new screen having a form for entering data corresponding to the beneficiary. The data may include name, federal tax ID, establishment date, country, address line 1, address 2, city, state, zip code, email, and the like. The data can be submitted by clicking on the submit button.

The 'dependent management' link, when clicked displays a new screen as shown in FIG. 13. This screen displays dependence maintenance data that includes the particulars of the dependents associated with the user. For example, the dependent maintenance data may include name, relationship, birth date, medical, dental and some other type of data. An Action tab on the dependent maintenance screen allows editing of dependent maintenance data, when required.

Figure 14:
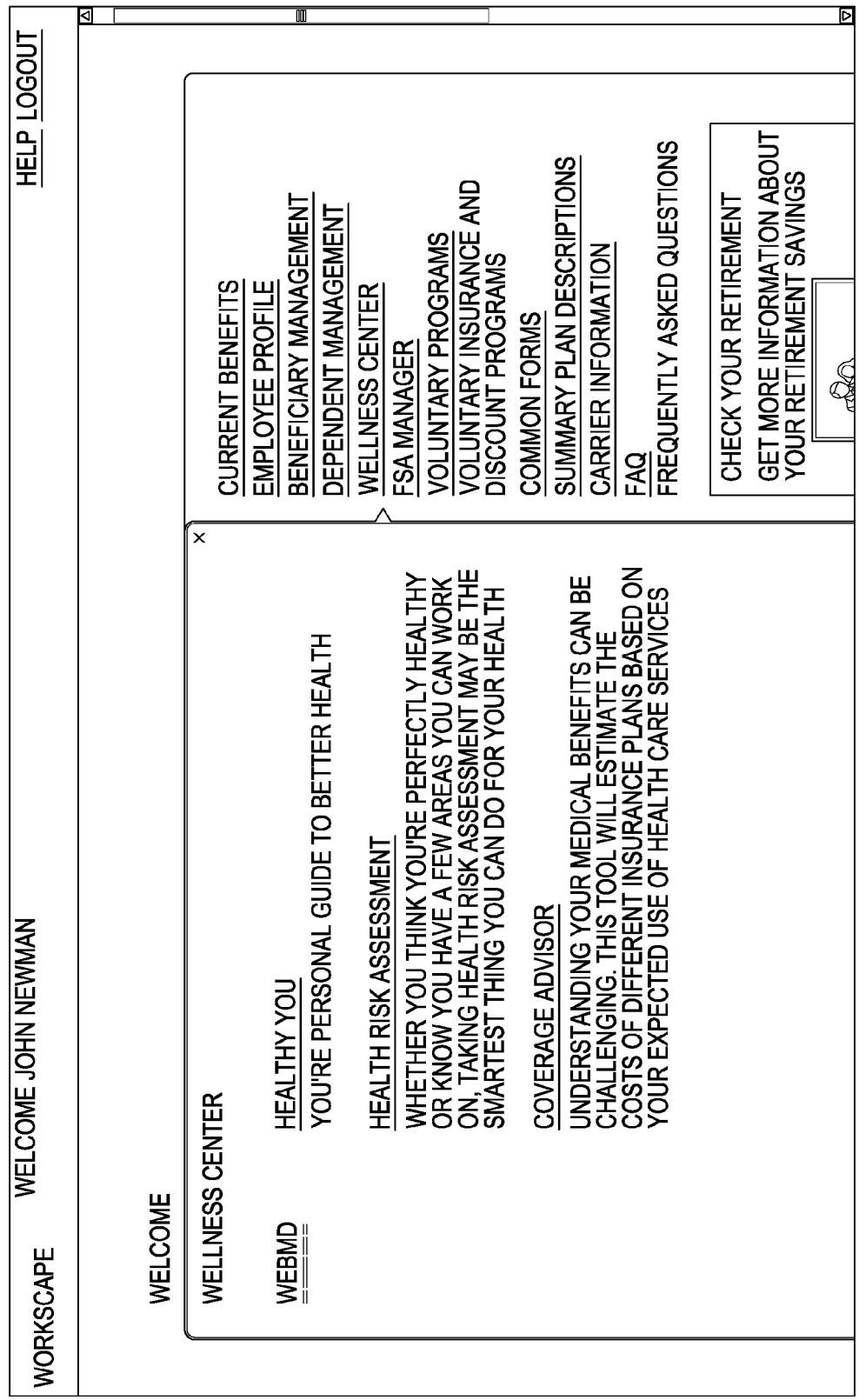
FIG. 14 depicts a screen for wellness centre.

The welcome screen includes a link to a 'wellness center' having links to information about health. Clicking on this link results in another screen as shown in FIG. 14. The screen displays a number of links related to health improvement. For example, the display screen may include links to other screens such as Healthy You, Healthy Risk Assessment, Coverage Adviser, and the like which may present other screens displaying information about health and other health related articles.

Figure 15:
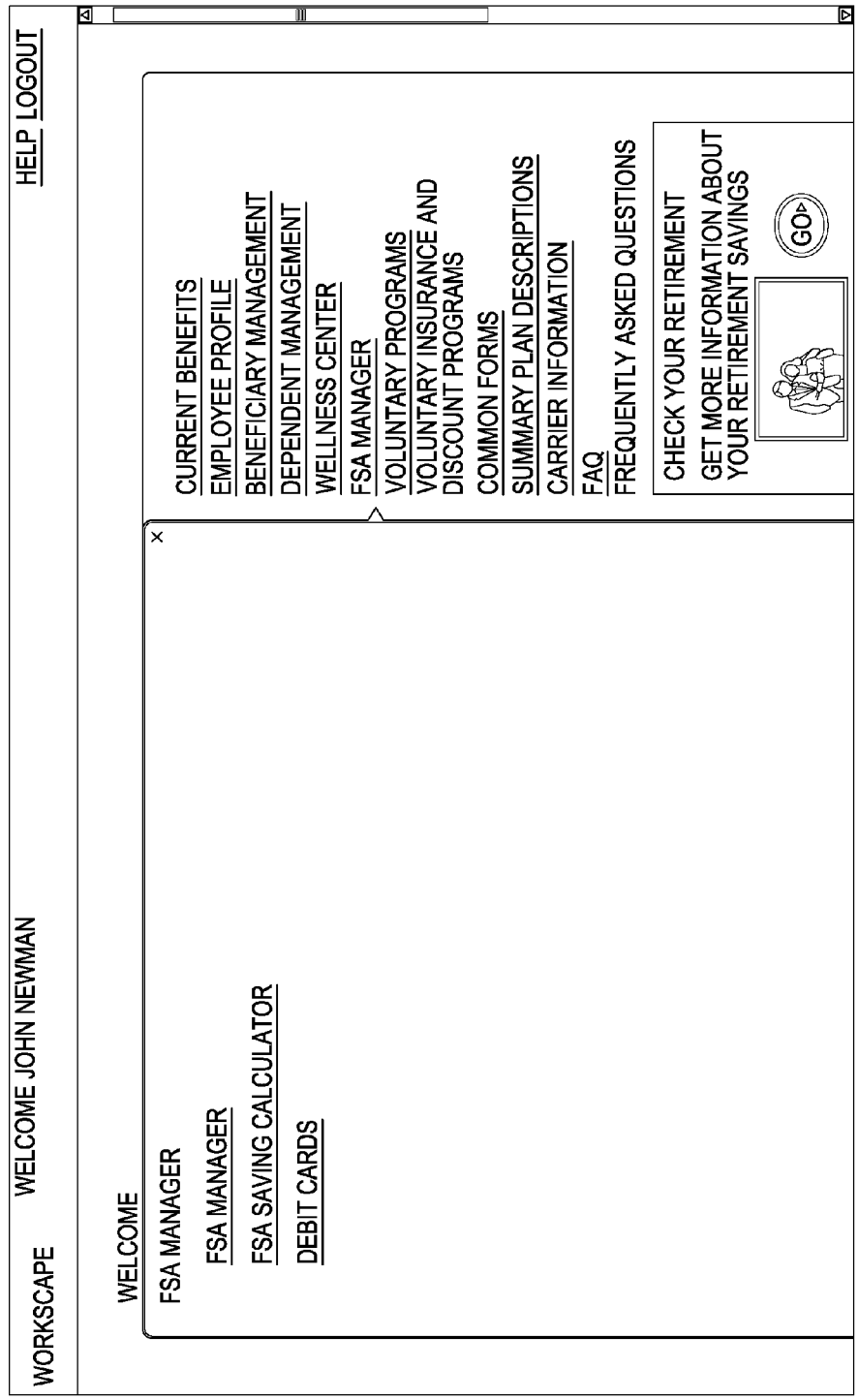
FIG. 15 depicts a FSA manager screen.

Clicking on the 'FSA manager' link may display a list of additional links on the screen that may include the FSA manager, FSA saving calculator, debit cards and the like as shown in FIG. 15. The FSA manager may initiate another screen that shows account information such as account name, status balance and the like. Likewise, the FSA manager may list recent claims activity such as claim ID, vendor/provider, date of service claim, amount paid, amount status and the like. Similarly clicking on the FSA register may display screens corresponding to the FSA register. Clicking on the debit card link may provide information associated with the use of credit card for health payments.

The welcome screen may include a 'voluntary programs' link and clicking on this link may display information related to voluntary programs and discounts as shown in FIG. 16. The screen may list the available voluntary programs and the discount schemes available to the user. For example, VIP pet insurance, 1-800 flowers, auto discounts and some other type of information.

Referring to FIG. 17, a user clicking on 'common forms' may access a screen view of common forms available to the employee with links to directly download a form to the user's computer. For example, the forms may relate to 401K fast facts, a dental implants brochure, an insurance carrier summary, an insurance carrier rollover maximum, a disabled dependent affidavit, a domestic partner affidavit, an election waiver form, evidence of insurability, health insurance responsibility disclosure form, and the like.

Referring to FIG. 18, clicking on 'current benefits' may access a screen view of the employee's current benefits. Current benefits may include employee paid pre-tax benefits, employee paid post-tax benefits, employer paid benefits, and the like. For each benefit, option or coverage level, effective start date, cost, pre-tax cost, post-tax cost, and the like may be listed. In addition, a print button may be provided to facilitate the printing of status of current benefits on a paper.

Figure 19:
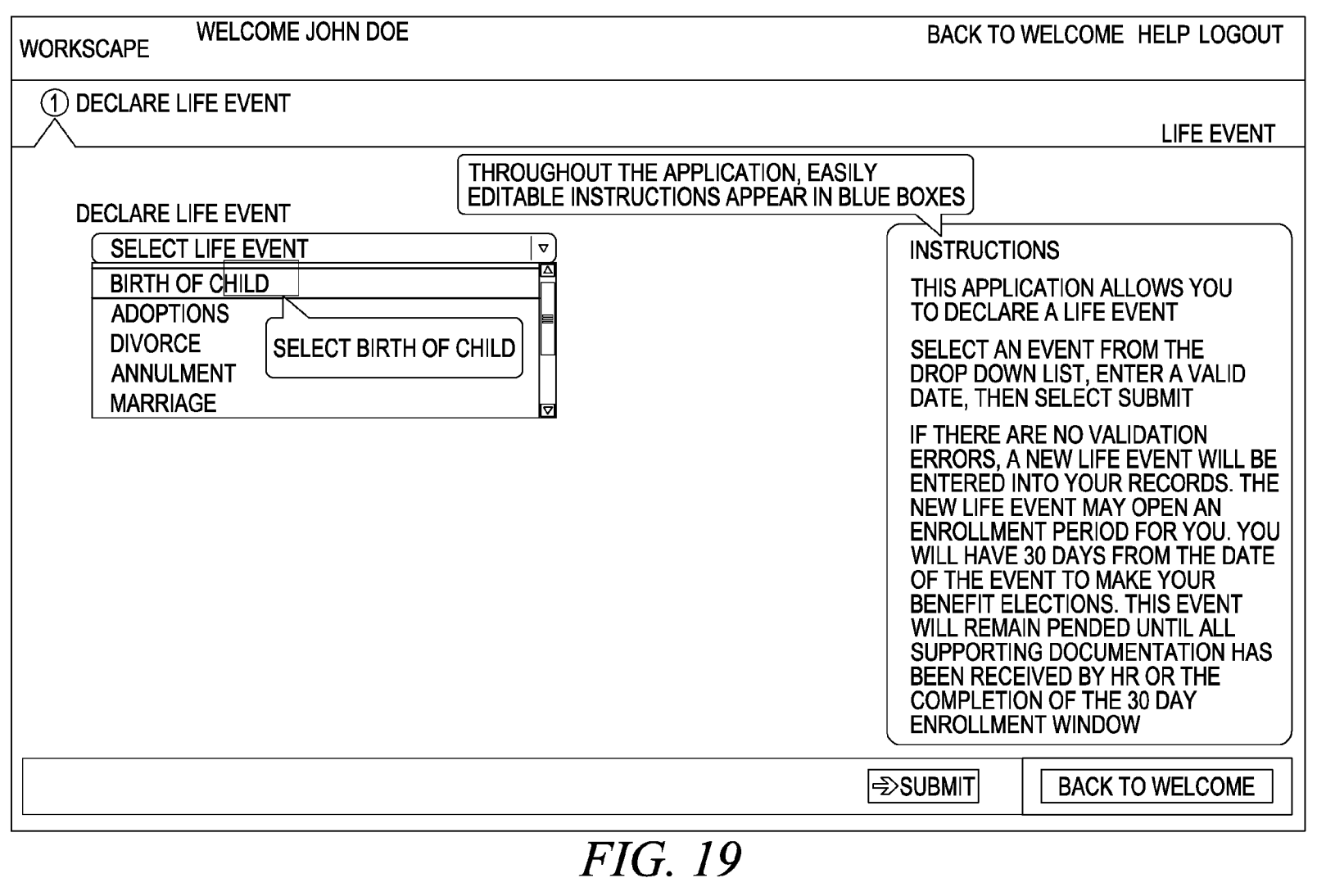

Referring to FIG. 19, which depicts a screen for declaring a life event, from the welcome screen (e.g. as shown in FIG. 10), a life event may be declared. Qualifying life events may include the birth of a child, adoption, divorce, marriage, loss of other coverage, death of a dependent, and the like. The life event may be chosen from a drop-down menu, and the like.

Figure 21:
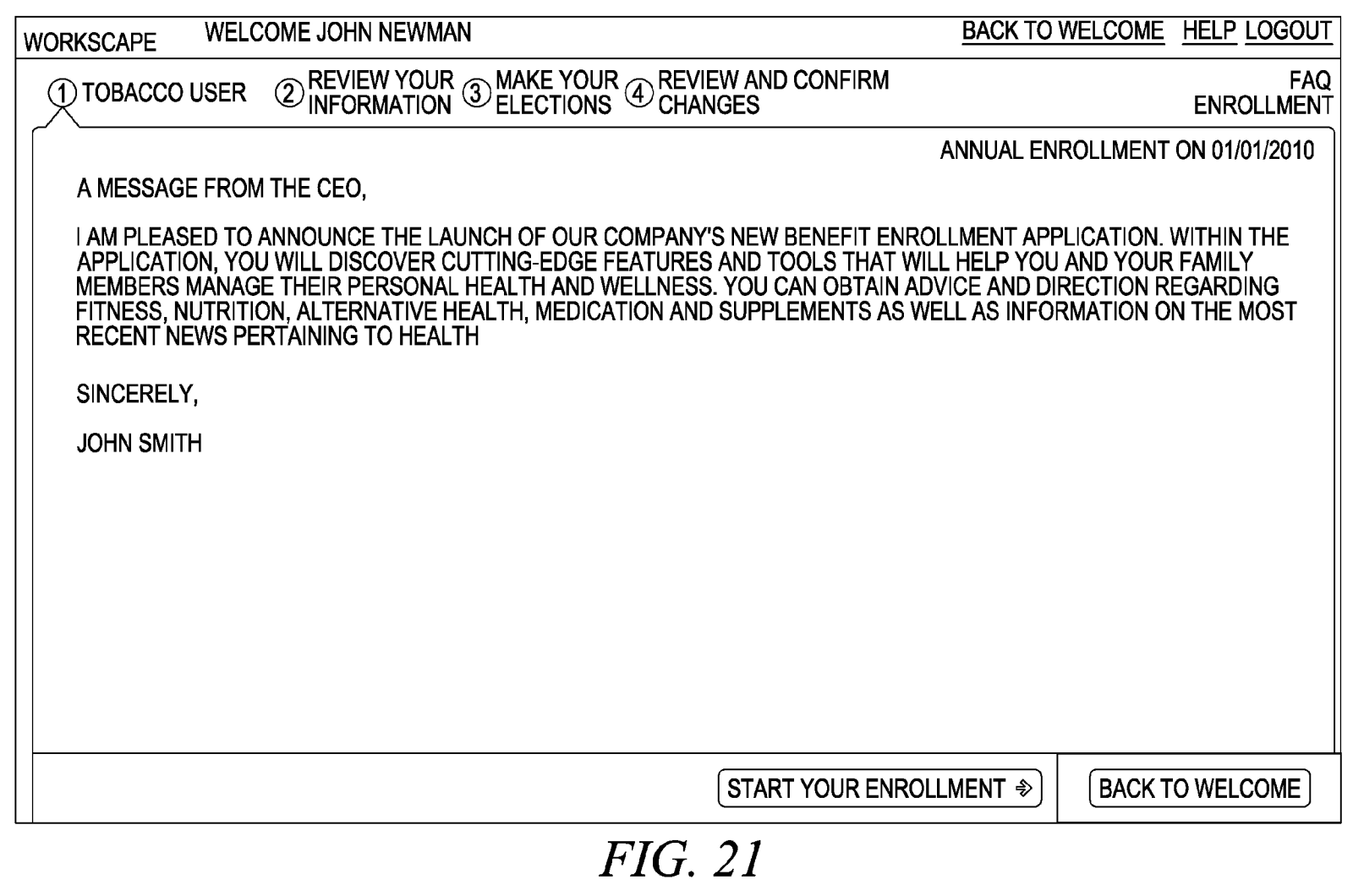

In FIG. 20, an event date is entered or chosen from a date picker corresponding to when the qualifying life event occurred. Notifications may be provided as to what actions may be taken and what is required from the employee in light of the qualifying life event. In an embodiment, the employee may be able to add a newborn child to existing medical insurance coverage, modify beneficiary information, increase flexible spending or health care reimbursement withholding, and the like. In an embodiment, a timetable or deadline for changes may be given. In an embodiment, declaring a life event may require providing supporting documentation. For example, declaring a birth may require submission of a copy of the birth certificate. Once the life event has been declared, the employee may enroll the new dependent. In an embodiment, the employee may be brought to an enrollment preview screen, such as in FIG. 21.

FIG. 22 illustrates a first screen of an enrollment process. The screen displays an option button to confirm the consumption of tobacco by the user in the last 30 days. The user may click on either 'Yes' or 'No' option for proceeding to the next step of enrollment.

Figure 24:
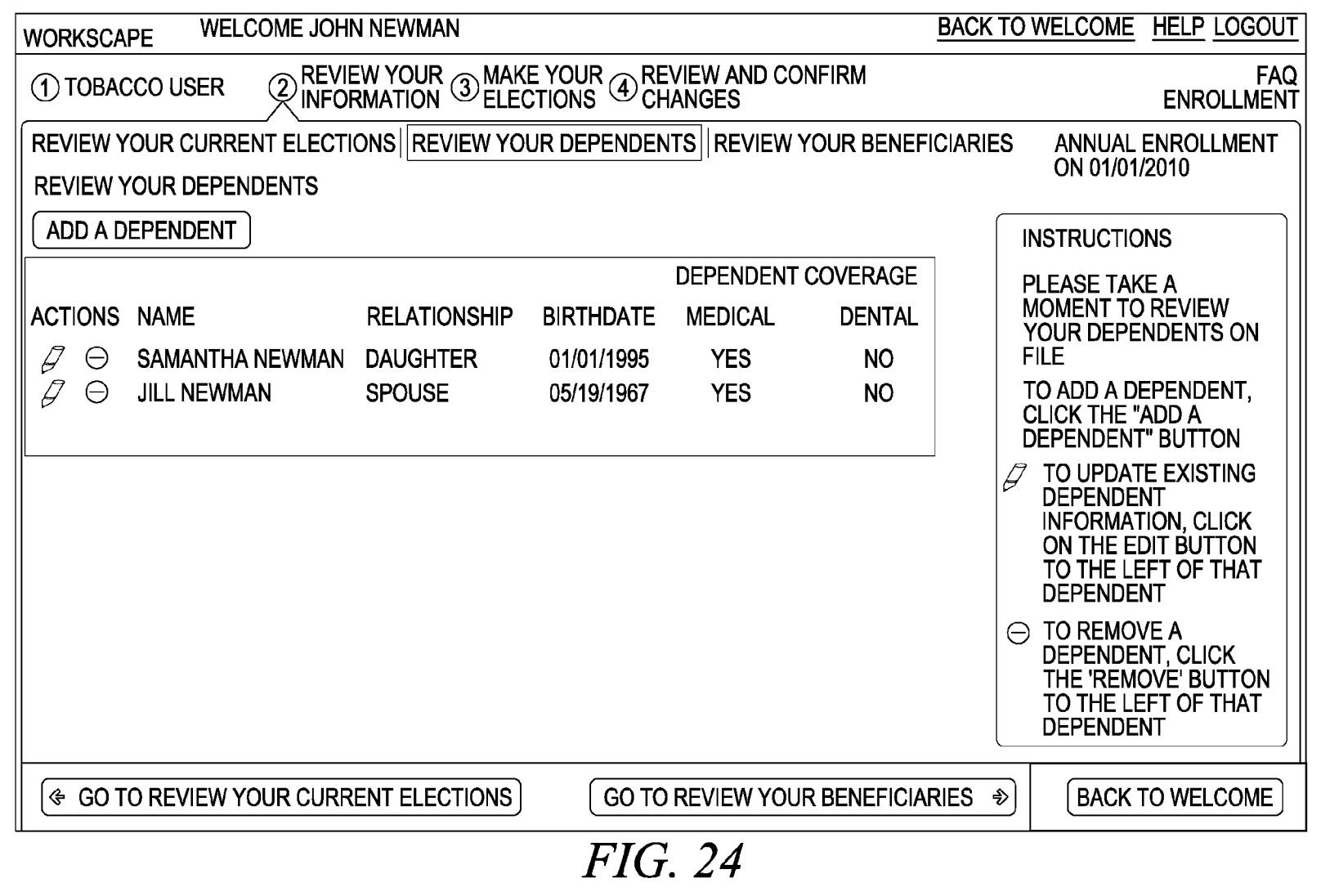

FIG. 23 depicts an enrollment screen for the benefits administration application that is part of the enrollment process started in FIG. 22. In this embodiment, enrollment may proceed in four steps as described here and above. Each step may be clearly laid out and described with its own phrase. In this example, Step 1 of enrollment involves confirmation from a user about the consumption of tobacco in last 30 days, Step 2 involves reviewing information of the current election, Step 3 involves making elections, and Step 4 involves review and confirmation of elections. Reviewing information may include reviewing current elections, reviewing dependents, reviewing beneficiaries, and the like. For example, when reviewing dependents in FIG. 24, a listing may show all current dependents with their name, relationship to the employee, birth date, dependent coverage, and the like. The employee may review the current election as shown in FIG. 23. Further, the employee may have the option of editing dependent information, removing a dependent, adding a dependent, and the like. Selecting the option to add a dependent may access a screen for adding dependent information, as in FIG. 25.

Figure 26:
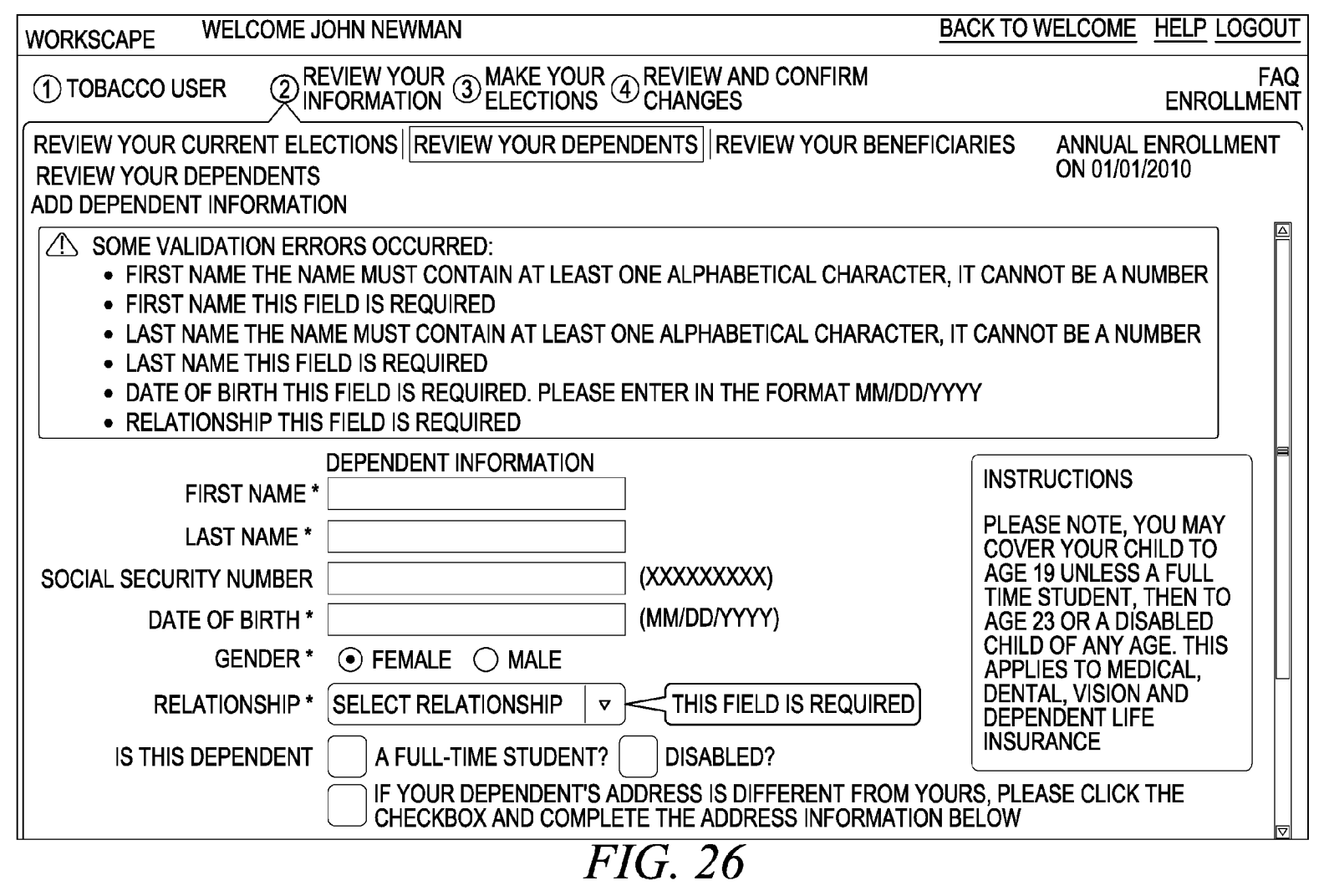

Dependent information added may include name, birth date, social security number, gender, relationship to the employee, student status, disability status, address, and the like. The address field may be auto-filled with the employer's address to save time in adding the dependent. The dependent information form, as well as all forms within the benefits administration application, may feature instant validation. Instead of having to submit the form in order to determine if any errors have been made in data entry, an auto-validation feature provides an indication that an error has been made by providing a signal at the field containing the error. For example, a social security number missing the ninth digit may cause the field to be highlighted. In another example, if the gender is indicated as male but the relationship selected is daughter, one or both of the fields may be highlighted or otherwise signaled as containing an error. Alternatively, a selection of "daughter" may invalidate the gender option "male" so that it is not selectable. Validation rules may govern form-checking and error alerts. A callout box for describing the validation error, as shown in FIG. 26, as well as a method for correcting the error may accompany the signal provided at the field.

Referring to FIG. 27, once dependent information has been successfully input, a review your dependents screen may be shown. In this example, a new dependent has been added but neither dependent has medical or dental coverage. This screen may provide the option to review beneficiaries.

Selecting to review beneficiaries may access the beneficiaries' page of the enrollment step, as in FIG. 28. Beneficiaries may be added for benefits such as basic life insurance, accidental death and dismemberment insurance, supplemental life insurance, disability insurance, business travel and accident insurance, 401K, and the like. Beneficiaries may be a person, trust, estate, charity, foundation, university, and the like. Any current beneficiaries may be viewed in the listing of beneficiaries, which may include beneficiary name, birth date, social security number, beneficiary type, beneficiary allocation, and the like. To add a beneficiary, the beneficiary type may be selected and beneficiary information may be added, as in FIG. 29. Certain beneficiary information, such as address, may be supplied without need to re-enter. Alternatively, beneficiaries may be selected from among the dependent pool. Referring now to FIG. 30, once the beneficiary has been added, a beneficiary type and an allocation may be assigned to the beneficiary or beneficiaries. The beneficiary type may be primary or secondary, and allocation may be anything from zero to 100%. Total allocation for all beneficiaries must not exceed 100%. If the allocation does exceed 100%, the auto-validation feature will highlight the allocation field alerting the employee that a correction should be made.

Figure 31:
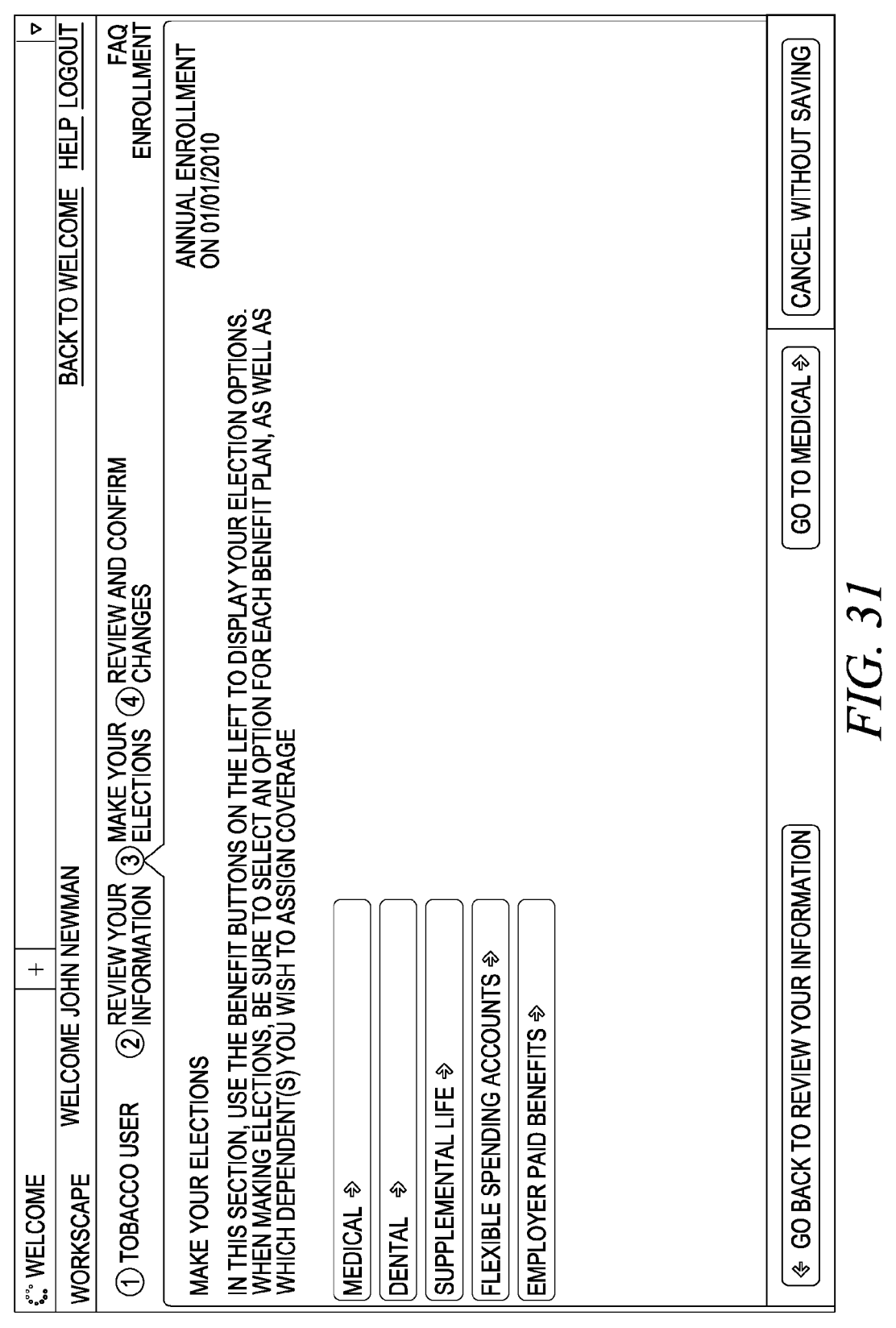

Referring to FIG. 31, the third step of the enrollment process may be making benefits elections. Elections may be made for medical coverage, dental coverage, vision coverage, supplemental life insurance, dependent life insurance, flexible spending accounts, employer paid benefits, and the like. In an embodiment, the employee may choose coverage from eligible possibilities.

Selecting medical coverage may access a medical coverage elections screen, as in FIG. 32. Elections may be eligibility-based. For example, the employee may choose to waive coverage or they may choose from at least one option for medical insurance. The costs for the medical insurance plans may be displayed to the employee for various coverage types, such as employee only, employee plus one, family plan, and the like. When the employee selects a plan and coverage type, an alert may indicate which dependents would be eligible for coverage under the selection. For example, an outline box may appear around the eligible dependents. The employee may then select which dependents to include in the elected coverage. Selecting dental and vision coverage may proceed in a similar fashion. In the example of FIG. 32, the employee medical timeline 3202 shows medical coverage starting Jan. 1, 2009.

Figure 33:
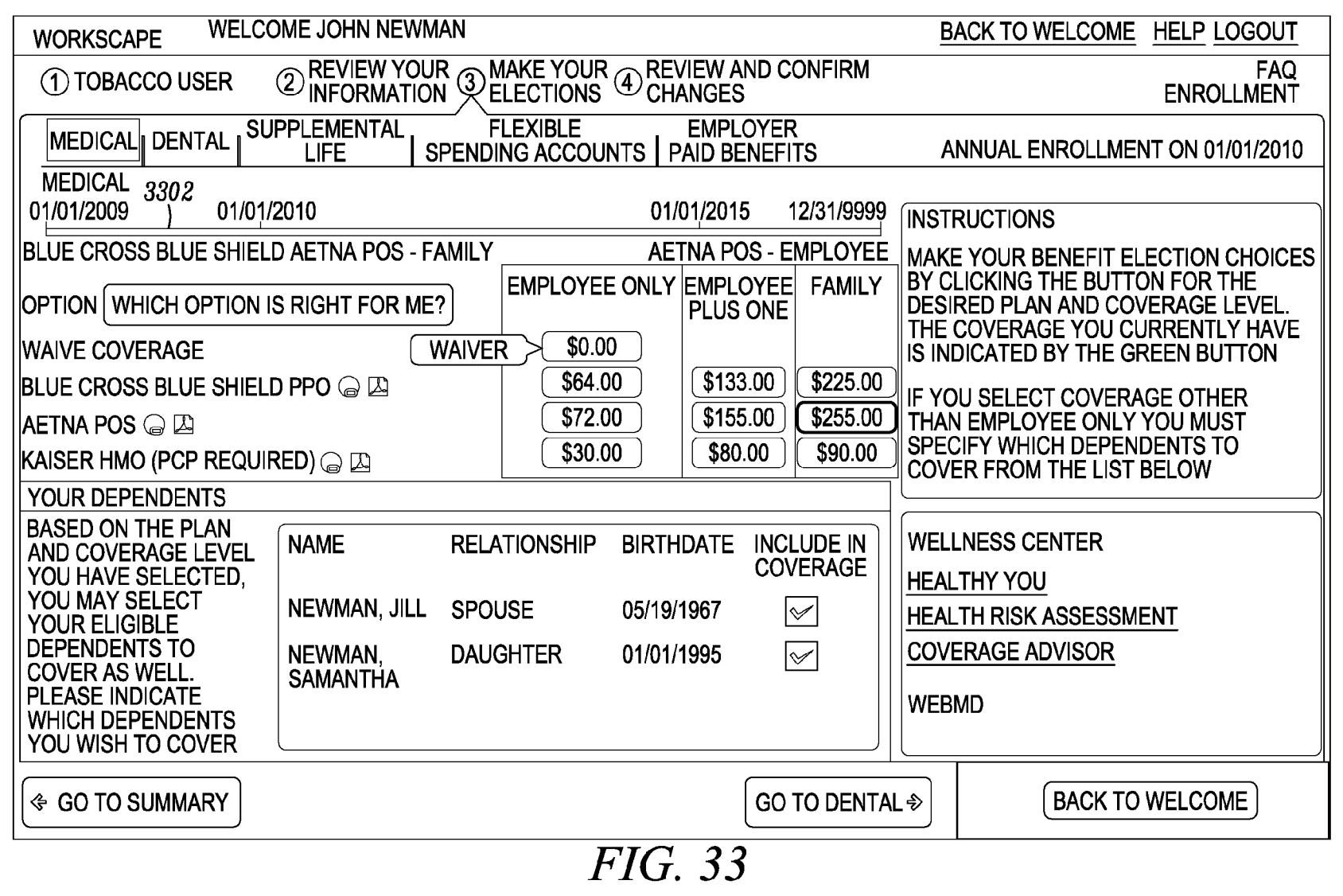

Referring now to FIG. 33, a timeline may show a change upon election of coverage. In this example, the timeline 3302 shows the employee changed coverage on the election date of Jan. 1, 2010. The timeline may provide a way to navigate benefits over a period of time prior to the current time period or after the current time period. For example, selecting the portion of the timeline prior to the current time period may change the display to show what the benefits elections were during the time period selected.

Referring to FIG. 34, a selection page for supplemental life insurance is shown. Options for supplemental life insurance may be selected by the employee, such as waived, one times the salary, twice the salary, a specific dollar figure, and the like. The cost for each option may be indicated along with any requirements, such as submission of an accompanying evidence of insurability form. Referring to FIG. 35, the timeline depicts a pending change to the supplemental life insurance election. A notification alerts the employee that coverage may be pending awaiting submission of the evidence of insurability form.

Figure 36:
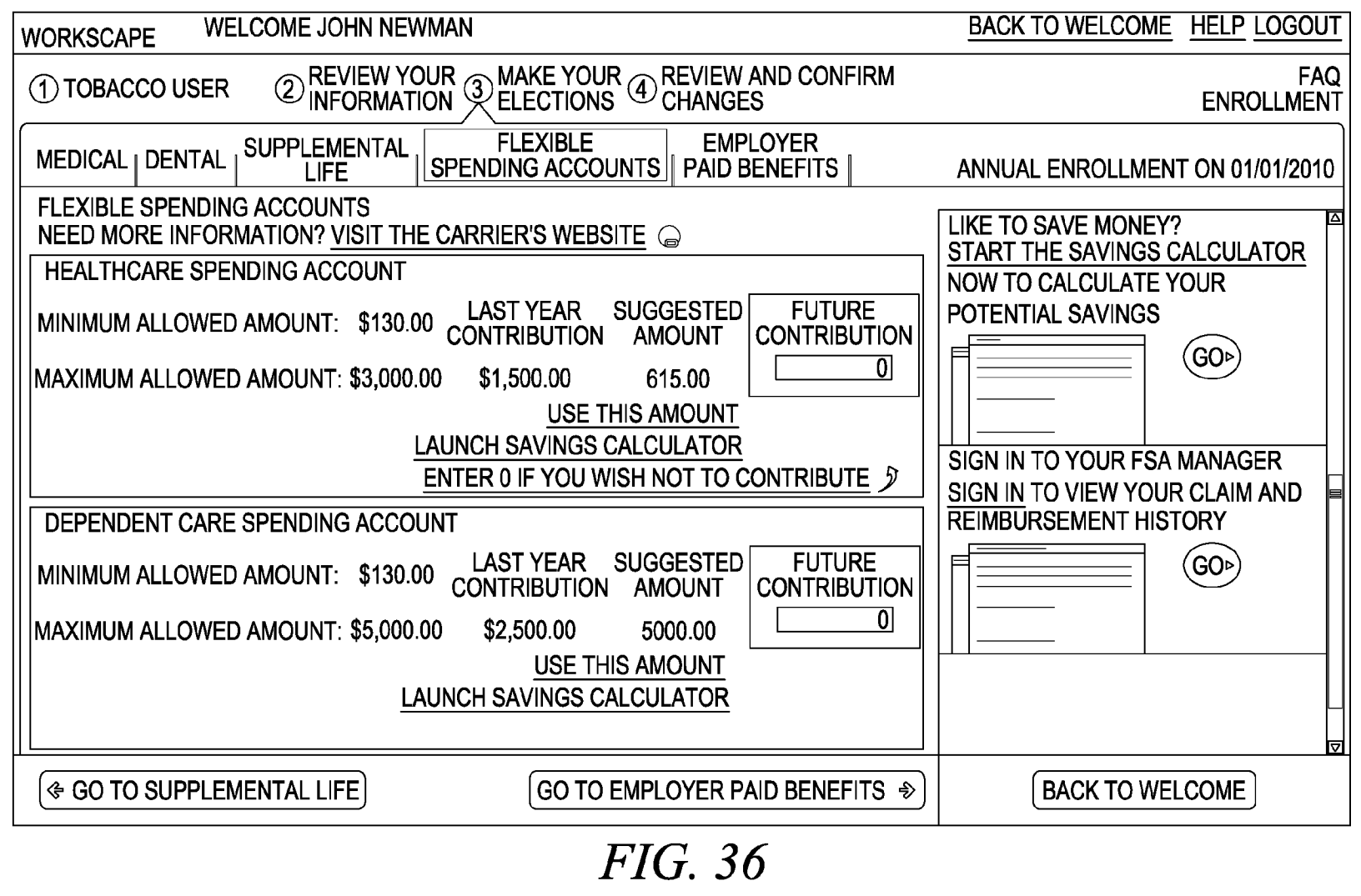

Referring to FIG. 36, a flexible spending accounts selection screen is shown. Tools, such as a link to the carrier website may be present on the screen. Flexible spending accounts may include a healthcare spending account, a dependent care spending account, and the like. Each kind of account may have its own coverage timeline. For each account, minimum allowed amounts, maximum allowed amounts, current year contribution, past year contribution, and future year contribution may be shown. The employee may modify the future year contribution.

FIG. 37 depicts a view of an employer paid benefits page showing benefits and any associated options. Employer paid benefits may include short-term disability, long-term disability, basic life insurance, accidental death & dismemberment insurance, supplemental life insurance, business travel and accident insurance, 401K, employee assistance program, tuition benefits, and the like. The associated options shown on the employer paid benefits page may include the level of coverage, and the like.

Referring to FIG. 38, the fourth step of the enrollment process may be reviewing and confirming elected benefits. The timeline may depict benefit elections per event, such as a life event, an open enrollment event, and the like. The section of the timeline that is filled in may represent the time in which the elections below will be in effect. The user may click on any other portion of the time line, and the data below may be adjusted to display the benefits in effect at that time. This may give employees an opportunity to make comparisons and make better decisions about their benefits elections. Elections may be shown along with coverage level, effective start date, cost, applicable dependents or beneficiaries, and the like. The benefits may be categorized by employee pre-tax paid benefits, employee post-tax paid benefits, employer paid benefits, and the like. The total cost for all benefits may be shown as well as a breakdown of post-tax and pre-tax costs. Any pending requirements, such as requirement for submission of a form to support an election, may be indicated on the review page. An option for confirming the elections may be selected by the employee who may access a confirmation screen, as in FIG. 39. The confirmation screen displays a signal of successful submission of elections and may provide options for printing the elections, returning to the welcome screen, logging out, and the like. The employee may be notified of any pending requirements, such as requirement for submission of a form to support an election. In an embodiment, the forms may be downloaded from the confirmation screen.

Figure 40:
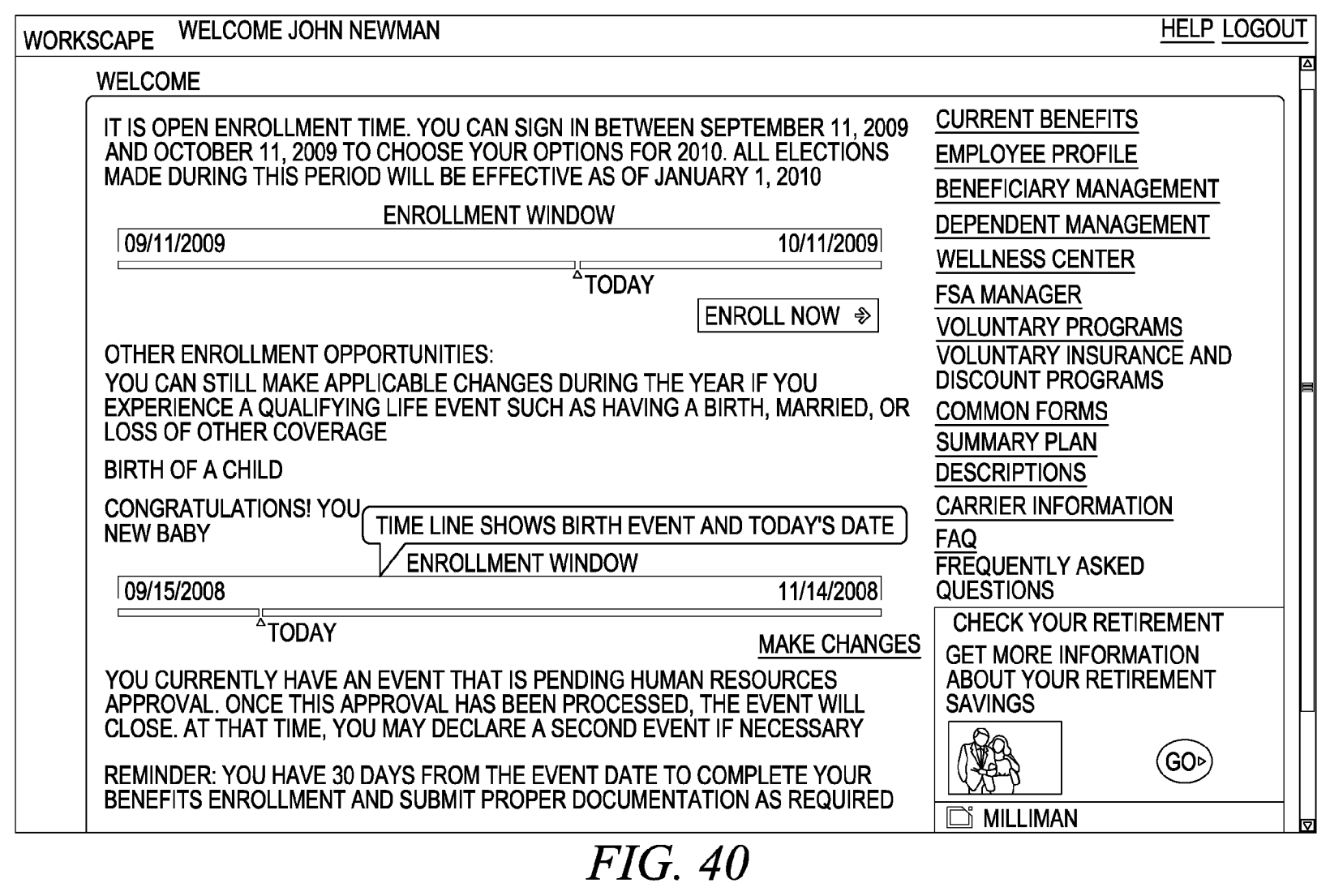

Referring to FIG. 40, if the employee selects returning to the welcome screen, the new pending life event that was submitted for approval may be shown. The employee may have the opportunity to make changes to the life event and any accompany elections and changes. The ability to make changes may be limited by applicable rules, which may be configured or built into the benefits administration application.

Figure 41:
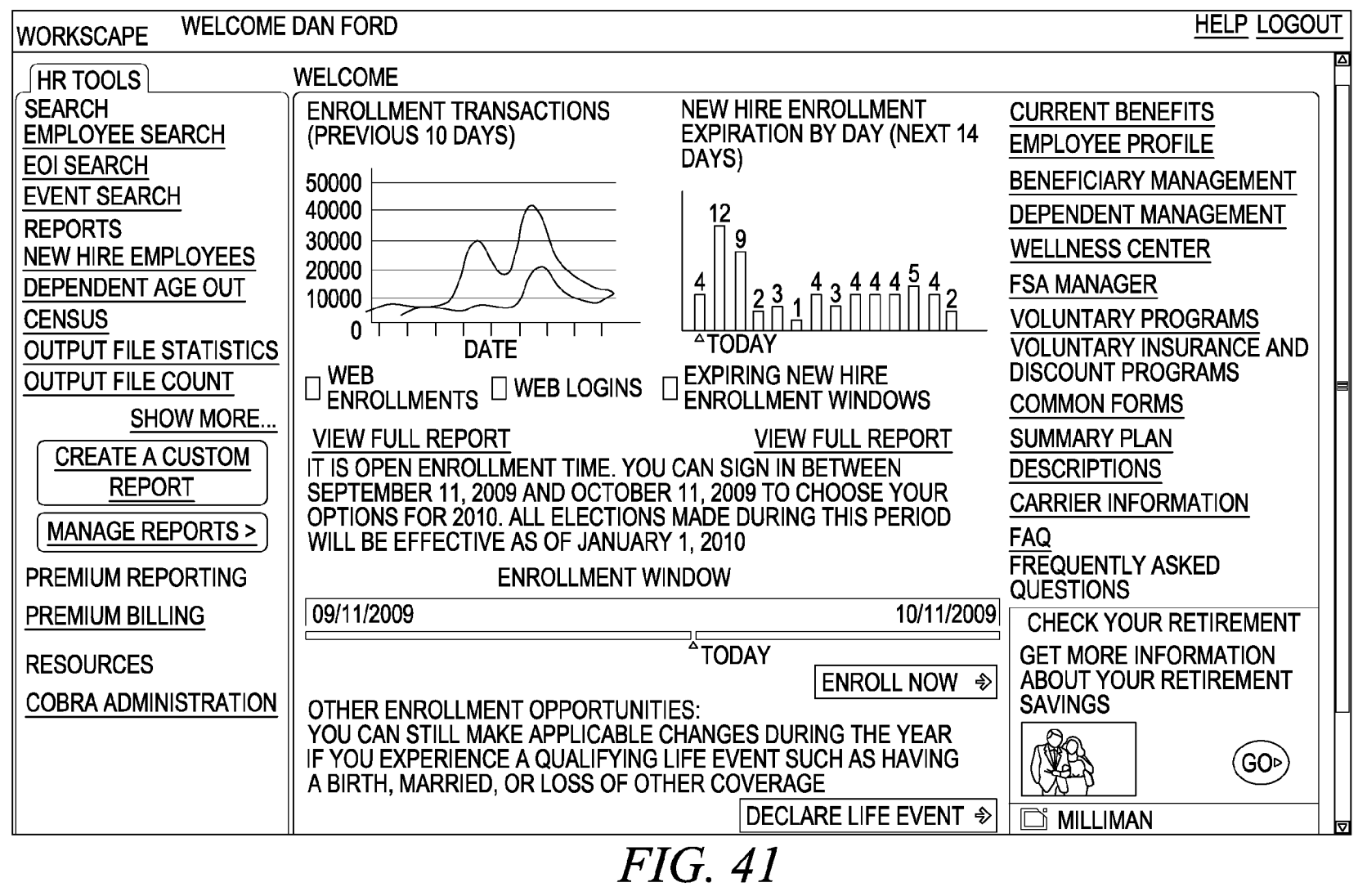

Referring to FIG. 41, an administrator logging in to the benefits administration application may have additional administrative tools accessible from the welcome screen. For example, administrative tools may include searches such as employee search, EOI search, event search; reports section that may include generation of reports for new hire employees reporting, dependent age out reporting, census reporting, output file statistics reporting, output file count reporting, enrollment statistics reporting, enrollment transaction reporting, input file statistics reporting, benefit election summary reporting, enrollment statistics reporting, plan migration reporting and the like. In addition, the welcome screen may include buttons for creating custom reports, manage reports and the like. Additional links for premium reporting, resources such as COBRA administration may also be provided on the welcome screen. Furthermore, other options accessible through the welcome screen may comprise access to current benefits, employee profile, beneficiary management, dependent management, wellness centre access to voluntary programs such as voluntary insurance and discount programs, common forms, summary plan descriptions carrier information, and frequently asked questions, and the like as described earlier.

Referring to FIG. 42, clicking on the employee search link may initiate a form for entering details of an employee to be searched. The search form may include first name, last name, SSN, employee id, and the like. A search button may be provided for initiating the search after entering the required criteria for search. The display screen may provide a plurality of text boxes; one for performing quick search and the other for performing advanced search.

Figure 43A:
Figure 43B:
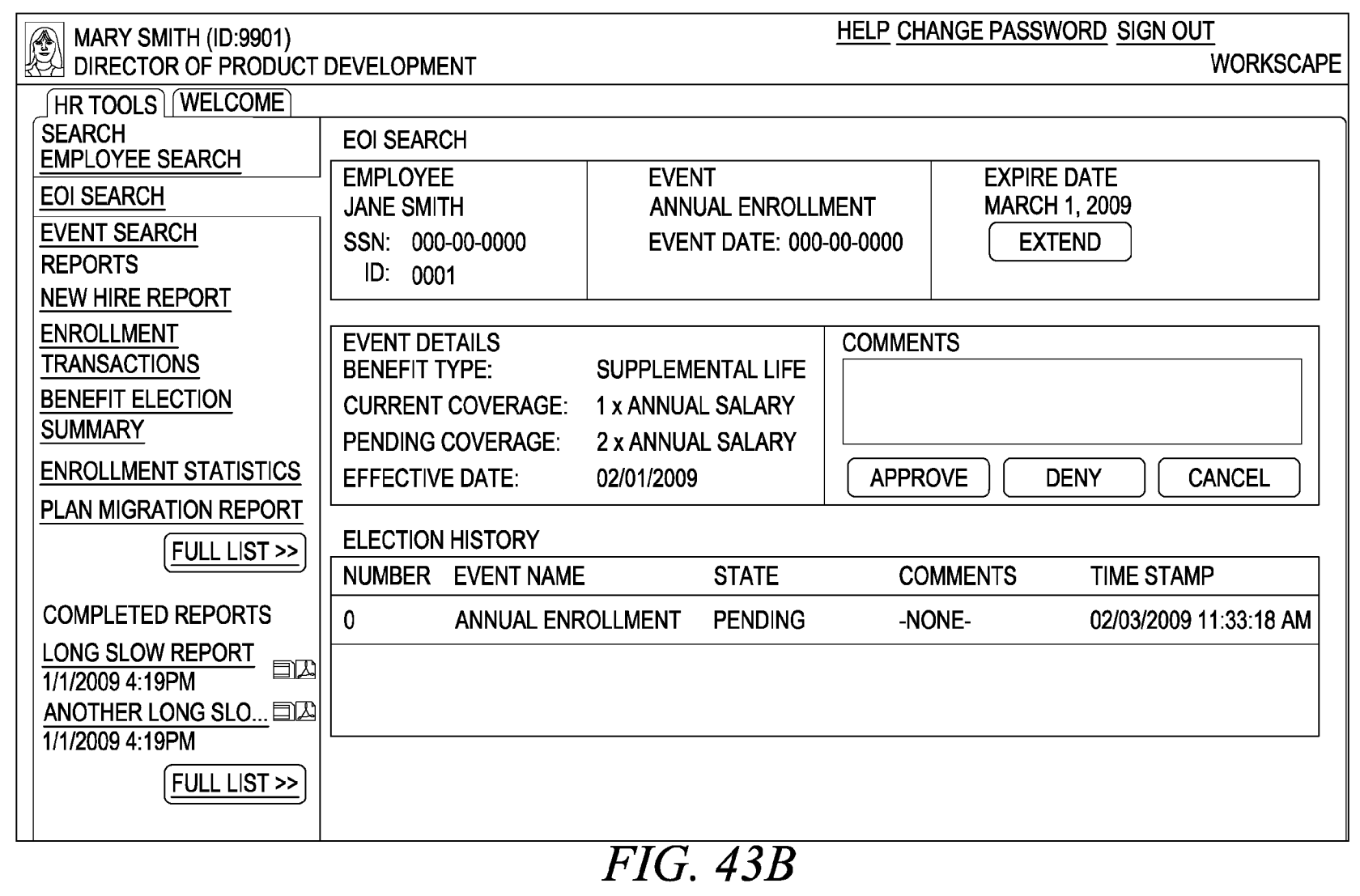
Figure 43C:
Figure 43D:

Referring to FIG. 43a, selecting the EOI search option may bring the administrator to an EOI search screen. The administrator may search by name, social security number, employee ID, status, benefit, event, start dates, end dates, date range, and the like. Similarly, selecting the employee search option may bring the administrator to an employee search screen. The administrator may search by name, social security number, employee ID, and the like. Once an employee is identified, the administrator may approve or reject events or require additional evidence or information. A pending change approval of the elected benefits may search from the EOI screen as shown in FIG. 43b. In addition, the administrator may initiate an advanced search for listing all the employees that may have a pending approval as shown in FIG. 43c. In embodiments, a date range may be selected from the calendar to restrict the EOI search based on a date range. For example, the administrator may enter a date range from Oct. 10, 2008 to Oct. 20, 2008. The date range may be entered by selecting this date range from the calendar that may be provided on the screen as shown in FIG. 43d.

An event search for searching a particular event may be initiated by the administrator as shown in FIG. 44. For example, the search form may allow the administrator to enter data corresponding to a particular employee for searching a particular event associated with the user. The search form may include fields such as first name, last name, social security number, employee ID, status, event having an event occurrence dates, event declaration dates and the like. A search button and a cancel button may be provided for either executing the search or canceling the search.

Referring to FIG. 45, an administrator enrollment statistics report may include benefit type, the benefit, data range, option, event, the coverage level, how many employees elected the benefit, employee status, department, division how many employees were eligible, the elected percent, and the like. The enrollment statistics interface may facilitate filtering/restricting/customizing the search based on one or more of the following criteria including a range, a benefit, an option, a coverage level, an event, an employee status, a department, a division and the like.

Referring to FIG. 46, an administrator new hire report may include employee ID, name, date of hire, days remaining, election start date, election end date, last election date, location, department, division, company, division, union, cost center email address and the like. In addition, the new hire report may be filtered/restricted/limited according to one or more of a hire date, a location, a department, a company, a division, a union, a cost center and the like. A link for changing parameters may present a form for customization/filtering/restricting of report according to one or more of the above parameters.

Referring to FIG. 47, a dependent age out report may be initiated by an administrator that may include attributes such as sub full name, ID, department full name, age, birth date, benefit option, age outage, location union, email and the like. The dependent age out report may also include a link for changing parameters of the report for customization/filtering/restricting the dependent age out report according to one or more parameters such as group type, ID, benefit option, location, department, company, division, union, cost center and the like as shown in FIG. 48. In addition, each of the report may be report columns may be sorted according to one or more columns each report may be resorted by one or more columns by clicking on the column headers or by selecting a "sort/filter" feature located in each column header.

Figure 50:
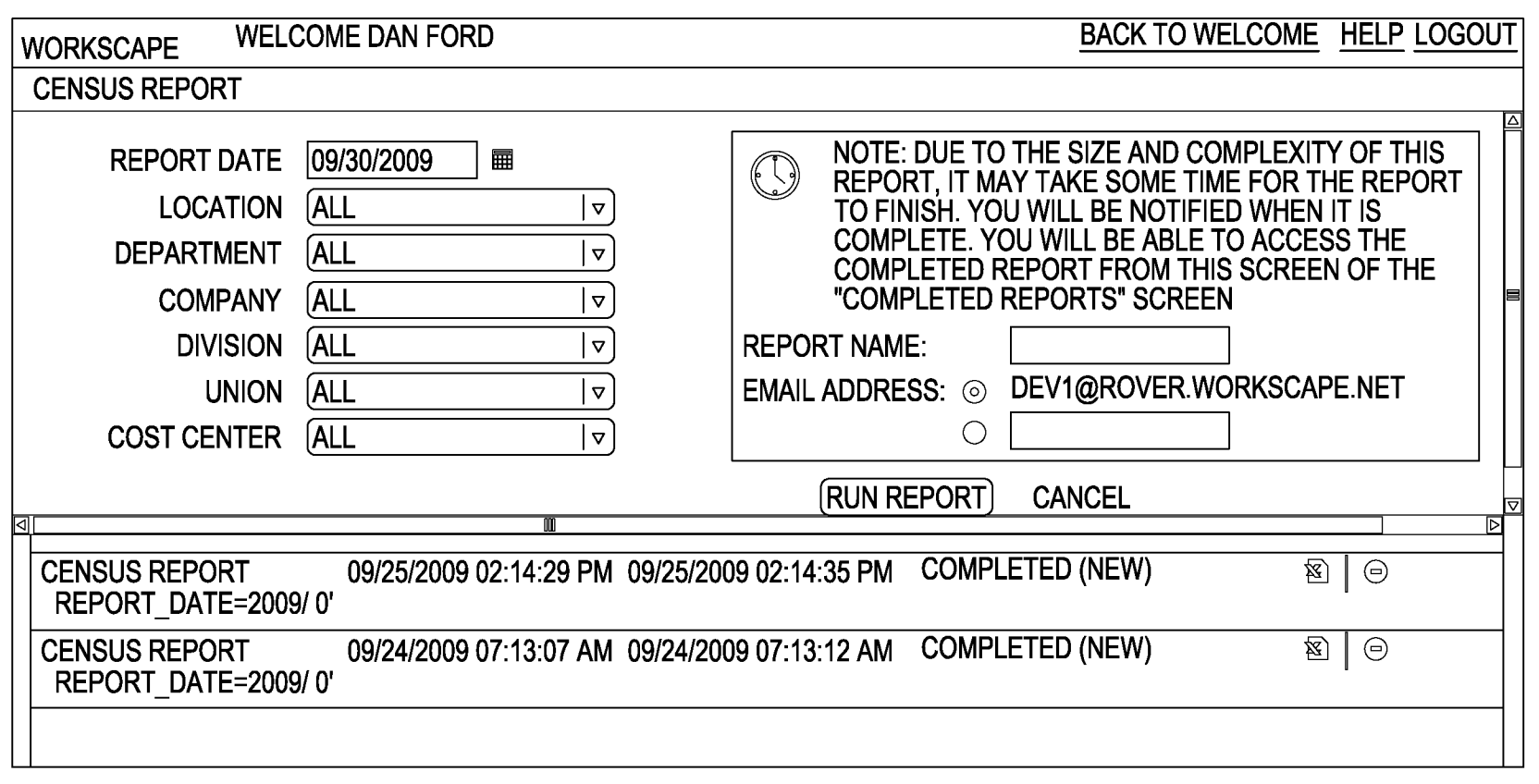

The welcome page may include a link to a census report and clicking on this may display a screen as shown in the FIG. 49. The report may enable an administrator to view a snapshot of benefit enrollment data for the full or partial benefits eligible population. The report may include a name, a run date, a completed date, a status, an action and the like. Additionally, the report may also include a change parameter link that may initiate a web form for changing/filtering the census report based on parameters such as report date, location, department, company division, union, cost center and the like as shown in FIG. 50.

Referring to FIG. 51, out file statistics report may be provided to the administrator to assess the number of statements, or other output files generated within a given date range. The report may include a statement type, a name, an employee SSN, an employee ID, a lot name, an event name, a counter run date and the like. As described earlier the report interface may include a change parameter link for filtering/customizing/modifying the report based on one or more parameters such as a statement date range, a statement type, a first name, a last name, an employee ID, an employee SSN and the like.

Referring to FIG. 52, the output file count report may enable the administrator to see the output file reporting statistics that may comprise of a statement type, a run date, a lot count and the like. Furthermore, as described earlier, the output file reporting may be customized on one or more parameters such as statement type, statement date range and the like.

FIG. 53 depicts a screen for input statistics report generated by the administrator. The input statistics report may include an input file type, a start time, an end time and the like.

Figure 55:
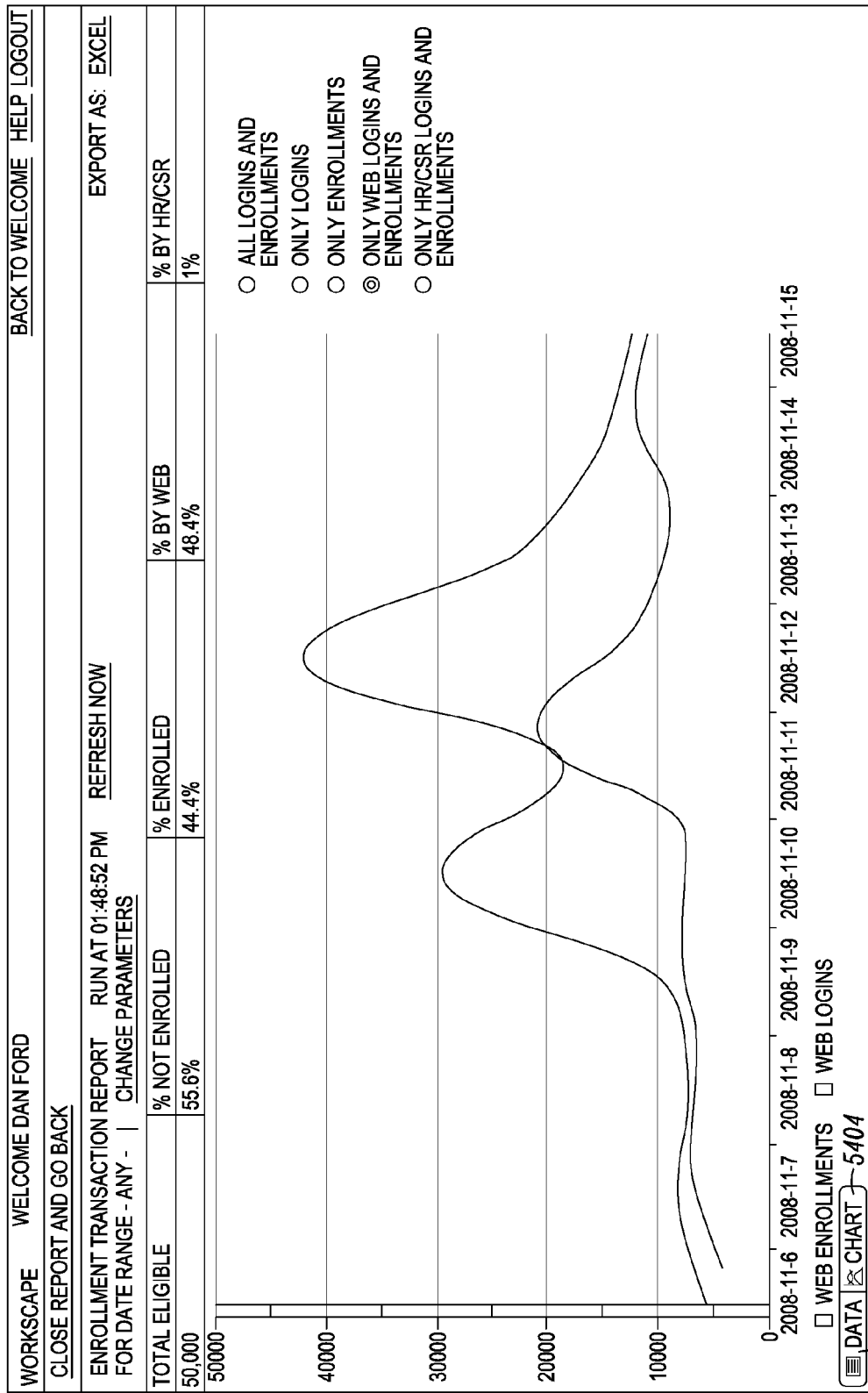
FIG. 55 depicts an administrator enrollment transaction report in form of a chart.

Referring to FIG. 54, the administrator may be able to generate a report for type of enrollment in an enrollment transaction report. For example, user may be logged by Web, by HR admin, enrolled by web, or enrolled by via HR admin or CSR. The report may include statistics in form of data 5402 and/or in form of chart 5404. The attributes of report may include not enrolled, enrolled, enrolled by web, enrolled by HR/CSR and the like. The chart display may include line charts as shown in FIG. 55.

FIG. 56 illustrates a screen for displaying benefit election summary report produced by the administrator for various types of elections including medical, dental, supplemental life and the like. The benefit election summary report may filtered/restricted on one or more attribute including date range, benefit, option, coverage level, event, employee status, department, division and the like.

Referring to FIG. 57, the plan migration report may be generated by the administrator to see the changes made by employees in various insurance plans, medical plans, dental plans and the like. The plan migration report may include a changed from, a changed to, employees who changes, a percentage of total changes and the like. For example, the employee may change from a buy up plan to buy up option plan, which change in plan may be provided in the plan migration report.

Figure 58:
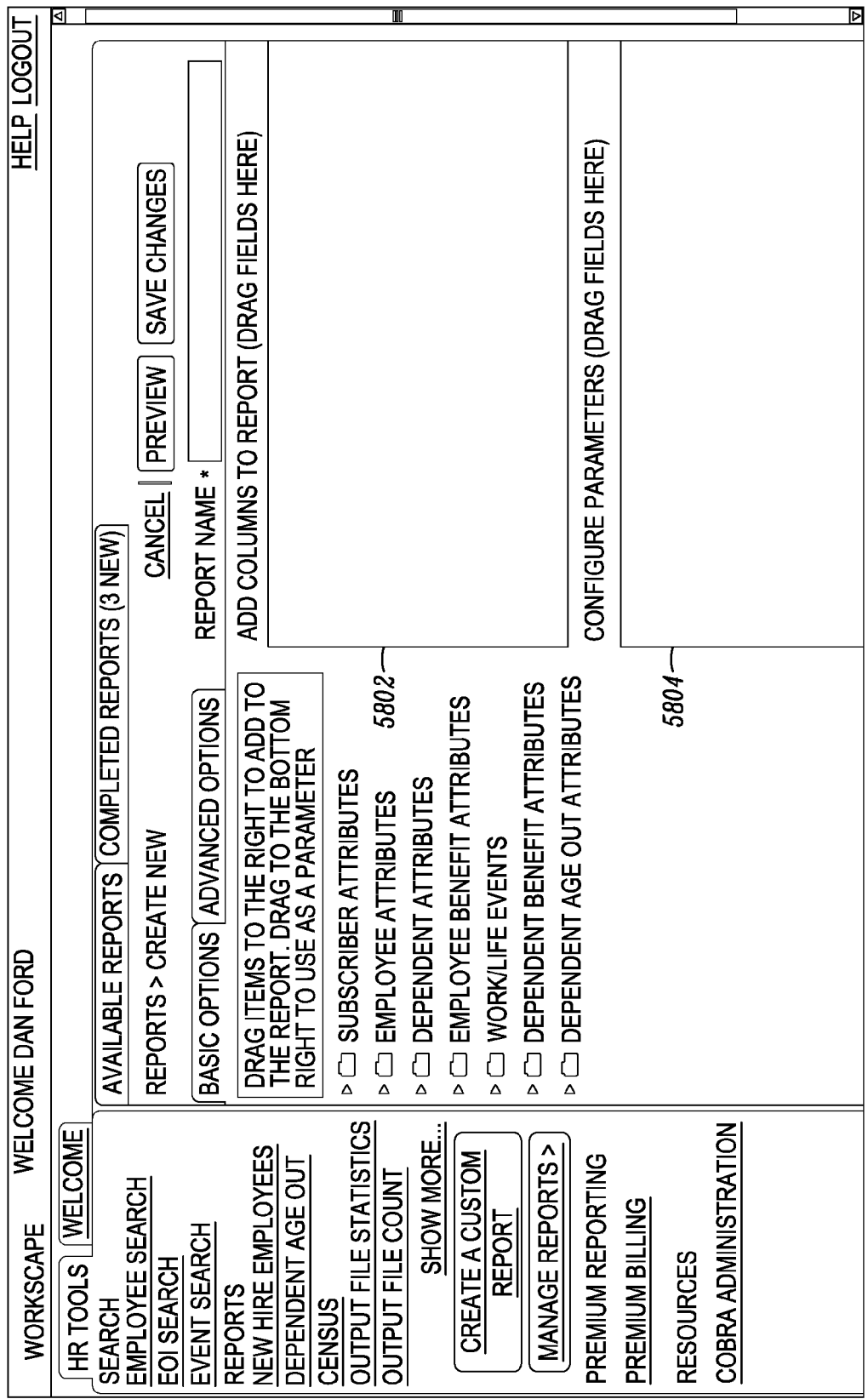
FIG. 58 depicts an administrator interface for creating an ad hoc report.

Referring to FIG. 58, the administrator may create a custom report as per requirement. The custom report may be created from subscriber attributes, employee attributes, dependent attributes, employee benefit attributes, work life events, dependent benefit attributes, dependent age-out attributes and the like. Furthermore, each attribute may include a plurality of parameters as described above in this application. It may be noted that one or more parameters may be selected from each of the subscriber attributes, employee attributes, dependent attributes, employee benefit attributes, work life events, dependent benefit attributes, dependent age-out attributes and the like and may be added to textbox 5802. In addition, another textbox 5804 to configure parameters may allow the selected parameters to be dragged here for including in the report. Another Textbox report name may be provided for entering the name of the custom report.

Figure 59:
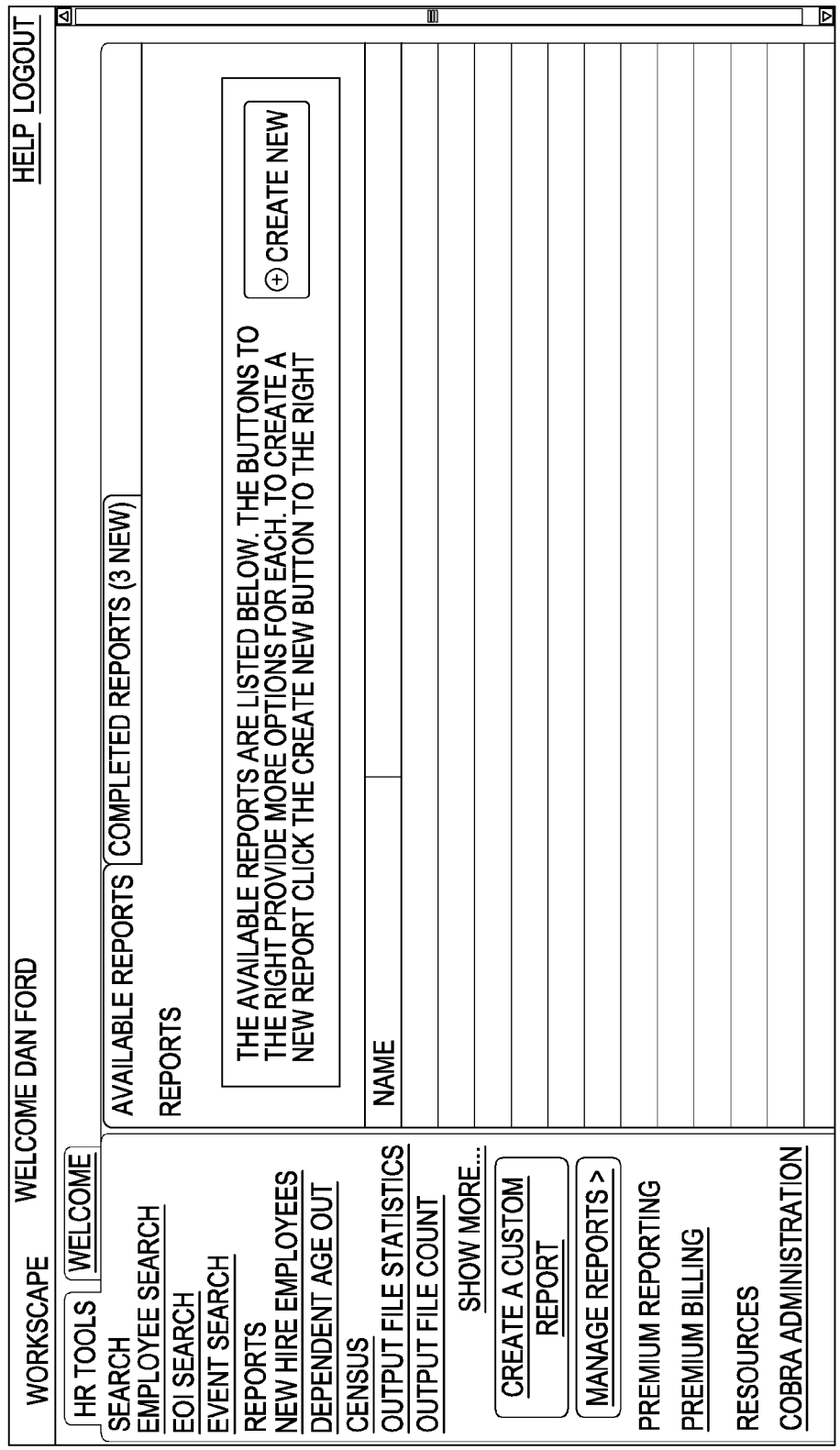
FIG. 59 depicts a screen for ad hoc report management by an administrator.

Referring to FIG. 59, a manage report link may allow the administrator to manage the available reports. The available report may be listed by name or any other parameter. Further, a create report button may be provided for creating a new customized report.

Figure 60:
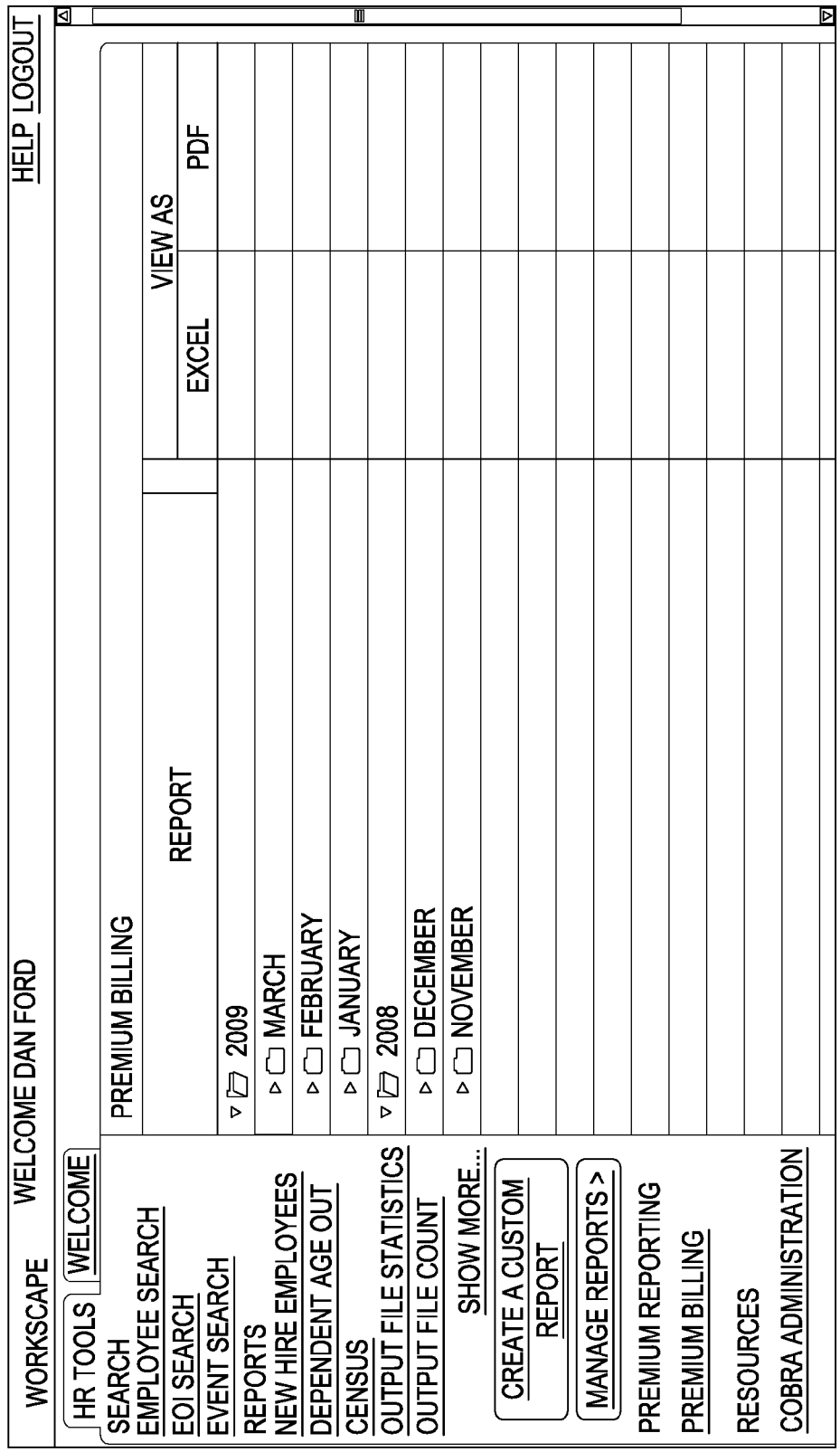
FIG. 60 depicts an administrator access to historical premium billing reports by month.

Referring to FIG. 60, premium billing report may be generated by the administrator. The premium billing reports may be arranged in the folder. For example, folder may be arranged year-wise, and within the year further broken down, such as by month.

Referring to FIG. 61, an audit screen of all business transaction and event elections may comprise events, changes as of today, and the like. The human resource management system enables an administrator to view an employee's data and coverage changes over time, focusing in on certain types of information and the events that introduced changes.

FIG. 62 depicts election changes that occurred in association with a particular event. Details of sessions and submissions are displayed when the same is selected from the event timeline.

FIG. 63 depicts a coverage timeline view showing selected coverage changes over time for an individual event. In the timeline may be presented, such basic life, dental, medical, supplemental life, and the like.

Referring to FIG. 64, an annual enrollment screen may provide the listing of the dependents. The listing may include the name, relationship, birth date, and the like. In addition, the listing may include different types of benefits such as medical, dental, and the like.

It should be understood that any action or function described herein may be performed by an employee in a self-service operation, by an administrator, by a third party, and the like, unless otherwise indicated.

The benefits application user interface may facilitate planning and/or managing benefits for a single employee or a plurality of employees. The plurality of employees may be related through one or more of the following, without limitation—employee attributes, such as title, aspects of coverage, department, location, business unit or division, responsibilities, years of service, manager, services received, employee employment status, and the like. An employee employment status may include, without limitation, one or more of full-time, part time, hourly, exempt, permanent, temporary, direct, contract, and other characterizations of status such as active, inactive, retired, and the like.

The user interface, or one or more portions of the user interface, may be based on computer programming technology including without limitation JAVA, JAVASCRIPT, ADOBE FLASH, ADOBE FLEX a combination thereof, or a combination of one or more thereof and other computer programming languages, constructs, technology, images, graphics, menus, and the like.

The human resource management platform 100 may provide facilities for integrating information from a variety of sources including enterprise business systems, such as planning, budgeting, accounting, organization management, and the like. Information may be provided to the human resource management platform 100 to update the relevant data in the human resource management platform 100. In an embodiment of the invention, information from external business and other systems may be integrated on a regular basis, such as each day. Facilities for integrating this information may provide synchronization capabilities that may allow a user/enterprise to detect changes in information received for integration and to decide how the data in the platform reacts to the detected changes in the information.

The benefits administration business application may facilitate supporting "what-if" scenario assessment. In the benefits space pending data may be applicable because decisions that are made today may require approval before the change can be effective. Therefore, such decisions result in a pending approval state, such as a pending event. Pending events may be incorporated into a future view of the model (e.g. by setting a future target effective date for the application). However, the changes are separate from the 'current state' until they are approved so that they are not used in activities that access data (past, present, or future) before the state is approved such as sending current data to the suppliers of these benefits. In an example of this combination of effective dating and a pending event for a benefits administration application, an employee may elect to increase life insurance coverage on a first date. However, the election must be approved so the date that the election is made becomes a pending effective date for the election. Until the change is approved, the current coverage is unchanged and the premiums deducted from the employee's paycheck are unchanged. Once the change is approved, the coverage effective date may be any of the earlier election date, the approval date, or a future date such as the beginning of the next billing cycle or the next calendar month. The higher coverage effective date may be determined based on business logic associated with the change. If the higher coverage effective date is a future date, the higher coverage is associated with the future effective date so that when the calendar date passes the coverage effective date, the coverage is effective. Alternatively, the target effective date can be changed to be after the future effective date of the higher coverage so that premium deductions can be adjusted for an upcoming payroll cycle that matches to the future effective date of the higher coverage.

In an example, benefits data integration using the data synchronization facilities described herein may be part of regularly run process in which the platform 100 receives a stream of updated data. To facilitate proper and effective integration of externally provided data, a set of input data may be a complete set of data, or a partial set with optional effective dating for various parts of the data. The input file process merges the input data into the persisted, effective dated domain model after performing coverage repair to ensure data integrity and consistency with the benefits administration and platform business rules. The input file process performs a reconciliation process to determine the changes in the received data. The reconciliation process may include comparing received data to data existing in the platform to infer the occurrence of benefits events.

Even pending benefits approval notification/authorization, which may be part of an approval workflow, has to be tracked and modified based on changes detected in the input data so that the impact of these detected changes is properly managed. Changes received in input files or user interaction on a web-based application may impact benefits or give opportunity to make new elections. In some cases eligibility can be affected such as if an employee changes from one business unit in a corporation to another business unit that has different benefits or rules. The coverage repair facilities of the platform 100 may automatically process these changes.

The coverage repair capabilities of the platform 100 may be associated with a benefits administration management business application. Coverage repair as described herein may facilitate recalculating decisions associated with benefit elections that have a future effective date when changes introduced into the platform 100 impact the future elections.

In an example, in November an employee elects benefits to be effective in January. These benefits may be coded with an effective date in January so the current coverage period is not impacted by these benefits elections. In December the employee adds a family member to his current benefit plan after the birth of a child. Although the elections made in November that will be effective in January do not include the additional family member, when data including the additional family member is received by the platform, the coverage repair facilities of the platform, in conjunction with the business rules and dependency logic of the benefits administration business application may automatically recalculate the coverage for the new coverage period (that starts in January) based on the additional family member. This recalculation may result in the benefit election being automatically changed to include the additional dependent so that the benefits provided in the new coverage period in January will include the additional dependent.

In a variation of the above example, in December an employee moves to a different state that requires a different health care provider. When input file processing receives the new employee address, it recognizes this as a move event, and coverage repair makes any necessary adjustments to coverage from the date of the move up to the new plan year under the current plan rules, and then makes corrections or adjustments based on that new address into the new plan year under its rules. As a result, the employee's earlier election of a health care provider is repaired, or kept conformant to the rules, even if that required a switch of benefits providers based on service areas. Coverage repair will determine what business logic and/or update rules apply to an address change and apply those rules to the election decision. The result may be that a default benefit option is elected. Alternatively, the benefit option to which the employee has switched in the current period as a result of the move may become the default benefit option for the new coverage period.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
  configuring a pending state of a domain model;
  determining a change to benefits data accessible in a domain object of the domain model that requires authorization;
  using a processor to create a pending delegate of the domain object; and
  accessing the benefits data in the pending delegate through a first execution thread that accesses benefits data only in the pending state of the domain model, wherein the domain model comprises a current state of the benefits data that is accessed through a second execution thread that accesses benefits data only in the current state of the domain model.

2. The method of claim 1, wherein accessing the benefits data in the pending delegate includes accessing the pending delegate through the domain object.

3. The method of claim 1, wherein accessing the benefits data in the pending delegate is achieved only through the domain object.

4. The method of claim 1, wherein creating the pending delegate is based on the configured pending state.

5. The method of claim 1, wherein the domain model includes employee data and employee benefit data.

6. A system, comprising:
  a domain model of employee benefit data comprising at least a pending state, wherein employee benefit data items are stored in domain objects of the domain model; and
  a processor adapted to determine a change to at least one employee benefit data item that requires authorization, create a pending state-resident delegate of a domain object comprising a version of the employee benefit data item determined by the change, and access the data item in the delegate through a first execution thread that accesses benefit data only in the pending state of the domain model, wherein the domain model comprises a current state of benefits data items that is accessed through a second execution thread that accesses benefits data only in the current state of the domain model.

* * * * *

UNITED STATES PATENT AND TRADEMARK OFFICE
CERTIFICATE OF CORRECTION

| | | |
|---|---|---|
| PATENT NO. | : 9,727,845 B2 | Page 1 of 1 |
| APPLICATION NO. | : 14/300202 | |
| DATED | : August 8, 2017 | |
| INVENTOR(S) | : Thomas A. Cooper et al. | |

It is certified that error appears in the above-identified patent and that said Letters Patent is hereby corrected as shown below:

In the Specification

In Column 7, Line 39, after "usage" insert -- . --.

In Column 7, Line 45, after "validation" insert -- . --.

In Column 7, Line 65, after "screen" insert -- . --.

In Column 8, Line 41, after "view" insert -- . --.

In Column 38, Line 43, after "like" insert -- . --.

In Column 39, Line 52, delete "a an" and insert -- an --, therefor.

In the Claims

In Column 56, Line 60, in Claim 5, after "includes" delete "employee data and".

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*